(12) United States Patent
Oxley et al.

(10) Patent No.: US 12,374,537 B2
(45) Date of Patent: Jul. 29, 2025

(54) FRAGMENTATION RESILIENCE ENERGY MASS SPECTROMETRY (FREMS)

(71) Applicant: The Government of the United States of America, as represented by the Secretary of Homeland Security, Washington, DC (US)

(72) Inventors: Jimmie Oxley, Narragansett, RI (US); James L. Smith, Narragansett, RI (US); Alexander Yevdokimov, Norwich, CT (US); Kevin Colizza, Collegeville, PA (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 546 days.

(21) Appl. No.: 17/877,064

(22) Filed: Jul. 29, 2022

(65) Prior Publication Data
US 2023/0080152 A1   Mar. 16, 2023

Related U.S. Application Data

(60) Provisional application No. 63/227,924, filed on Jul. 30, 2021.

(51) Int. Cl.
| | | |
|---|---|---|
| *H01J 49/00* | (2006.01) | |
| *G01N 30/72* | (2006.01) | |
| *G01N 30/86* | (2006.01) | |
| *G01N 30/02* | (2006.01) | |

(52) U.S. Cl.
CPC ...... *H01J 49/0036* (2013.01); *G01N 30/7233* (2013.01); *G01N 30/8631* (2013.01); *G01N 30/8693* (2013.01); *G01N 30/8696* (2013.01); *G01N 2030/027* (2013.01)

(58) Field of Classification Search
CPC ................ H01J 49/0036; H01J 49/004; G01N 30/7233; G01N 30/8631; G01N 30/8693; G01N 30/8696; G01N 2030/027; G01N 30/8651
USPC .................................................. 250/281, 282
See application file for complete search history.

(56) References Cited

U.S. PATENT DOCUMENTS

2019/0294756 A1*   9/2019   Tautenhahn ........... G16C 20/30

* cited by examiner

*Primary Examiner* — Michael Maskell
(74) *Attorney, Agent, or Firm* — Kelly G. Hyndman; Robert W. Busby

(57) ABSTRACT

Examples are directed toward collecting, by a LC-MS device, a full scan of ion chromatograms of a sample. The LC-MS device determines observed ions contained in the full scan, based on mass-to-charge ratios (m/z), and determines, for a formation curve of an observed ion, a formation point at which fifty percent of the observed ion has formed. The LC-MS device determines a fragmentation curve of a precursor ion, based on a fragmentation point of the fragmentation curve equivalent to the formation point at which fifty percent of the precursor ion has fragmented, and identifies the precursor ion by referencing the LC-MS library to confirm that the observed ion is a product of the fragmentation of the precursor ion. The LC-MS device indicates a goodness of fit between the fragmentation curve, as observed, and a model fragmentation curve, as stored in the LC-MS library.

9 Claims, 69 Drawing Sheets

$MS^3$ Stage – $^{35}CL$

$MS^3$ Stage – $^{37}CL$

$MS^4$ Stage – $^{35}CL$

MS⁴ Stage – ³⁷CL

FREMS – Glutathione

FREMS curves of 4-C1BP fragments

Proposed bupropion fragmentation mechanism based on FREMS framework for $^{35}Cl$ Proposed Glutathione fragmentation mechanism based on FREMS framework

FRAGMENTATION RESILIENCE ENERGY MASS SPECTROMETRY (FREMS)

CROSS-REFERENCE TO RELATED APPLICATIONS

This application claims the benefit of U.S. Provisional Application No. 63/227,924 entitled "Fragmentation Resilience Energy Mass Spectrometry (FREMS)," filed on Jul. 30, 2021, incorporated herein by reference in its entirety.

STATEMENT OF GOVERNMENT INTEREST

This invention was made with government support under Subcontract No. NU505035-78059 awarded by the Department of Homeland Security. The government has certain rights in the invention.

FIELD

The present subject matter relates generally to the field of mass spectrometry, and more specifically to the field of liquid chromatography mass spectrometry (LC-MS) and analyte libraries for LC-MS.

BACKGROUND

Mass spectrometers ionize an analyte, giving it a positive or negative charge. Due to its charge, the analyte, now an ion, can be easily manipulated by an electromagnetic field, providing that field is essentially void of other species and allows wide spacing of the ions from each other, i.e. under vacuum about 10-11 torr for gas chromatography mass spectrometry (GC-MS) and 10-9 torr for LC-MS. GC-MS is suitable only for high volatility, generally non-polar analytes and solvents. These are vaporized at the hot inlet of the GC, so that they can be carried through the gas chromatography column by a carrier gas (e.g. helium). As analytes interact differently with the stationary phase of the column, their separation occurs. The solvent exits the GC first and is discarded. However, when the analyte gas leaves the GC to enter the vacuum of a single quadrupole MS, an electron beam bombards the stream, ionizing and fragmenting the species. This design is common, and results are highly reproducible; therefore, manufactures of GC-MS systems can create common libraries, which are cross-brand applicable.

LC-MS is used with non-volatile or low volatility, generally polar analytes and solvents. LC-MS became possible when methods were devised to separate the sample (analytes) from the solvent; several approaches exist for achieving this. Unlike in GC where analytes are already in a gas phase and can be easily introduced into the vacuum, in LC, the analytes remain in condensed phase throughout the separation phase. Thus, LC separation and ionization happens under atmospheric pressure. To avoid solvent introduction into the MS (whether from an LC column or directly), the solution (solvent plus analyte) is aerosolized in the presence of a sheath gas (usually N2) and a charge is imparted to the nano-drops. Ultimately, most of the charge ends up on the analyte, which is separated from neutral solvent. The analyte ion, a cation (positively charged) or anion (negatively charged), enters and moves through the MS, while the neutral solvent goes to waste. As the ion moves through the MS, it may or may not be broken down into smaller pieces (fragments). Ultimately the original analyte and its fragments, if any, are detected and their masses are found relative to their charges (m/z). Because the solvent removal and ionization of the analyte is instrument and laboratory dependent, creation of common libraries, even for a particular model of LC-MS, has not been widely successful. The major difference in reproducibility between GC-MS and LC-MS is that ionization for GC-MS is performed under vacuum and can be controlled, while for LC-MS ionization is performed under atmospheric conditions. Thus, LC-MS structural characterization is highly subjective and relies on the skill and expertise of the operator. Thus there is a need in the industry for a standard process that can create analyte libraries for any LC-MS system and user.

SUMMARY

In an embodiment, a Liquid Chromatography Mass Spectrometry (LC-MS) system collects a full scan of ions formed; determines, from the full scan, a precursor (parent) ion using a m/z or threshold of 20% of total ion current (TIC); and traps or isolates, in FREMS mode, the precursor (parent) ion. The LC-MS system collects a trace of the parent ion that will be disappearing as energy is increased, by starting at essential zero normalized collision energy and performing a controlled energy ramp by incrementally raising the fragmentation energy. The LC-MS system examines the breakdown curves for detected product (daughter) ions; and normalizes formation curves of the product (daughter) ions to that of the parent (precursor) ion initial intensity so that they have the same maxima. Responsive to the formation curves for replicate runs mirroring that of the precursor ion, the LC-MS system indicates that the product observed is a fragment of the parent (precursor) ion or a product of one of the parent's product (daughter) ions; and determines whether a product is the direct product of the initial parent (precursor) ion or a product of a product (i.e. granddaughter), by determining whether the formation curve of a possible product ion crosses the breakdown curve at lower than the inflection point of the precursor breakdown curve, if so, the mass spectrometer designates the product as a product of one of the product ions.

In another embodiment, a LC-MS device collects a full scan of ion chromatograms of a sample. The LC-MS device determines observed ions contained in the full scan, based on mass-to-charge ratios (m/z), and determines, for a formation curve of an observed ion, a formation point at which fifty percent of the observed ion has formed. The LC-MS device determines a fragmentation curve of a precursor ion, based on a fragmentation point of the fragmentation curve equivalent to the formation point at which fifty percent of the precursor ion has fragmented, and identifies the precursor ion by referencing the LC-MS library to confirm that the observed ion is a product of the fragmentation of the precursor ion. The LC-MS device indicates a goodness of fit between the fragmentation curve, as observed, and a model fragmentation curve, as stored in the LC-MS library.

In yet another embodiment, a method of building a Liquid Chromatography Mass Spectrometry (LC-MS) library includes scanning, by a LC-MS device, a sample to extract ion chromatograms including a fragmentation curve of a precursor ion; determining, for the fragmentation curve, a fragmentation point at which fifty percent of the precursor ion has fragmented; determining whether the ion chromatograms include a formation curve, of an observed ion, including a formation point equivalent to the fragmentation point, at which fifty percent of the observed ion has formed; responsive to determining that the formation curve includes the formation point equivalent to the fragmentation point, updating the LC-MS library to indicate that the observed ion is a product of the fragmentation of the precursor ion; and responsive to determining that the formation curve does not include the formation point equivalent to the fragmentation point, updating the LC-MS library to indicate that the observed ion is not a product of the fragmentation of the precursor ion.

Other features and aspects will become apparent from the following detailed description, which taken in conjunction with the accompanying drawings illustrate, by way of example, the features in accordance with embodiments of the claimed subject matter. This summary is not intended to identify key or essential features of the claimed subject matter, nor is it intended to limit the scope of the claimed subject matter, which is defined solely by the claims attached hereto.

BRIEF DESCRIPTION OF THE DRAWINGS

One or more example embodiments of the subject matter are described in detail with reference to the following drawings. These drawings are provided to facilitate understanding of the present subject matter and should not be read as limiting the breadth, scope, or applicability thereof. For purposes of clarity and ease of illustration, these drawings are not necessarily made to scale.

These drawings are not intended to be exhaustive or to limit the subject matter to the precise form(s) disclosed. It should be understood that the present subject matter can be practiced with modification and alteration, and that the subject matter is limited only by the claims and the equivalents thereof.

DETAILED DESCRIPTION

Embodiments described herein enable methods or techniques to essentially take apart the molecular structure of a sample molecule, and determine the building blocks of the molecule, to determine what is the molecule. Embodiments can take a sample having an unknown structure, and use a novel technique (FREMS) to determine the structure of the sample. Embodiments are applicable to anything that can be analyzed in a mass spectrometer, such as explosives or other materials amenable to mass spectrometry analysis techniques.

Embodiments can analyze and "clean up" collected data to eliminate irrelevance to the structure when analyzing fragments of the sample. Often times the sample is not in a pure form, which could otherwise generate results that include contaminants or impurities. However, embodiments can eliminate the results corresponding to contaminants or impurities, and focus on the item of interest.

In an embodiment, a mass spectrometer includes a controller that runs a customized script, to selectively control ramping up of energy as applied to the sample of interest. Embodiments tailor each script for each type of machine, suitable for providing results that are meaningful across different brands and types of LC-MS instruments.

In an embodiment, the methods described herein are incorporated into a stand-alone software program that is configured to interface with and control a LC-MS instrument. In another embodiment, the methods described herein are incorporated into the control software of the LC-MS instrument. For example, an LC-MS instrument stores a LC-MS library tailored to the specifics of that instrument, and the LC-MS instrument can provide a menu option to perform the methods described herein to analyze a sample, consult the LC-MS library, and identify a sample according to a goodness of fit.

Figure 1:
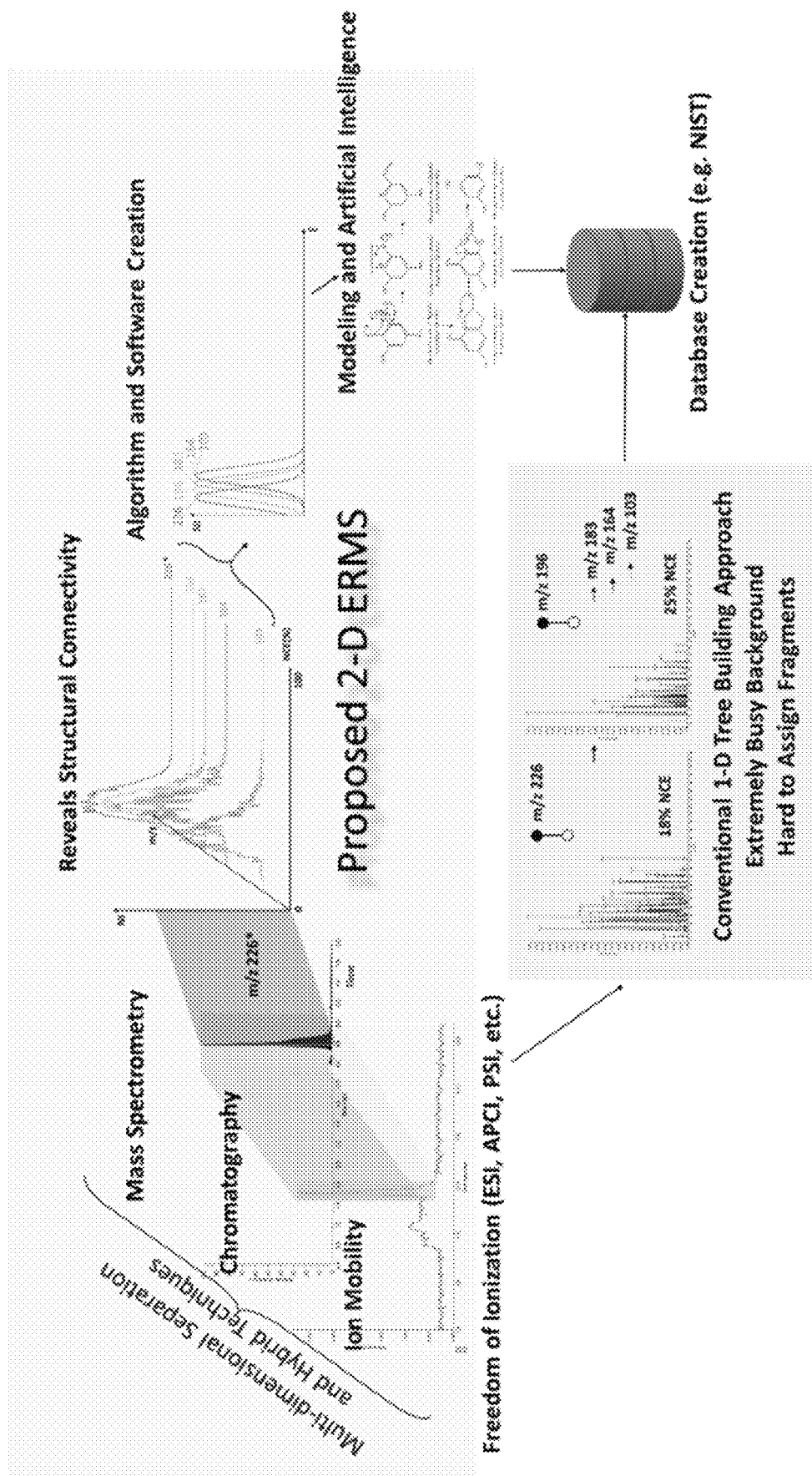
FIG. 1 illustrates a concept schematic according to an example embodiment.
Figure 2:
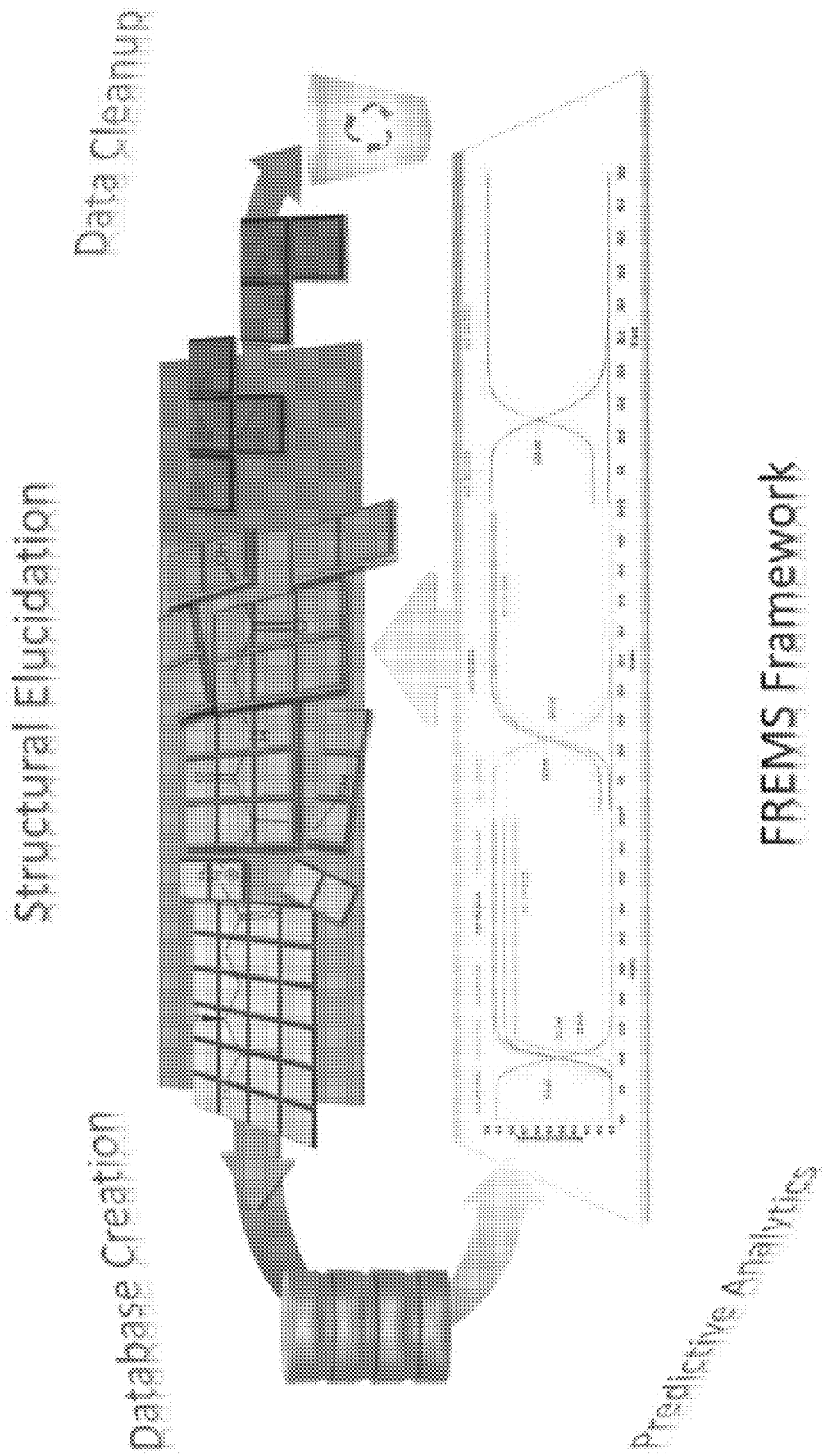
FIG. 2 illustrates structural elucidation according to an example embodiment.

Embodiments described herein comprise protocols for mass spectrometry (MS) which elucidates molecular identity and connectivity and the structure of analytes, and preferably facilitates separation of real from unrelated fragments. FREMS provides a solution for LC-MS because the ionization resulting from the introduction of the analyte into the mass spectrometer does not matter. The FREMS technology of the present invention preferably "erases" any attributes of the ionization process by selecting and monitoring the ion of interest exclusively inside the MS in a vacuum environment. Performing FREMS post-ionization enables common databases to be created. FREMS is applicable to small molecules but is particularly useful in examining large molecules such as polymers and biomolecules. FREMS can be used with instruments which can perform tandem MS (MS$^n$) experiments. This technique examines the extracted ion chromatograms and notes the energy or resonance frequency at which approximately half the molecules fragment, providing a critical value captured as FASO, m-SY, and/or C-1. Where product ions can be observed, their formation is preferably at the same rate as their assigned precursor. Where the formation curve of observed ions does not follow this rule, they either do not belong to that precursor or are an artifact or contamination. Application of these FREMS principles makes possible the creation of common LC-MS databases. Each MS class (for example, linear ion trap, triple quadruple MS, time-of-flight MS, Orbitrap, and FT-ICR) provides specific fragmentation patterns, but are not specific to a particular manufacturer; thus, common databases may be created for each MS class. Embodiments of the present invention are capable of working with instruments that vary the collision energy during multiple reaction monitoring experiments, which are most commonly high-end LC-MS instruments, for example triple quadrupole, quadrupole time-of-flight, linear ion traps-Orbitraps, and quadrupole-Orbitraps. Schematics of the concept of the present invention and structural elucidation using the present invention are shown in FIGS. 1-2.

In some embodiments, the methodology preferably comprises the following steps:
1. Collect a full scan and choose the parent peak
2. Do a product ion scan and collect ionization breakdown and formation curves in at least three replicates, preferably six or more.
3. Ions which exhibit no formation curve or a formation curve which is repeated only a few cycles (not in all replicates) are impurities or artifacts and should be disregarded. What remains are the true fragments of the parent ion. These are entered into the database for future cross-identification.

The exact FREMS protocol depends on the type of mass spectrometer being used. Trap-type mass spectrometers will require multiple trapping experiments, but analysis of resulting data is straightforward. Time-of-flight or quadrupole mass spectrometers collect all data in a single experiment, but resulting data must be de-convoluted. The difference arises due to how fragmentation is accomplished in each. Ion trap instruments (e.g. linear ion traps) rely on resonance frequency to activate fragmentation. Once an ion of the desired m/z is selected, its fragmentation is governed by a very specific RF frequency. The RF frequency which causes an ion to vibrate and collide with an inert gas (e.g. helium) is specific to that ion. The resulting fragments do not respond to the same RF frequency and, thus, do not breakdown further, no matter how much more external energy is applied. Therefore, fragmentation of the initially selected ion produces only "primary fragments." In beam-type instruments, e.g. triple quadrupole, q2 or HCD cell, ions are fragmented via collisions with an inert gas as they are accelerated by increasing voltage. This means that their subsequent fragments can affect and dissociation of the precursor ion and its fragments and their fragments occur.

Because the FREMS procedure of the present invention preferably takes place inside a vacuum environment, the results for a particular mass spectrometer are highly reproducible. Multi-stage ion trap experiments allow the analyst to perform data cleanup and concentrate on only relevant fragments, tremendously simplifying structural elucidation and identification. Because FREMS uses a "continuous" energy dimension, unlike existing methods which are based on a single energy level, common libraries can be created.

Regardless of the mass spectrometer design, only sigmoidal and Gaussian shape curves are possible. Therefore, only a "picture" likeness (sigmoidal or Gaussian curves) of collected data needs to be compared to the one stored in the FREMS database to make unbiased and informed decisions. Because FREMS decouples the ionization process from the vacuum environment, highly reproducible data can be collected. Each type of mass spectrometer, e.g. triple quadrupole, q-ToF, LTQ-Orbitrap, etc., can be used to create its own common library, and make it cross-brand applicable. Thus the present invention will bring GC-MS type library capabilities to LC-MS that will greatly impact current structural elucidation and database creation capabilities.

EXAMPLES

Example 1

Figure 3:
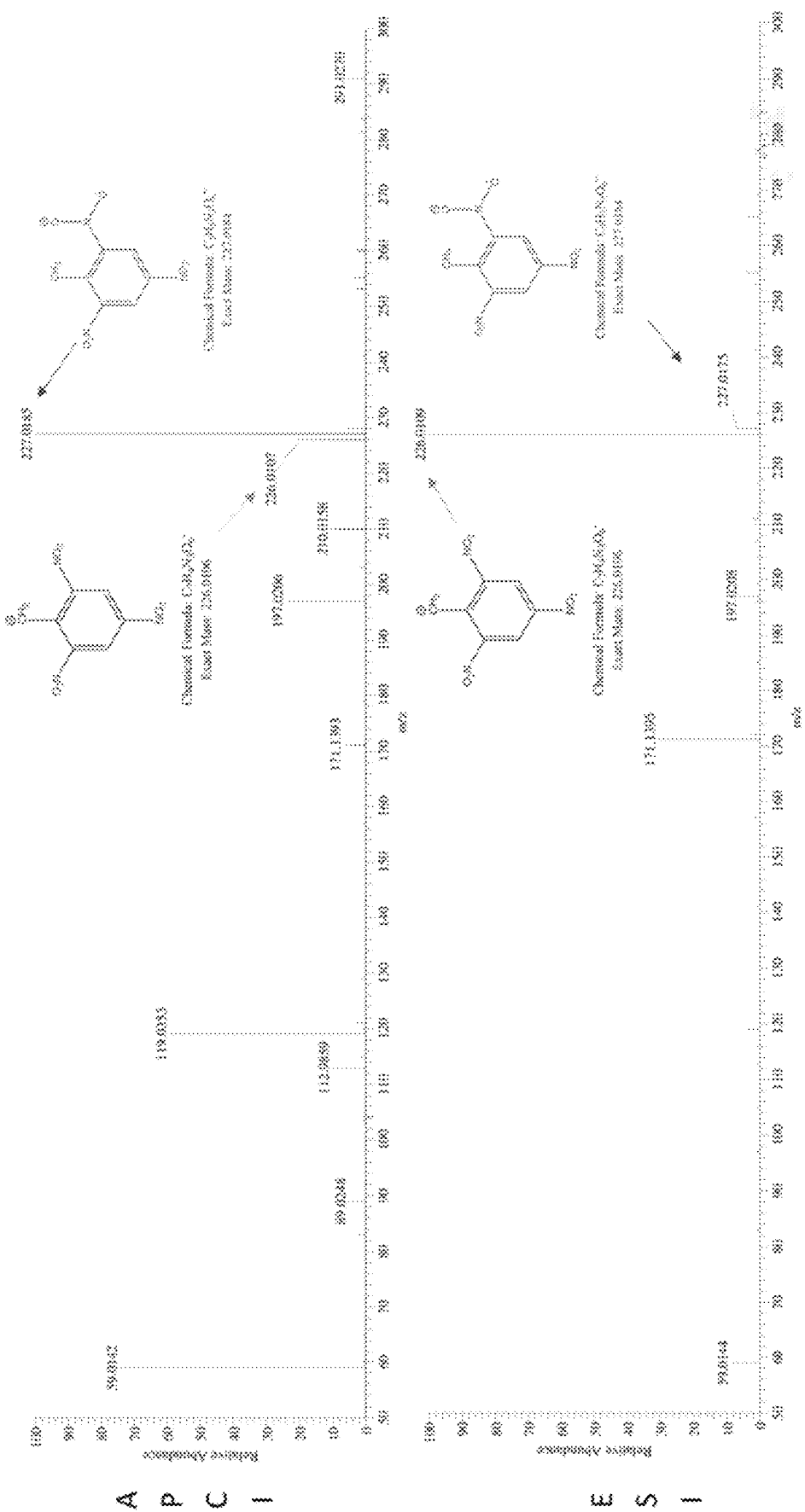
FIG. 3 illustrates mass spectrometry (MS) scans of trinitrotoluene (TNT) which was ionized using atmospheric pressure chemical ionization (APCI) (top scan) and electrospray ionization (ESI) (bottom scan) according to an example embodiment.

MS scans of trinitrotoluene (TNT) which was ionized using atmospheric pressure chemical ionization (APCI) and electrospray ionization (ESI) are shown in FIG. 3. Typical MS libraries work by matching the stored data with that of the user. But the top picture indicates the parent compound is m/z 227.0175, while the bottom picture indicates the parent is m/z 226.0109. Furthermore, there are other ions present, especially in the top picture. These may or may not be present in every user's data because they reflect conditions in the lab where the measurements were performed, indicating contamination of the solvent by that specific instrument. A MS instrument manufacturer does not know what form of ionization the analyst will use, the temperature or humidity present in the laboratory, or any contamination issues in solvent or instruments. Since all of these are unknowns, the manufacturer cannot make a common library. However, using the FREMS methodology of the present invention, the peaks at 227.0184, 226.0106, 210.0158, and 197.0207 can be identified as the only real peaks; all the others are artifacts. This enables creation of libraries independent of instrument or laboratory.

Example 2

Figure 4:
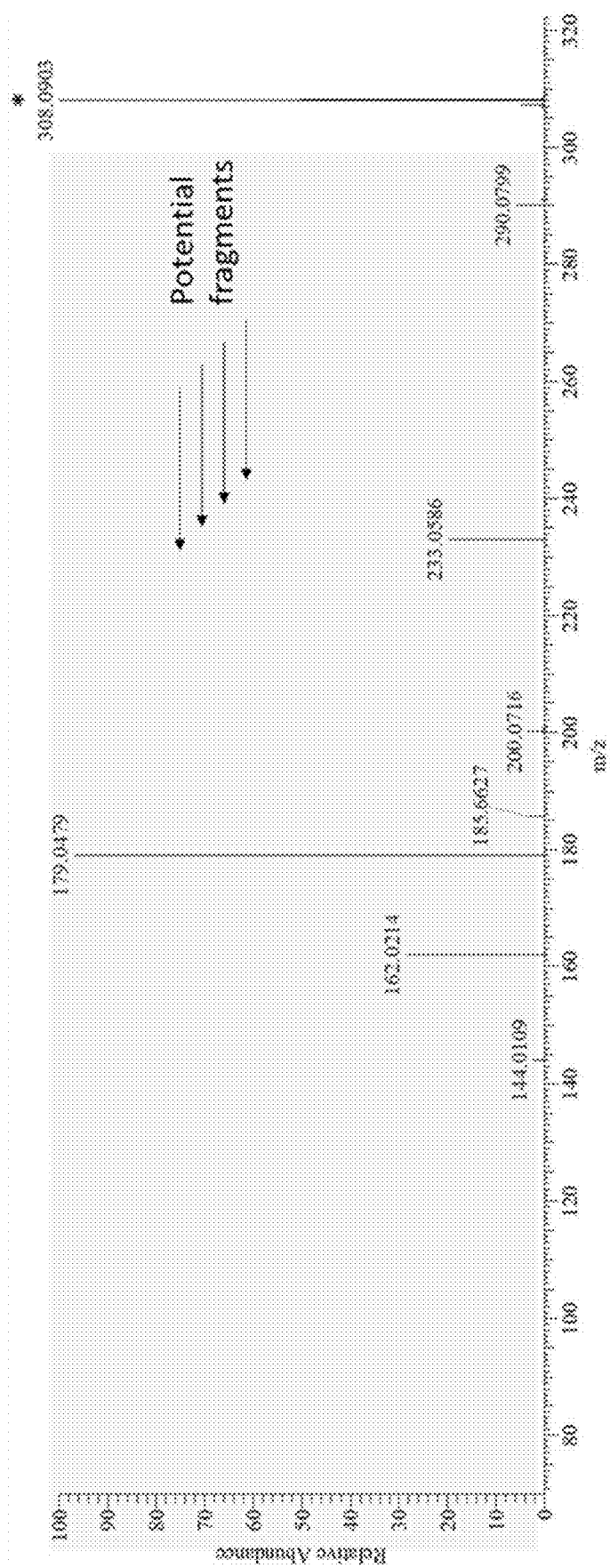
FIG. 4 illustrates mass spectra generated by a Thermo Fisher linear ion trap-Orbitrap MS (raw data output) according to an example embodiment.
Figure 5:
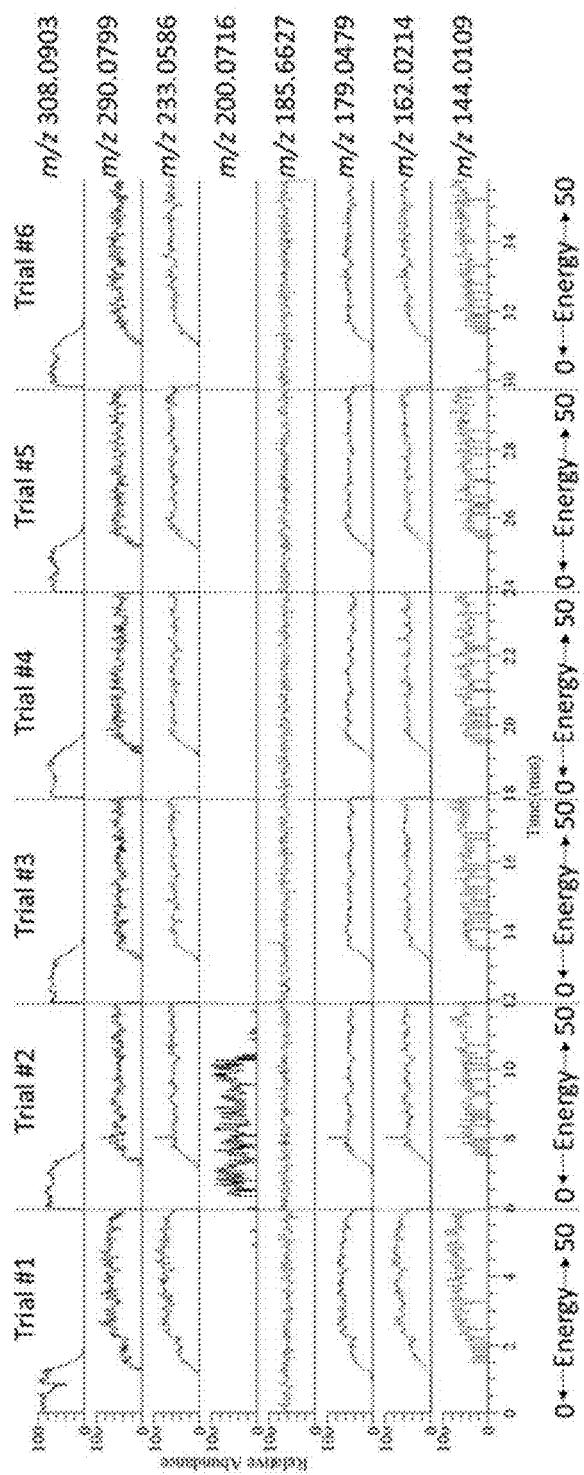
FIG. 5 illustrates a sigmoidal curve analysis of the mass spectra of FIG. 4 with "continuous" energy dimension according to an example embodiment.
Figure 6:
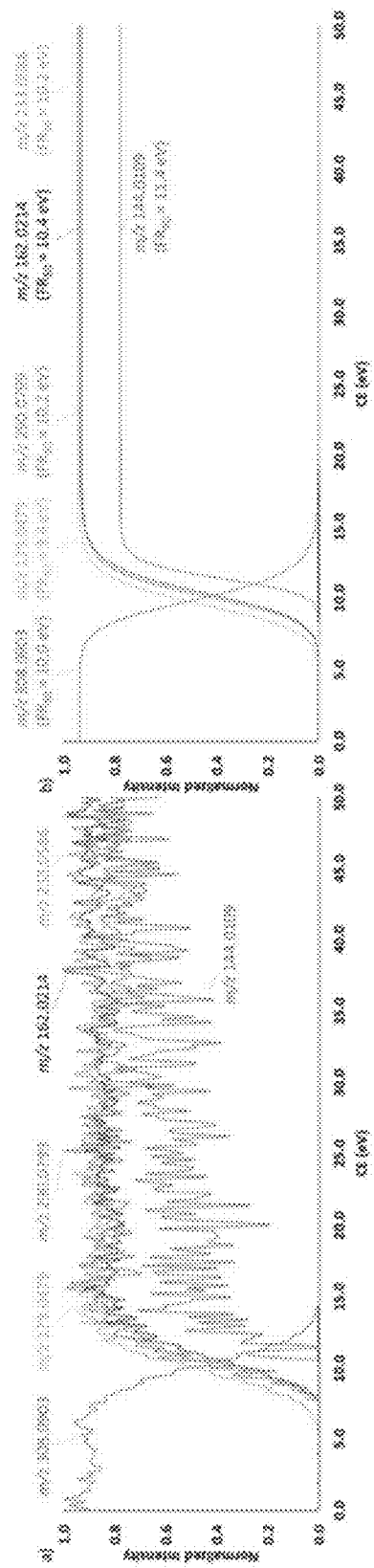
FIG. 6 illustrates FREMS sigmoidal curve analysis of the mass spectra of FIG. 4 with averaged (a) and modeled (b) data according to an example embodiment.

FIG. 4 shows mass spectra generated by a trap-type Thermo Fisher linear ion trap-Orbitrap MS (raw data output). FIG. 5 shows a sigmoidal curve analysis with "continuous" energy dimension. FIG. 6 shows the FREMS sigmoidal curve analysis with averaged (a) and modeled (b) data. The top trace in FIG. 5, m/z 308.0903, represents the breakdown curve of the ion of interest (precursor). As the energy is increased with time (x-axis), the analyte is starting to fragment and completely disappears. In this example, the experiment has been repeated six times to accumulate more signal and decrease the noise. The traces below the precursor ion are "suspected" fragments. The ion of interest breakdown rate and its true fragment(s) formation rate should be the same. Under that principle the fragment at 200.0716 and 185.6627 are anomalies. The fragment at 144.0109 is a true fragment, but not a primary fragment. It would rightly show up in the library of spectra for this compound, but designating it as a secondary or tertiary fragment greatly aids structural elucidation. This type of data cleanup is not available to current methods of structural elucidation, and unique to the FREMS framework of the present invention.

Example 3

Figure 7:
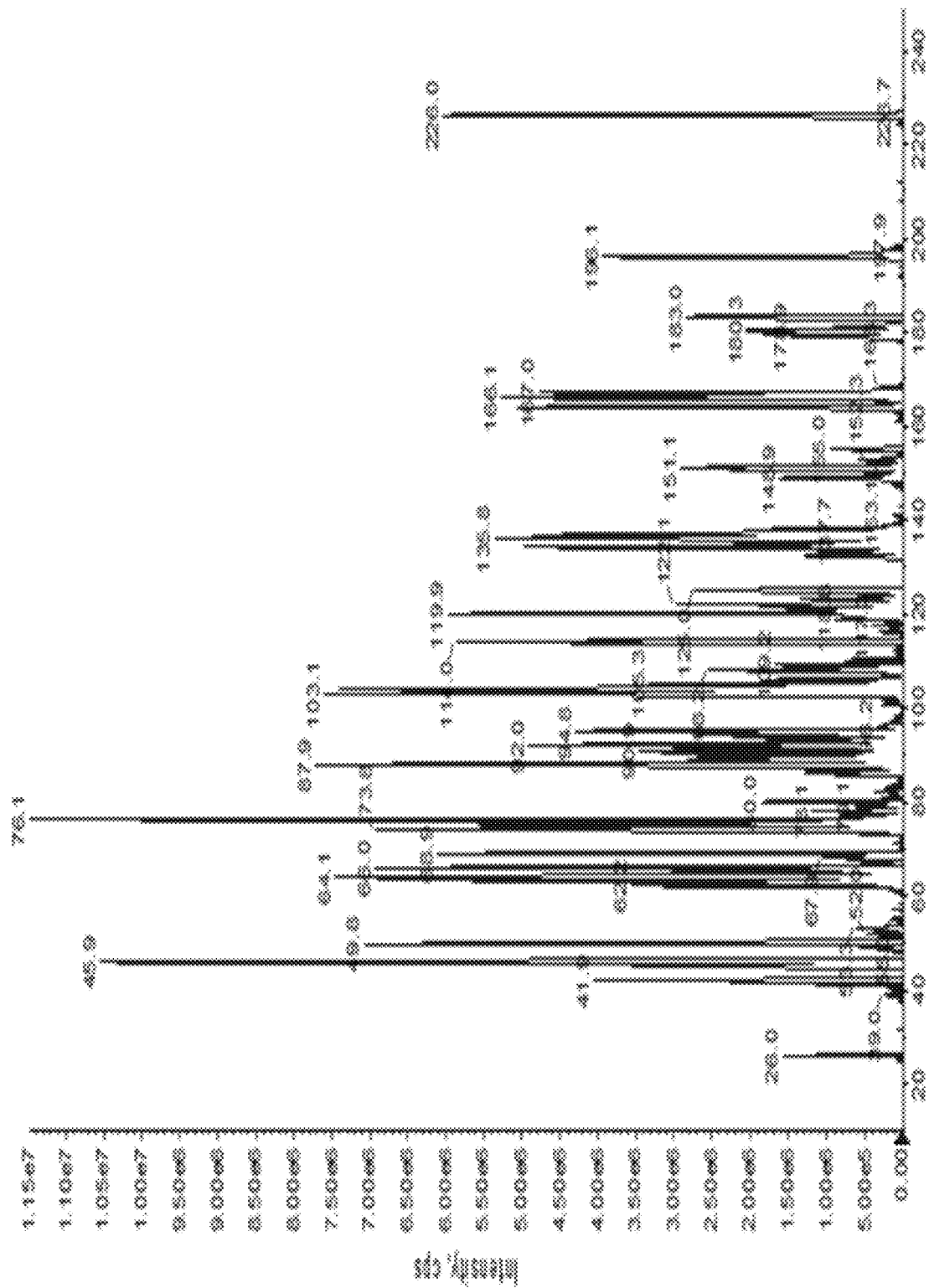
FIG. 7 illustrates mass spectra generated by a Sciex Qtrap 5500 triple quadrupole MS according to an example embodiment.
Figure 8:
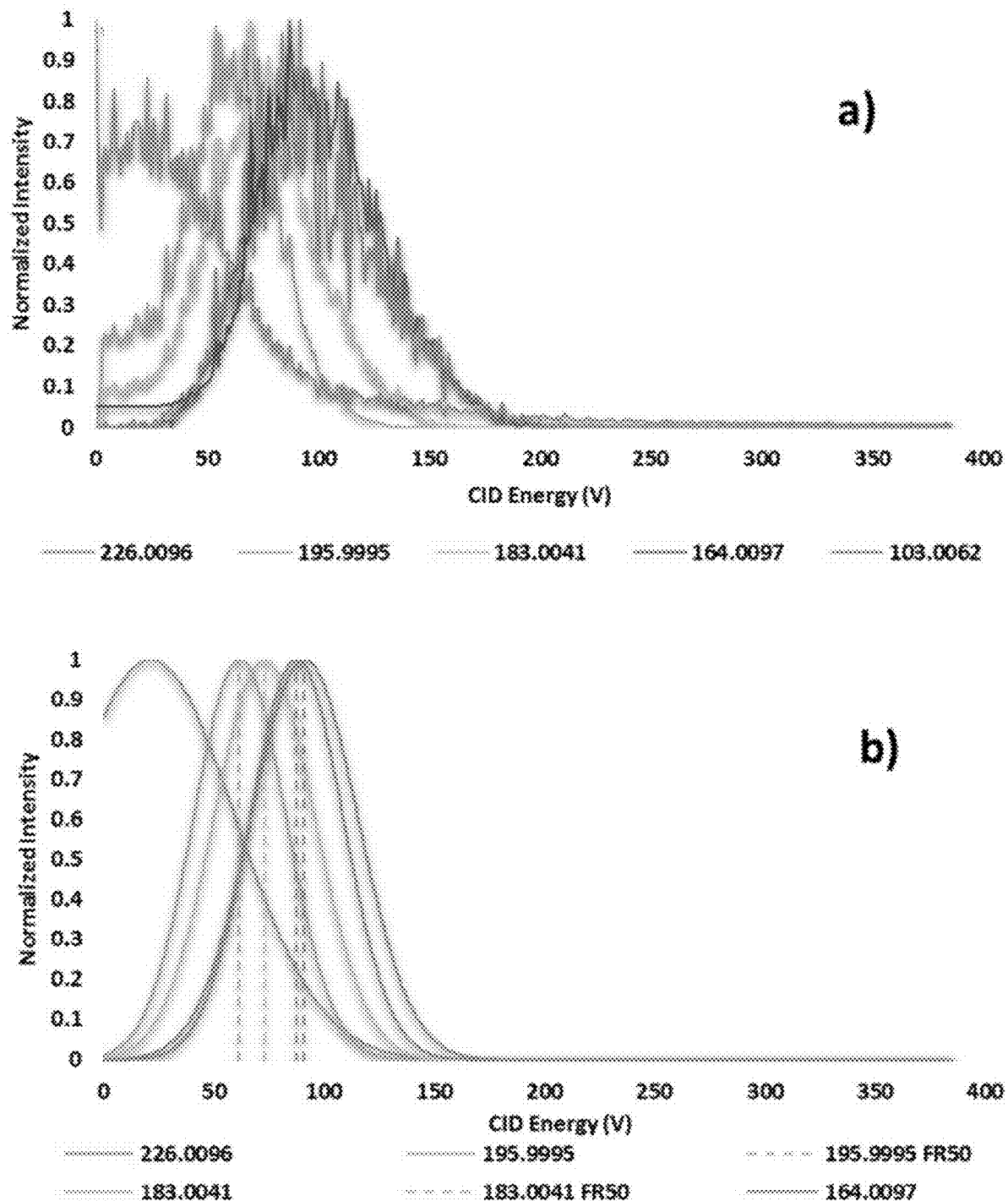
FIG. 8 illustrates a FREMS Gaussian curve analysis with "continuous" energy dimension of the mass spectra of FIG. 7 with actual (a) and modeled (b) data according to an example embodiment.

FIG. 7 shows mass spectra generated by a beam-type Sciex Qtrap 5500 triple quadrupole MS. FIG. 8 shows a FREMS Gaussian curve analysis with "continuous" energy dimension. In beam-type instruments, the increase in collision energy will initiate the fragmentation of not only the precursor ion but also its fragments and its fragments' fragments, etc. The resulting breakdown curves are Gaussian in shape because ions are first formed and then also fragmented. The FREMS relationship between a real fragment and the precursor ion can be traced from the apex (inflection point) of the formation curve to the right shoulder of the precursor ion trace. As can be more easily observed from the modeled traces shown in FIG. B(b), m/z 196 is formed directly from m/z 226; m/z 183 is formed from m/z 196; and m/z 164 and m/z 103 are formed from m/z 183. This shows how a single stage FREMS framework reveals a continuous correlation of precursor→primary fragment→secondary fragment, etc. relationships using a beam-type instrument.

Figure 9:
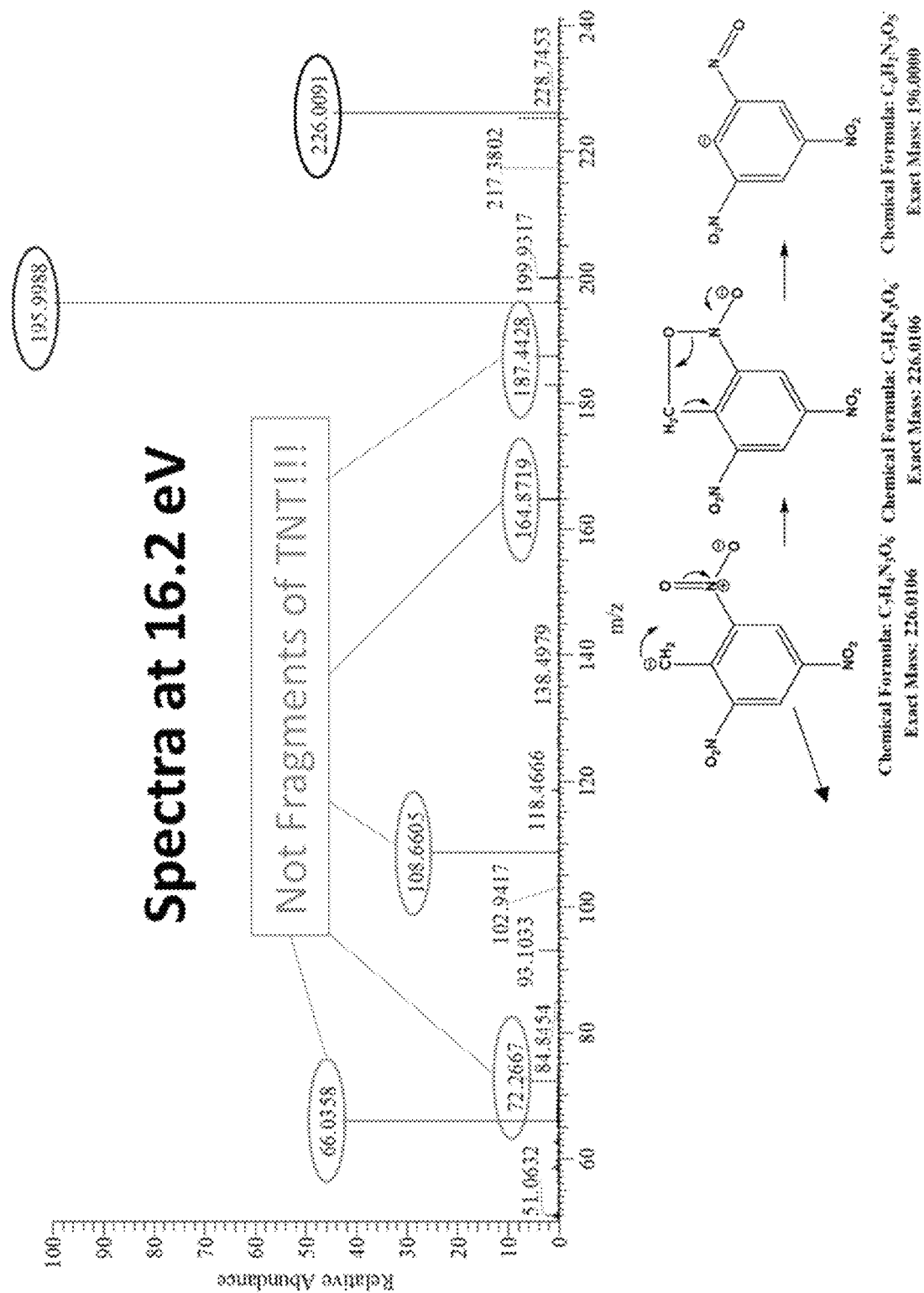
FIG. 9 illustrates spectras and chemical formulas for TNT according to an example embodiment.

FIG. 9 illustrates spectras and chemical formulas for TNT according to an example embodiment. People run liquid chromatography-mass spectrometric (LC-MS) samples for a number of reasons. LC is used because their sample came in a liquid matrix or was extracted into a liquid matrix or because their sample was not sufficiently volatile to allow it to flow through a gas chromatography (GC).

The FREMS method does not depend on the use of a LC on the front end. LC-MS instruments allow the user to use the LC or not.

The operator uses MS either to (1) identify an unknown; (2) assess purity of a sample; (3) ascertain that the right compound is present; or (4) investigate potential decomposition pathways of an analyte.

Therefore, in approaching MS with a sample dissolved in a solvent (a solvent appropriate for MS), the operator will do a full-scan at a set impact energy to observe the m/z of ions present (see above). While it is possible that z may be greater than 1, usually z is 1 in small molecules so that m is indicative of the atom present. The operator's chemical intuition will suggest if z>1 is possible.

In the MS of FIG. 9, FREMS has already be used to identify m/z ions which do not come from TNT, but without FREMS, the operator may spend much time trying to make all these pieces fit in the TNT puzzle. The drawing shows the type of answer an operator using FEMS may devise. Without FREMS guidance he may assess the decomposition pathway incorrectly—as some have.

Figure 10:
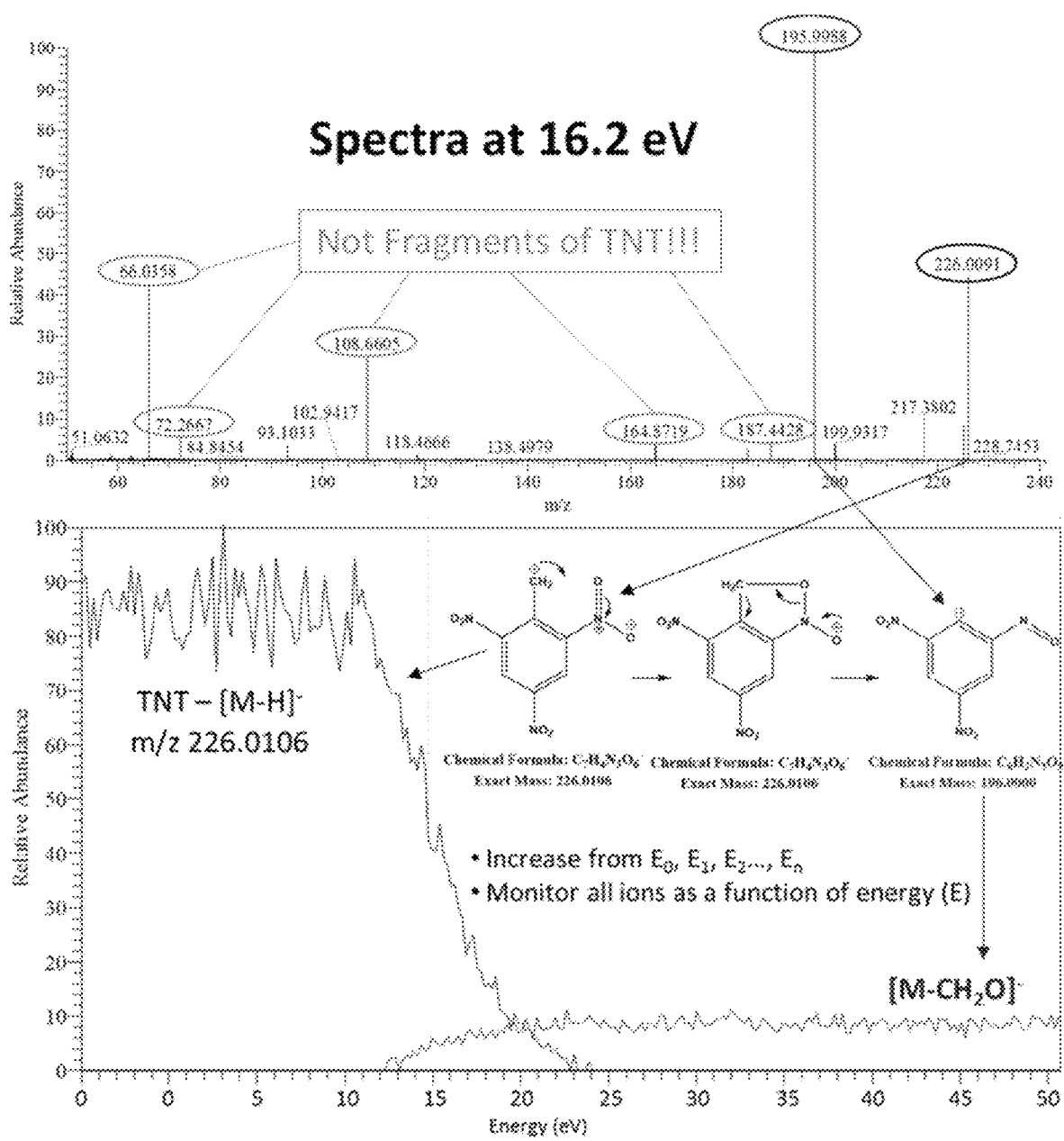
FIG. 10 illustrates spectras, chemical formulas, and survival yield (SY) for TNT according to an example embodiment.

FIG. 10 illustrates spectras, chemical formulas, and survival yield (SY) for TNT according to an example embodiment. Energy Resolved Mass Spectrometry (ERMS) is a field of MS that studies impact of external energy deposition on ions via collision-induced dissociation (CID, MS/MS) experiments.

Survival Yield (SY) is a method used for ERMS to quantification: Internal energy estimations (e.g. systems, methods, analytes); analyte discrimination & characterization. SY uses the equation below.

$$SY = \frac{I_p}{I_p + \sum I_{f,i}}$$

$I_p$ = Intesity of Precursor $I_f$ = Intensity of Fragment

The differences between SY and FREMS are (1) SY only uses a few impact energies and these are not applied in any organized fashion; (2) SY makes no attempt to sort out the false fragments of the parent ion; (3) SY does not normalize fragment signals to that of the parent and thus misses important information about their formation.

Figure 11:
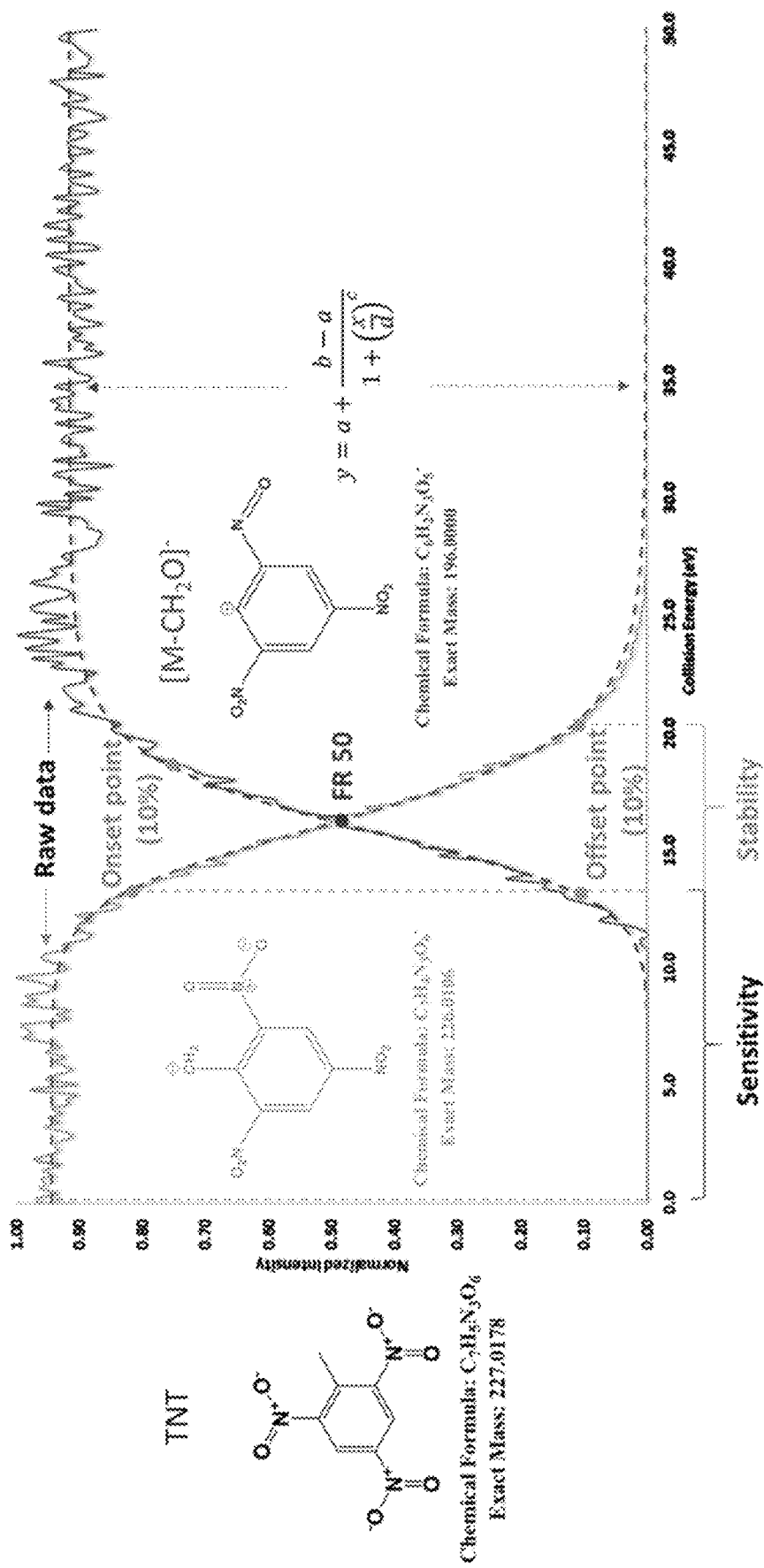
FIG. 11 illustrates FREMS applied to raw data according to an example embodiment.

FIG. 11 illustrates Fragmentation Resilience Energy MS (FREMS) steps 2-5 applied to raw data according to an example embodiment. Step 2 Trap the parent ion, e.g. 226 (note: there is still sample flowing though the trap but only the parent ion is targeted.). Step 3. Begin at breakdown energy 0 eV for first 15 scans–collect baseline (helps with data fitting). Step 4. 0.2 eV steps for each scan event from 0 eV to 50 eV collecting 265 data points per curve=high resolution. Step 5. Look at the detection signs for each of the apparent fragments.

Figure 12:
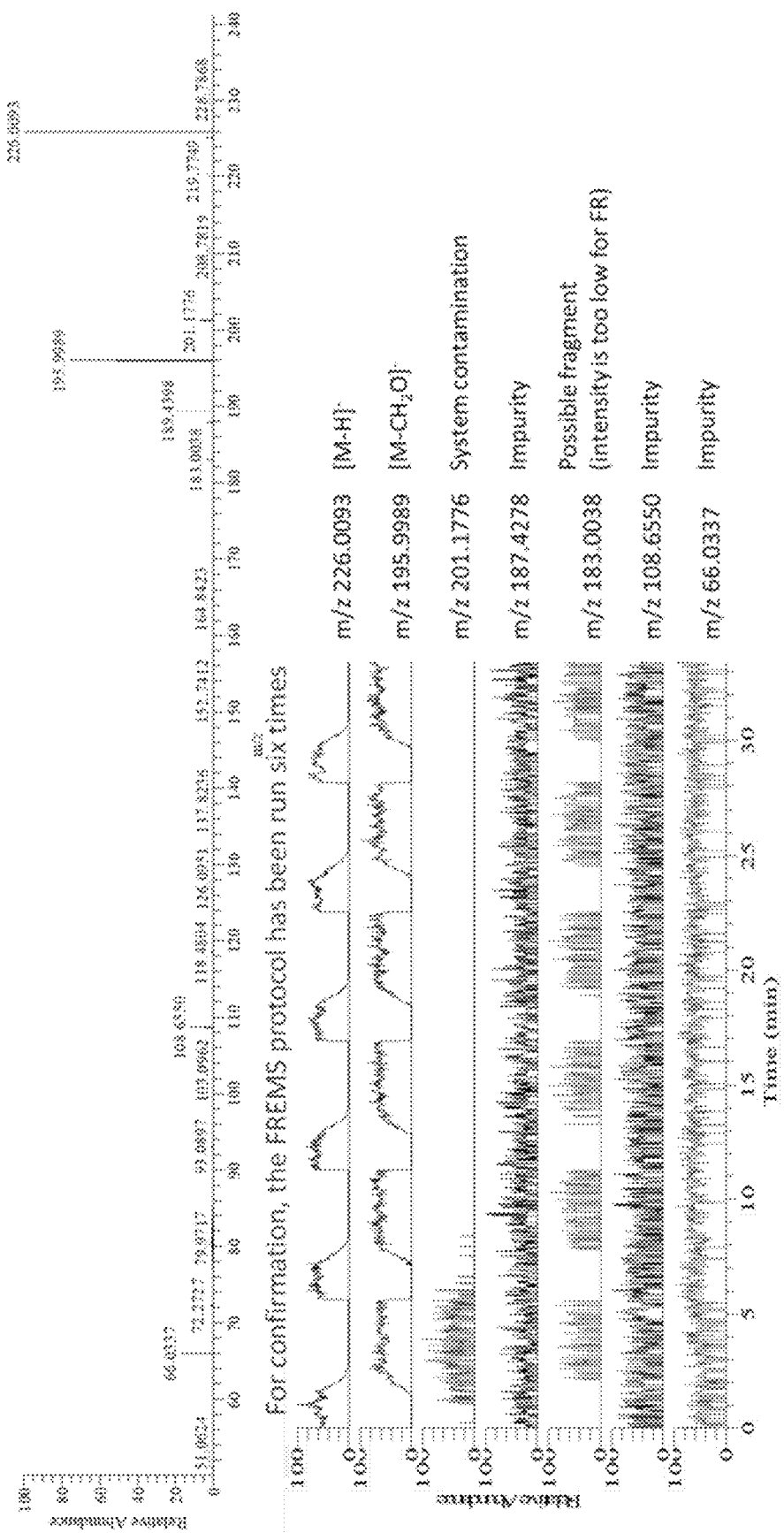
FIG. 12 illustrates FREMS protocol run six times for a mass spectrum for fragmentation of a parent ion according to an example embodiment.

FIG. 12 illustrates FREMS protocol run six times for a mass spectrum for fragmentation of a parent ion according to an example embodiment. This is the mass spectrum for the fragmentation of the parent ion. It is called $MS^2$. For confirmation, the FREMS protocol has been run six times. At this point you may be finished with the MS and move data to a computer to process. Or if you are trying to track the fragmentation trail you continue.

Figure 13:
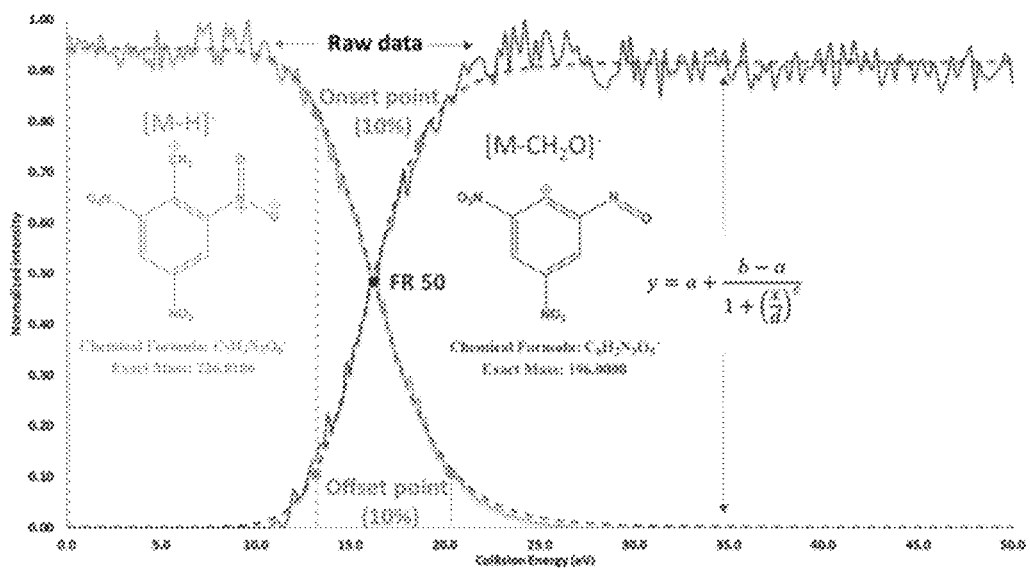
FIG. 13 illustrates determining intersection points of curves according to an example embodiment.
Figure 13:
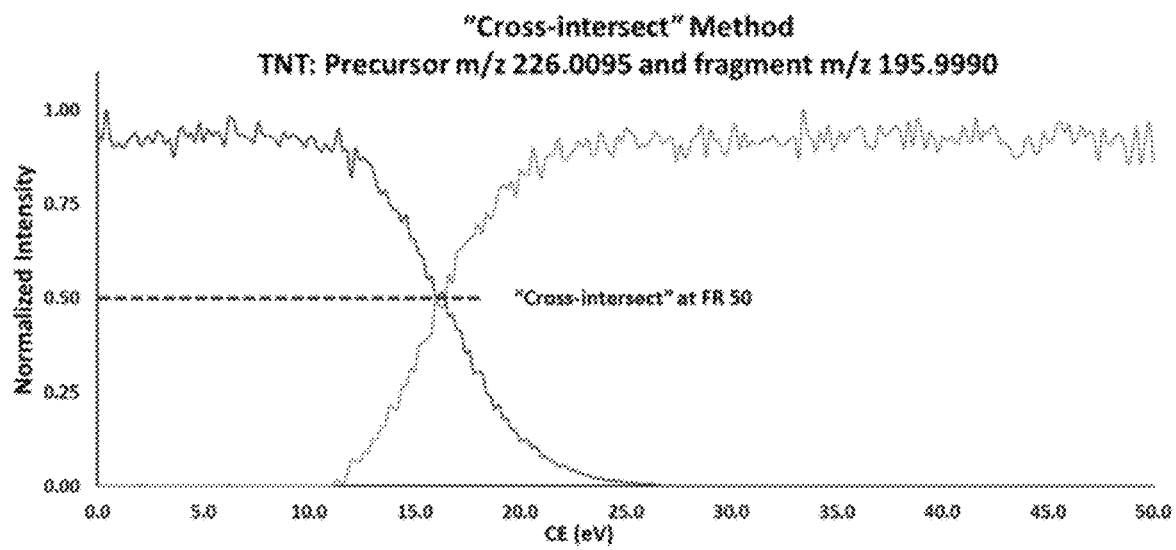

FIG. 13 illustrates determining intersection points of curves according to an example embodiment. Computer methods are used to normalize & smooth the curves. FR50, C-I & SY are determined. Examples include FR, C-I and modified SY. Cross-Intersect (C-I) is a non-statistical method detects intersection point of normalized precursor and fragments breakdown curves. C-I can quickly accomplish grouping of fragments based on their intersection values. C-I helps to identify a group of related fragments, especially useful if one of them is know for certain to belong to precursor.

Modified Survival Yield—first use either FR of C-I to eliminate all irrelevant ions and include all relevant fragments, then use the above equation for SY (function of $I_p$ and $I_f$).

FR, C-I and modified SY should produce the same values.

Figure 14:
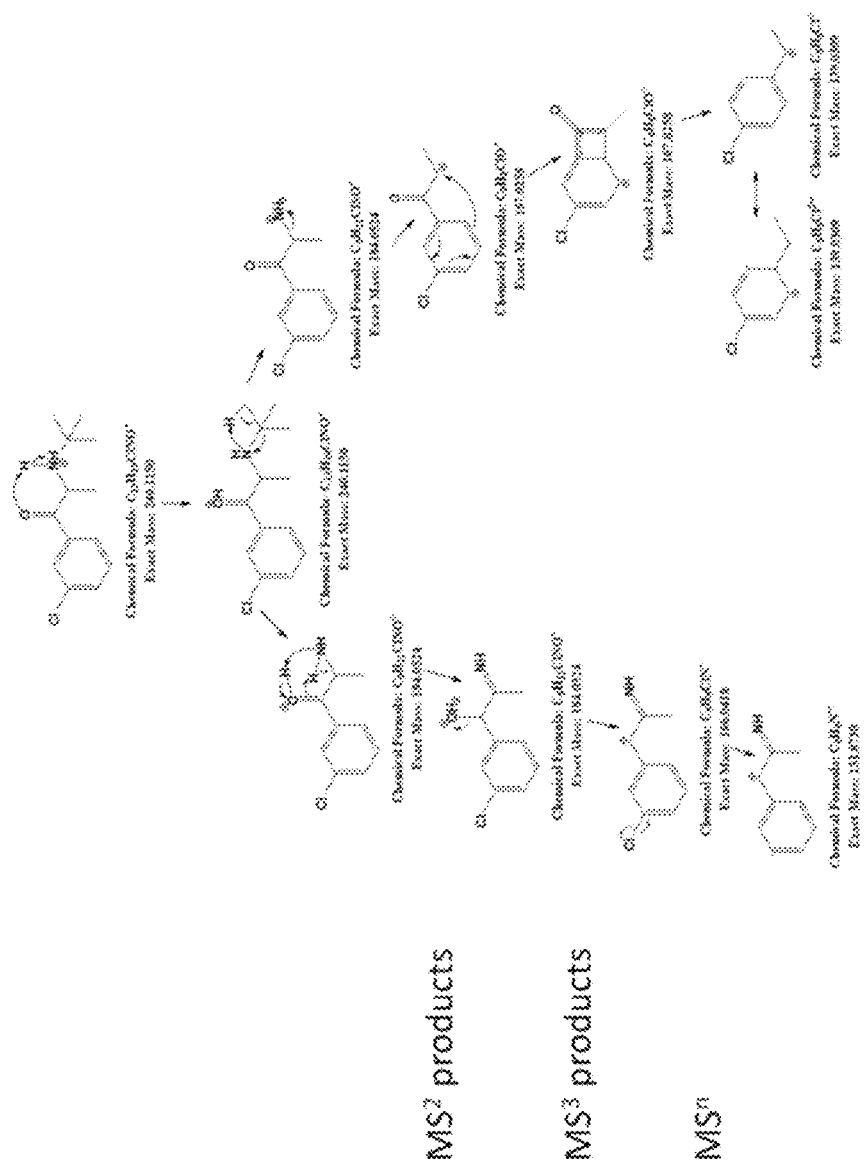
FIG. 14 illustrates application of multi-stage FREMS for structural elucidation according to an example embodiment.
Figure 14:
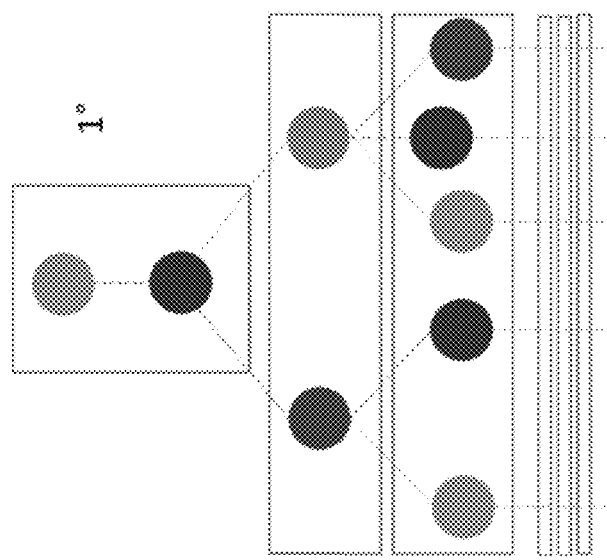

FIG. 14 illustrates application of multi-stage FREMS for structural elucidation according to an example embodiment. Each stage its own isolated experiment—a separate gas-phase test tube. Products from one stage produce the products for the next stage.

Figure 15:
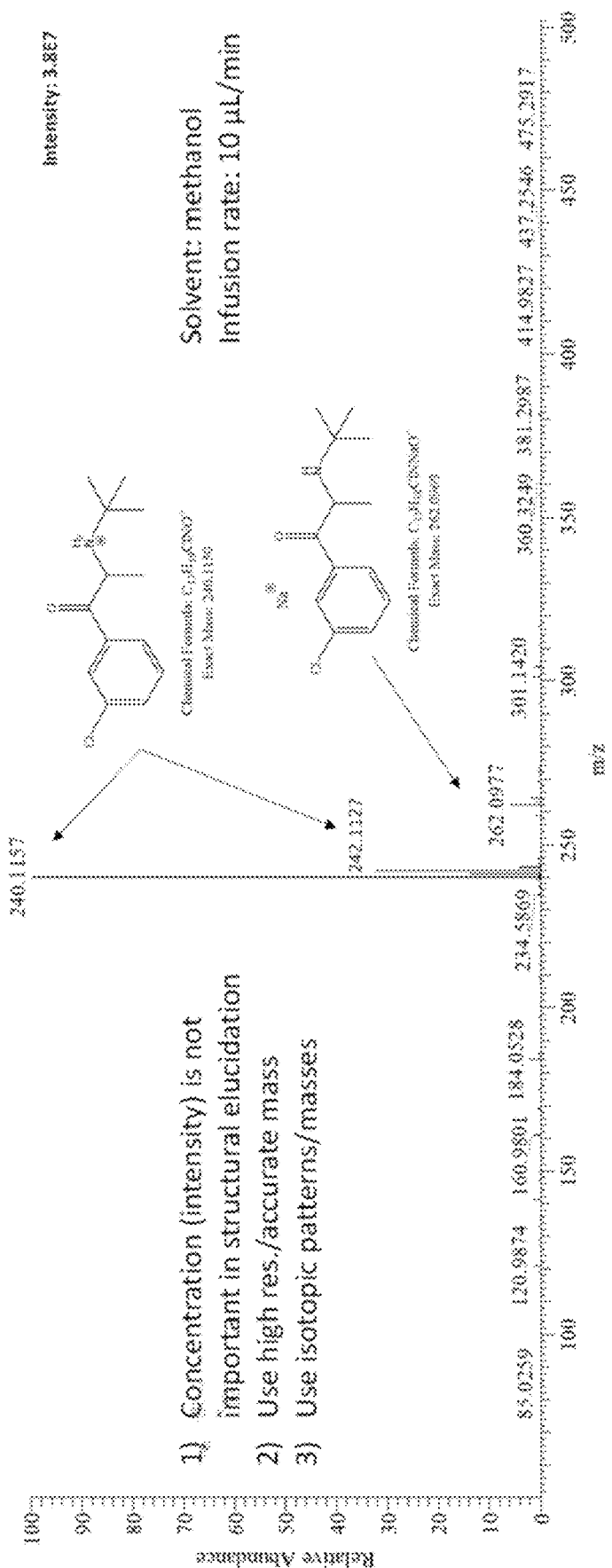
FIG. 15 illustrates structural elucidation of Bupriopion according to an example embodiment.

FIG. 15 illustrates structural elucidation of Bupriopion according to an example embodiment. The structural elucidation is using Bupriopion in ESI+, Full scan mode. This example contains chlorine (two different isotopes) so for every structure there will be one m/z with $^{35}Cl$ & one of smaller intensity with $^{37}Cl$. The m/z range is illustrated as 50-500. 1) Concentration (intensity) is not important in structural elucidation. 2) Use high res./accurate mass. 3) Use isotopic patterns/masses.

Figure 16:
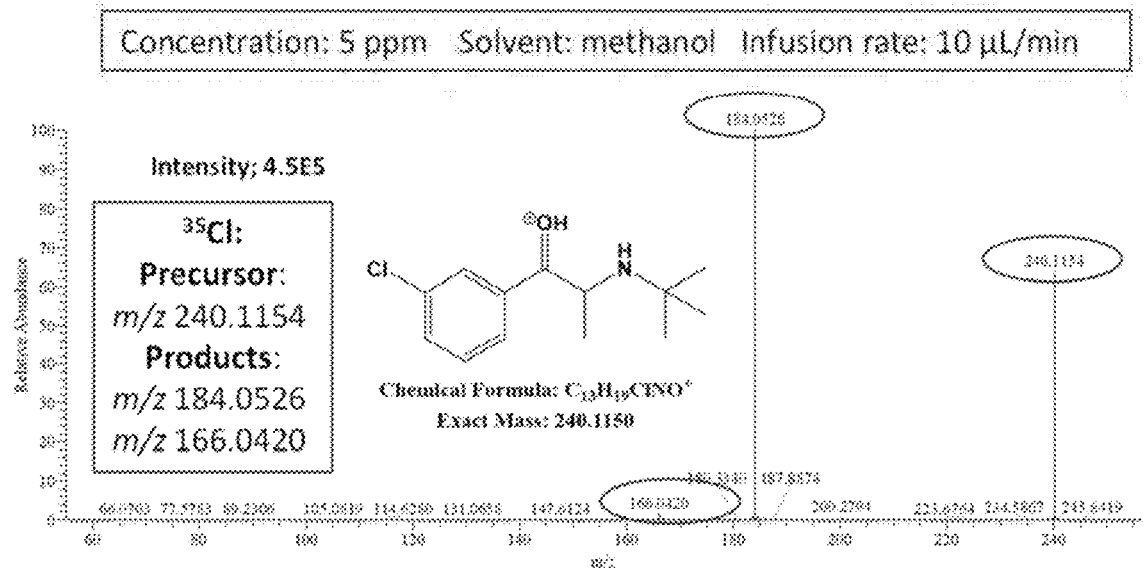
FIG. 16 illustrates trapping of parents for $^{35}Cl$ at $MS^2$ stage according to an example embodiment.
Figure 16:
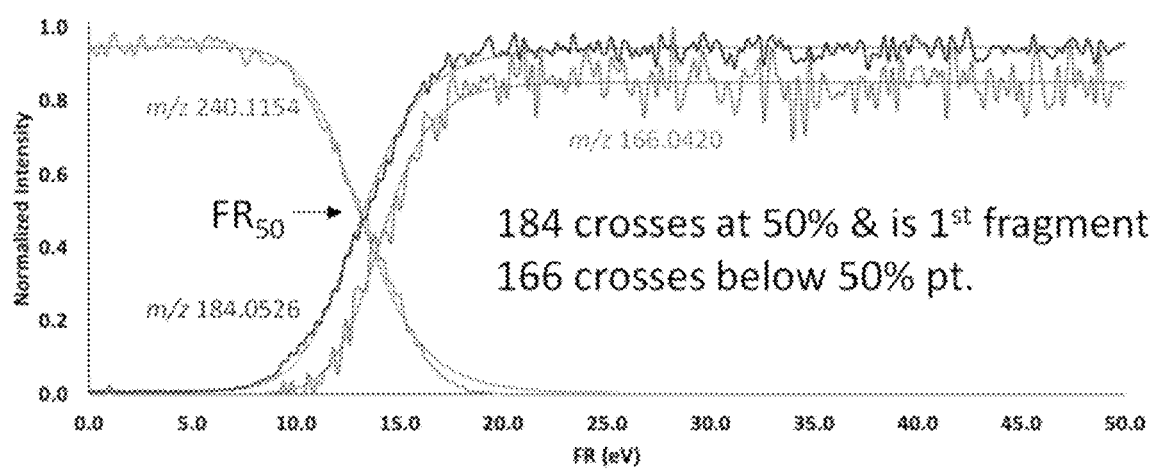

FIG. 16 illustrates trapping of parents for $^{35}Cl$ at $MS^2$ stage according to an example embodiment. The parents: m/z 240.1154 (FIG. 16) or 242.1120 (see FIG. 17, one for each Cl isotope). The Concentration: 5 ppm Solvent: methanol Infusion rate: 10 μL/min. The MS trace (above) and the signal (below) will appear on MS instrument. Normalizing the product signal and smoothing the outputs can be done on a computer elsewhere. m/z crosses below FR50 & mechanistically its formation doesn't work. This is leak-through—the ion is produced by secondary fragmentation from another fragment. An ion produced by leak-through will be present even at zero energy input in trapping next stage. 184 crosses at 50% & is 1st fragment. 166 crosses below 50% pt.

Figure 17:
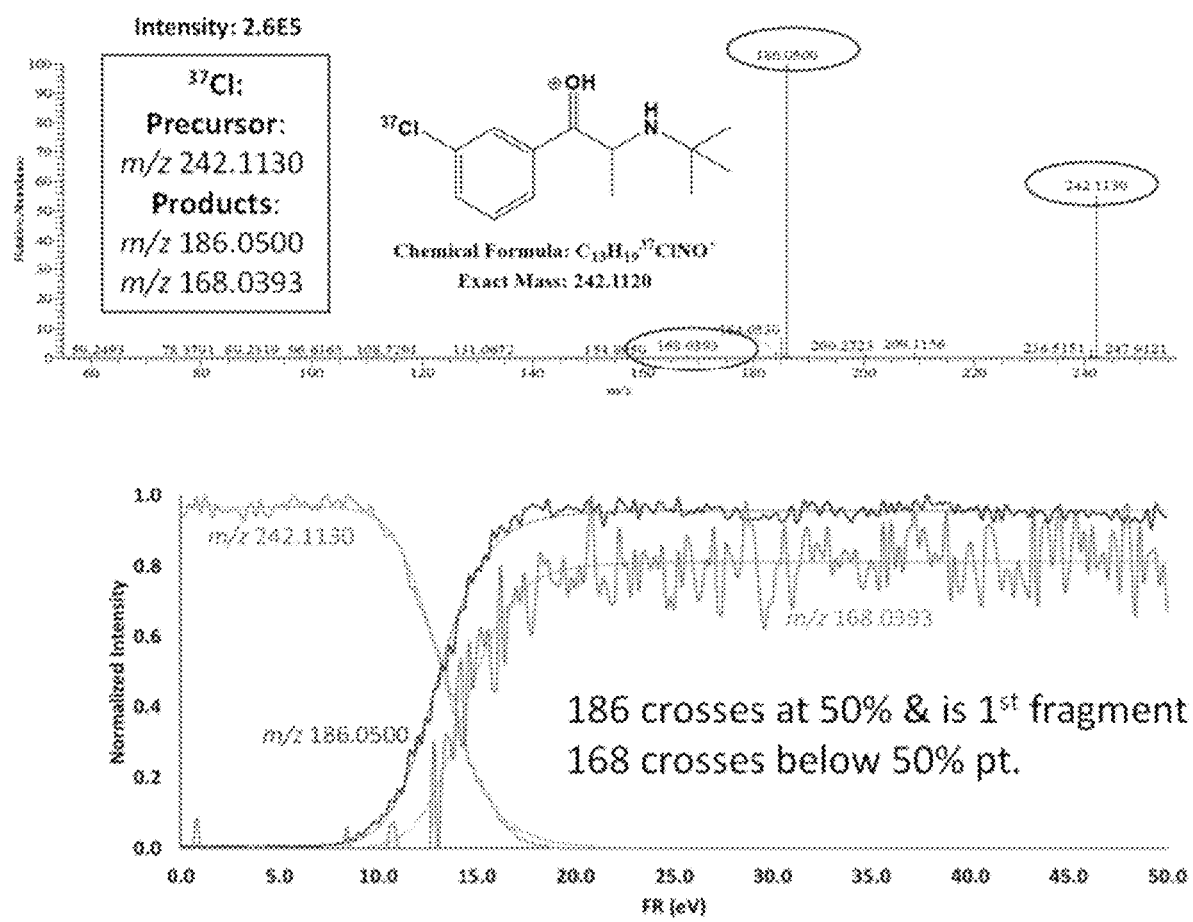
FIG. 17 illustrates trapping of parents for $^{37}Cl$ at $MS^2$ stage according to an example embodiment.

FIG. 17 illustrates trapping of parents for $^{37}Cl$ at $MS^2$ stage according to an example embodiment. Similar to FIG. 16, but for another isotope of Cl. 186 crosses at 50% & is 1st fragment. 168 crosses below 50% pt.

Figure 18:
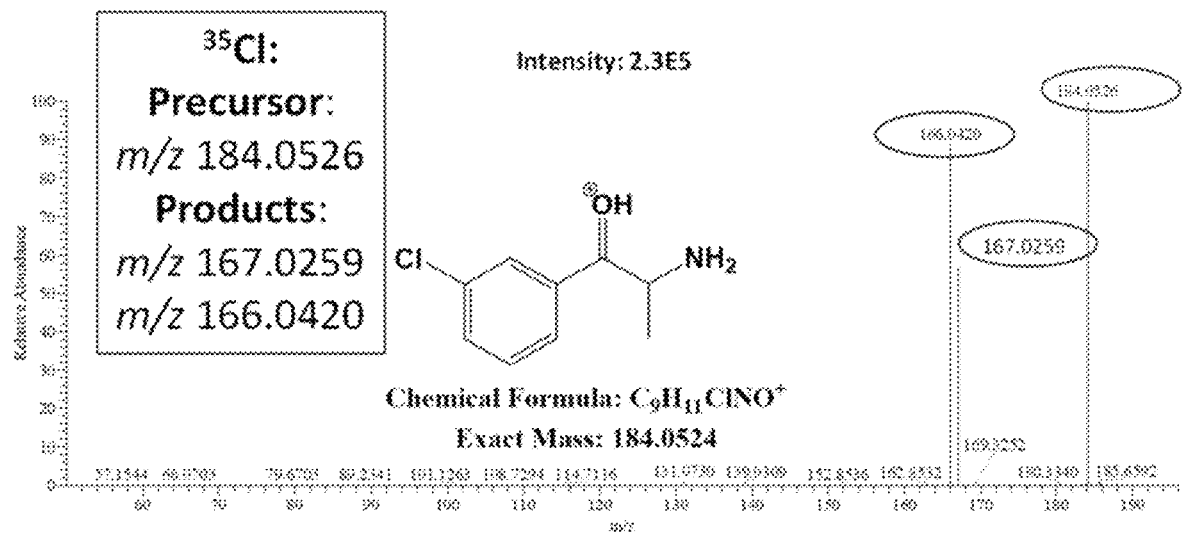
FIG. 18 illustrates averaged spectra of $MS^3$ stage for $^{35}Cl$ according to an example embodiment.
Figure 18:
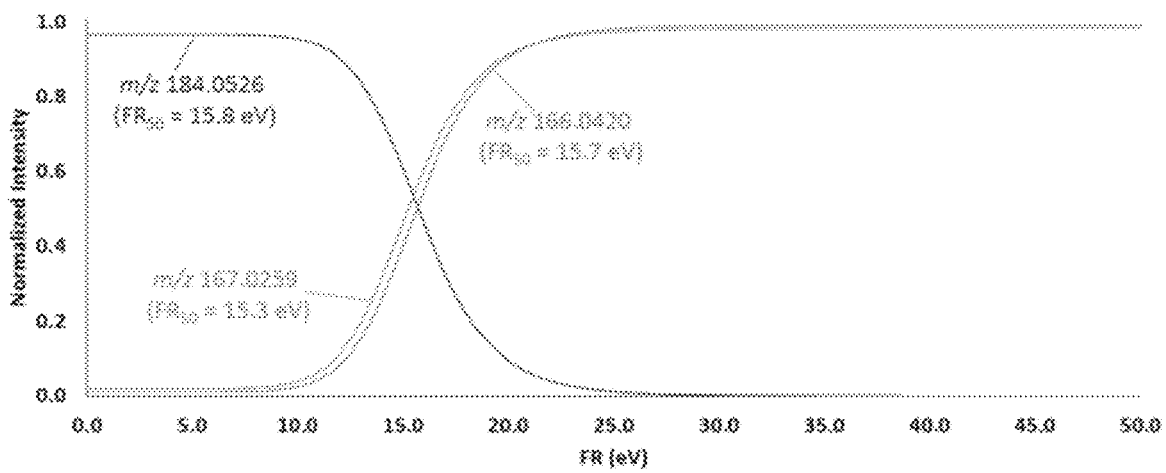

FIG. 18 illustrates averaged spectra of $MS^3$ stage for $^{35}Cl$ according to an example embodiment. From the m/z of 240 to 184. $^{35}Cl$: Precursor: m/z 184.0526; Products: m/z 167.0259, m/z 166.0420. We indeed observe m/z 166.0420 and 168.0393 with their corresponding precursor ions, thereby confirming leak through effect.

Figure 19:
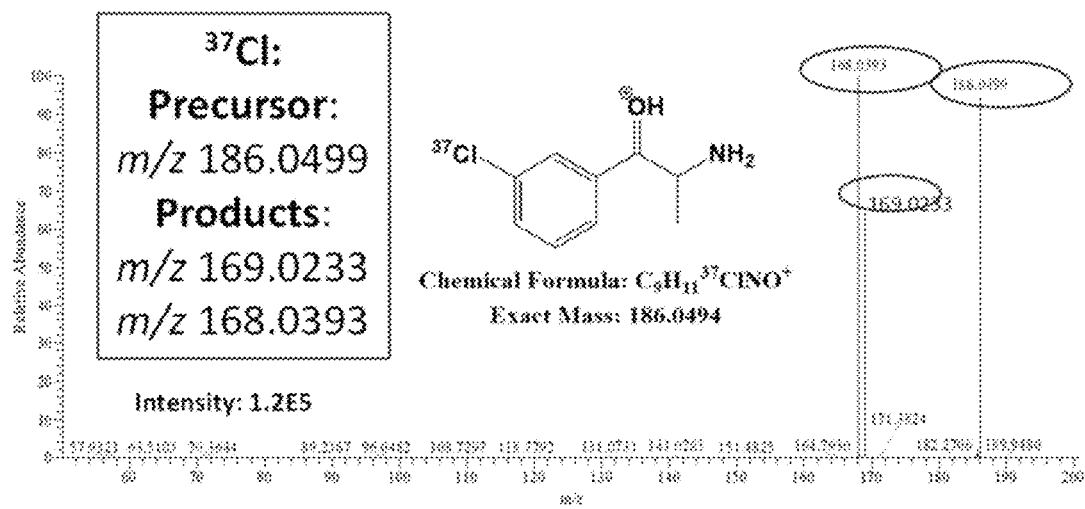
FIG. 19 illustrates averaged spectra of $MS^3$ stage for $^{37}Cl$ according to an example embodiment.
Figure 19:
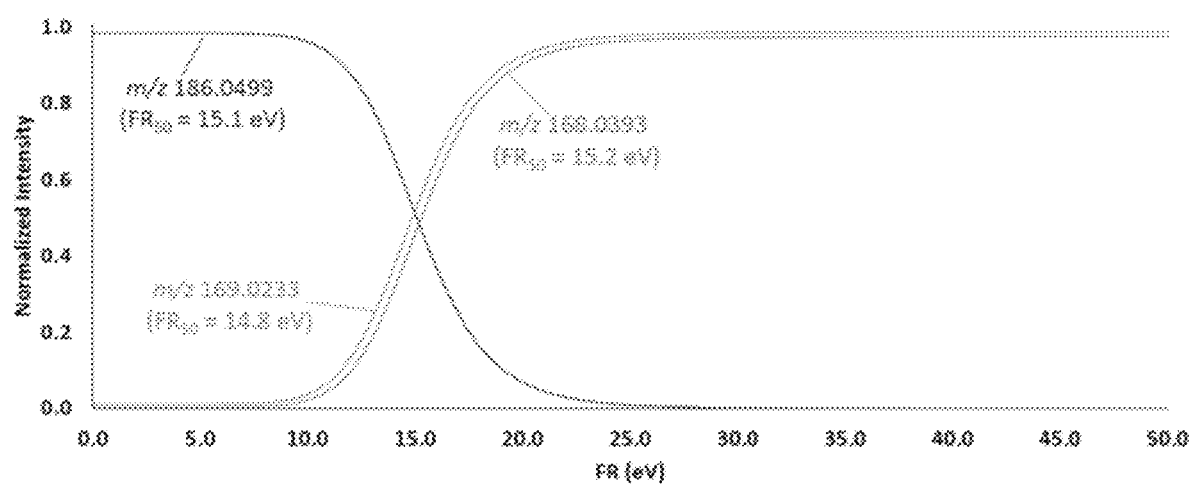

FIG. 19 illustrates averaged spectra of $MS^3$ stage for $^{37}Cl$ according to an example embodiment. $^{37}Cl$: Precursor: m/z 186.0499; Products: m/z 169.0233, m/z 168.0393. Comparing with FIG. 18, FREMS shows m/z 166.0420 and 168.0393 are even at zero energy input.

Figure 20:
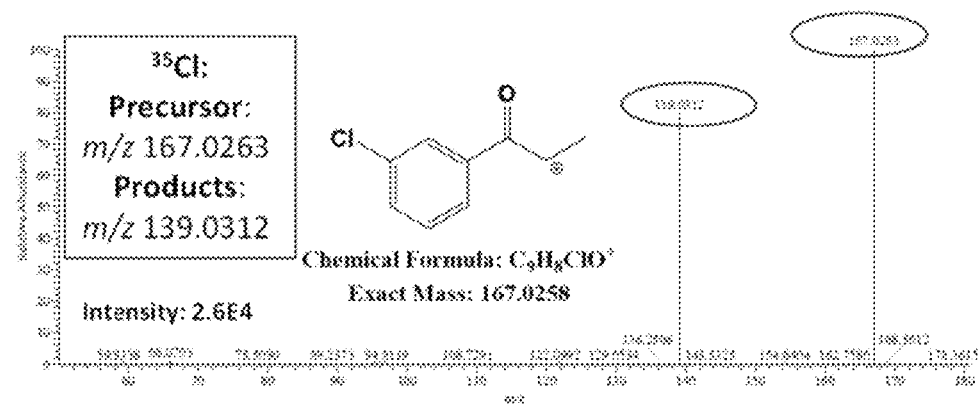
FIG. 20 illustrates averaged spectra of $MS^4$ stage for $^{35}Cl$ according to an example embodiment.
Figure 20:
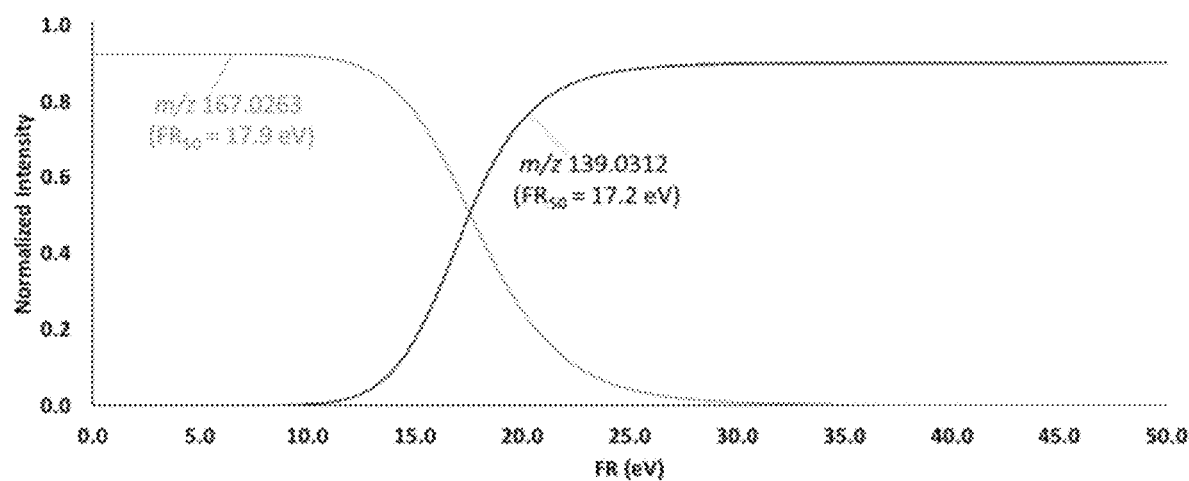

FIG. 20 illustrates averaged spectra of $MS^4$ stage for $^{35}Cl$ according to an example embodiment. This stage involves trapping m/z 167-averaged spectra of MS4 stage—m/z 240 to 184 to 167 (branch #1). Earlier $FR_{50}$'s are observed for both isotopic peaks: suspected radical or rearrangement mechanism.

Figure 21:
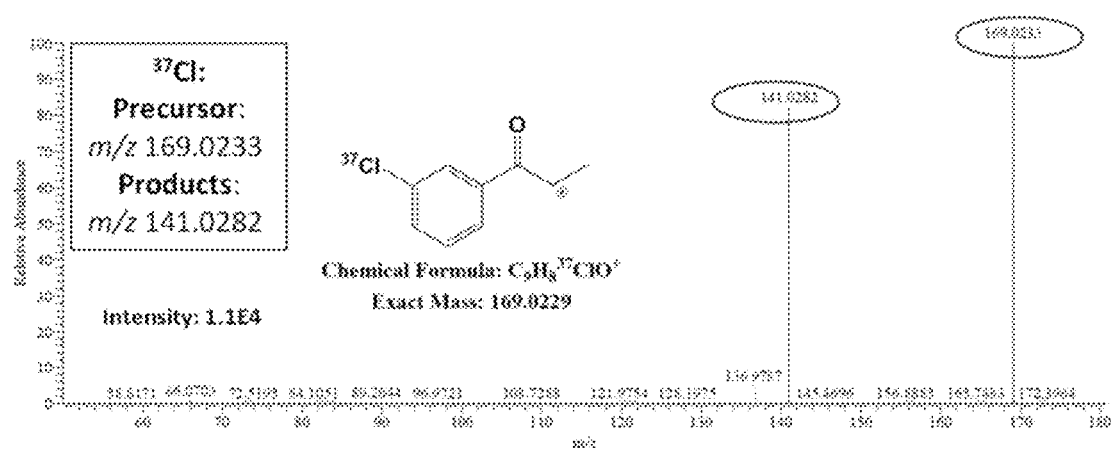
FIG. 21 illustrates averaged spectra of $MS^4$ stage for $^{37}Cl$ according to an example embodiment.
Figure 21:
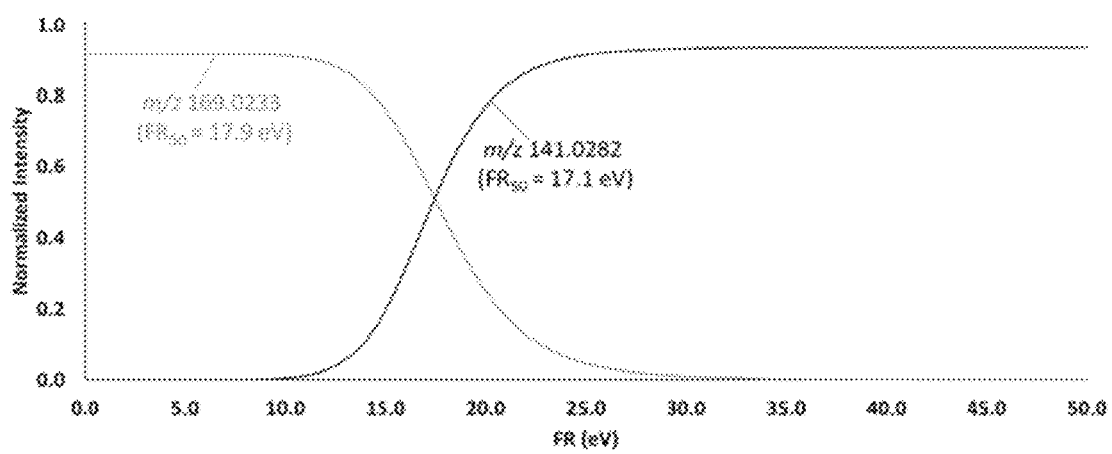

FIG. 21 illustrates averaged spectra of $MS^4$ stage for $^{37}Cl$ according to an example embodiment. Similar to FIG. 20, this stage involves trapping m/z 167-averaged spectra of MS4 stage—m/z 240 to 184 to 167 (branch #1). Earlier FR50's are observed for both isotopic peaks: suspected radical or rearrangement mechanism.

Figure 22:
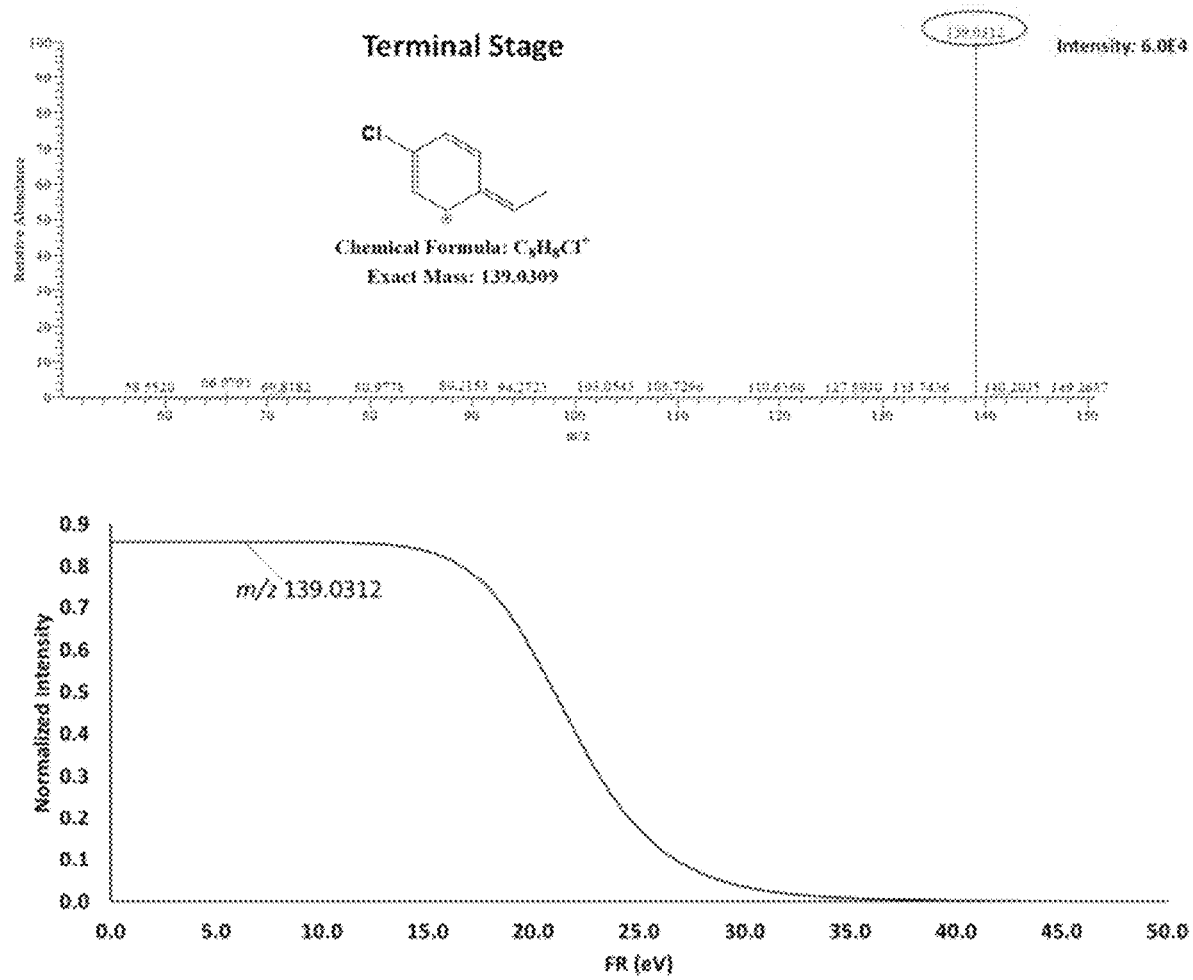
FIG. 22 illustrates averaged spectra of $MS^5$ stage according to an example embodiment.

FIG. 22 illustrates averaged spectra of $MS^5$ stage according to an example embodiment. When m/z 139 is trapped, no product ions are seen. This is the last stage $MS^5$—m/z 240 to 184 to 167 to 139 (branch #1). No other fragments above m/z 50 were observed. The same was true for isotopic peak, m/z 141.0282. Because there are no fragments—only Fragmentation Resilience method can be used for this stage.

Figure 23:
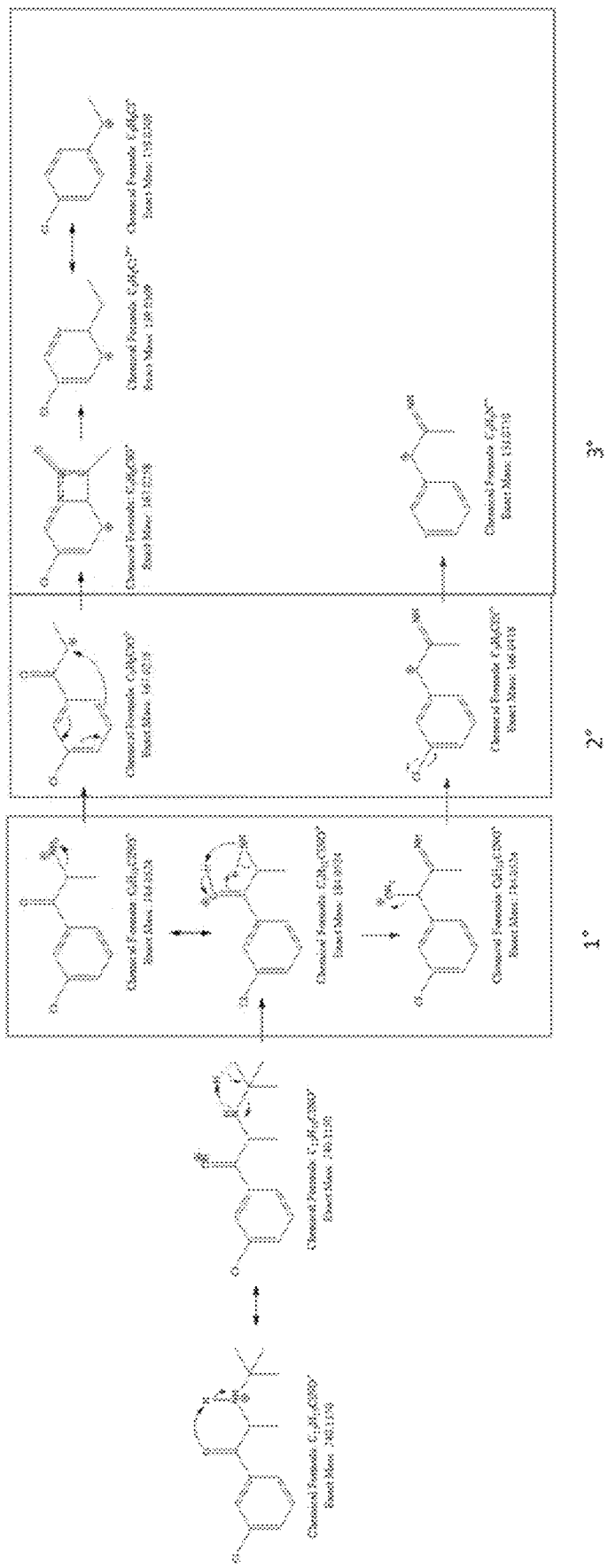
FIG. 23 illustrates a proposed mechanism based on FREMS according to an example embodiment.

FIG. 23 illustrates a proposed mechanism based on FREMS according to an example embodiment. A chemical formula and mass of a compound is shown changing or fragmenting at different stages as part of the FREMS technique.

Figure 24:
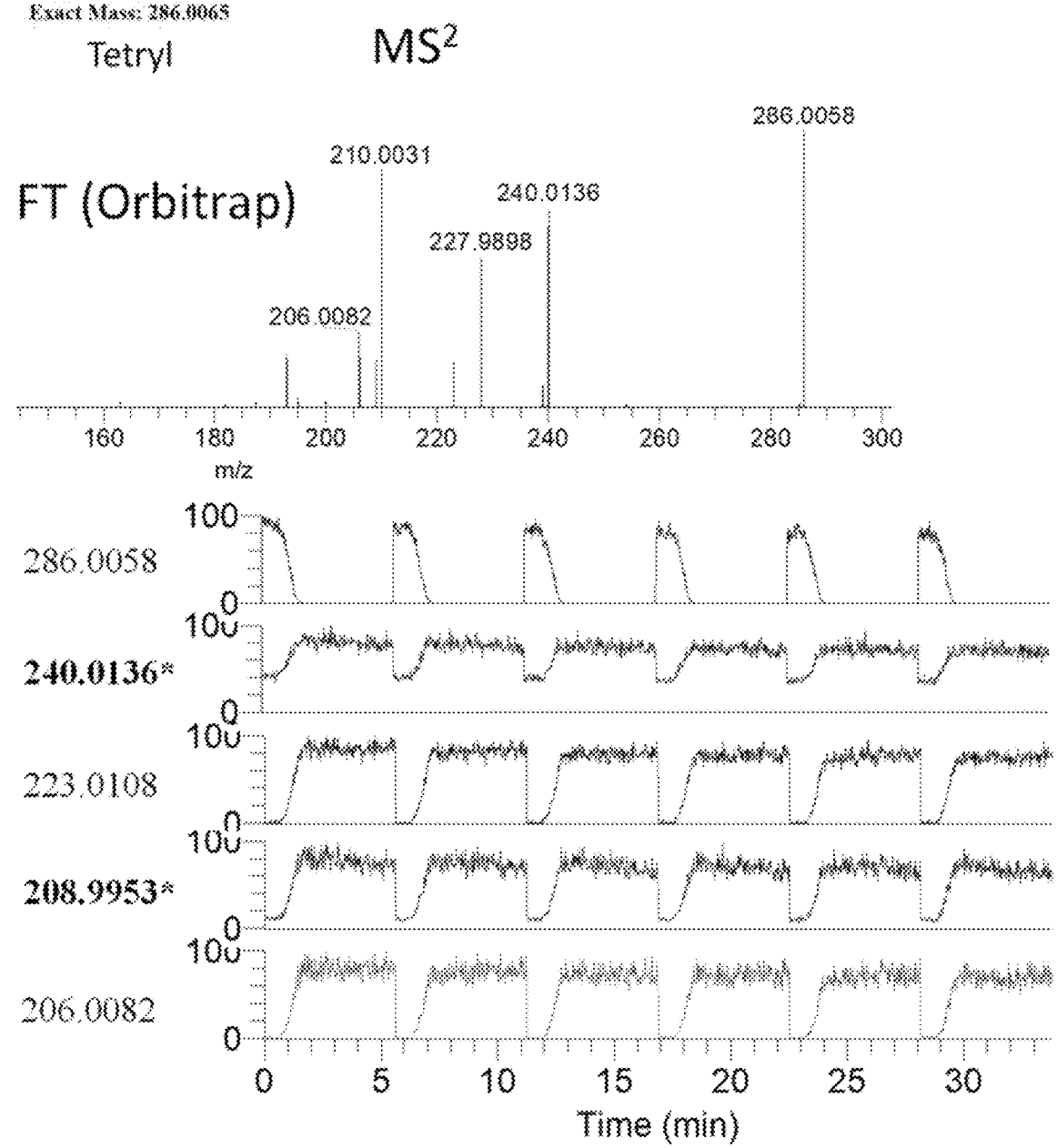
FIG. 24 illustrates FREMS application to $MS^2$ stage on an Orbitrap instrument according to an example embodiment.

FIG. 24 illustrates FREMS application to $MS^2$ stage on an Orbitrap instrument according to an example embodiment. The FREMS method can be applied to nominal (e.g., FT Orbitrap) as well as accurate mass instruments (e.g., IT Faraday), as shown in FIG. 25.

Figure 25:
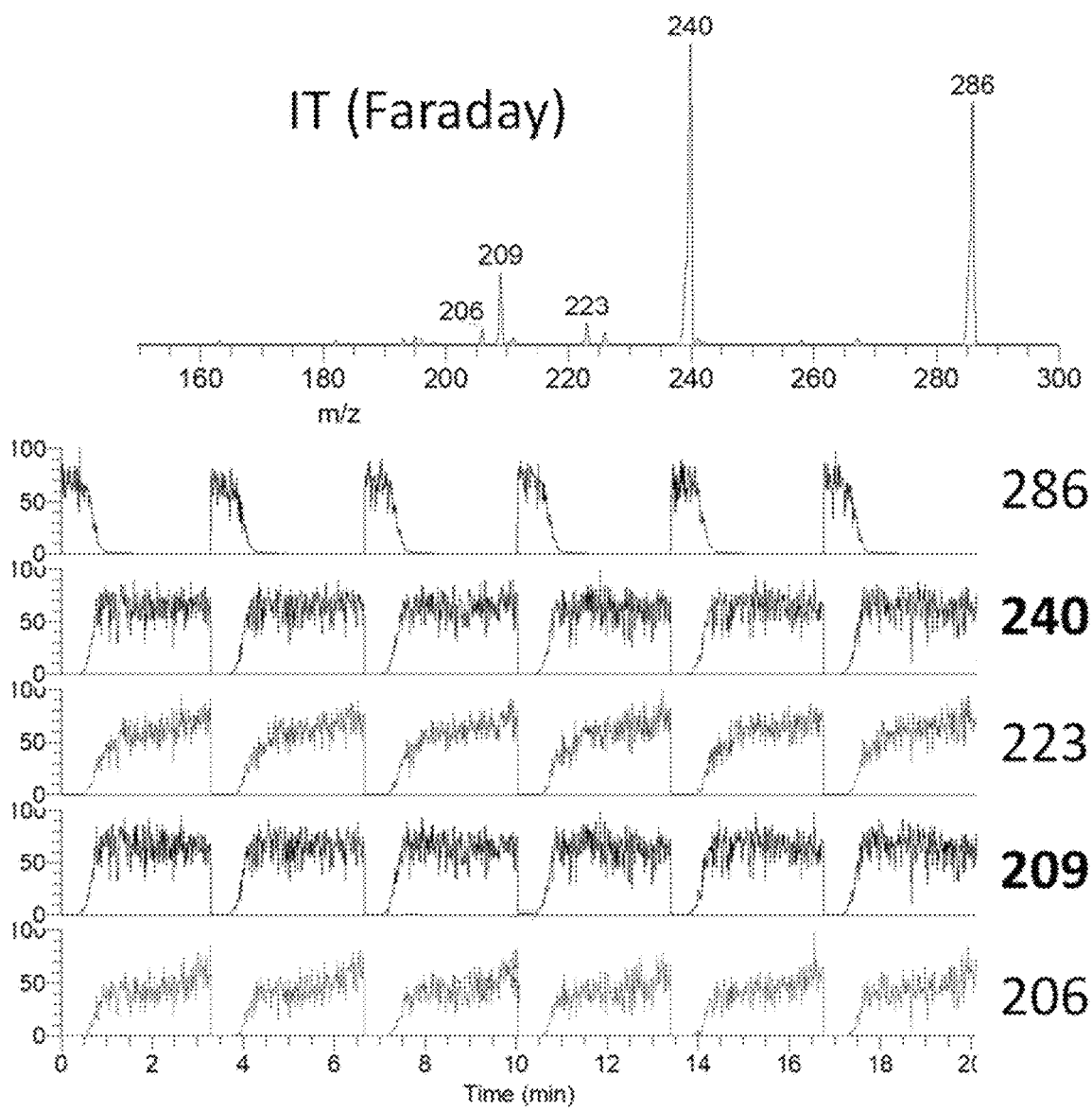
FIG. 25 illustrates FREMS application to $MS^2$ stage on a Faraday instrument according to an example embodiment.

FIG. 25 illustrates FREMS application to $MS^2$ stage on a Faraday instrument according to an example embodiment. The FREMS method can be applied to nominal mass instruments, as shown in FIG. 24, as well as accurate mass instruments.

FREMS addresses and solves SY problem of missing fragments and differentiates real products from impurities. FREMS can encompass or replace SY applications. FR, C-I and m-SY can be used interchangeably. Embodiments allow creation of FREMS-based libraries for compound identification. FREMS facilitates structural elucidation, and hints at specific conformer formation and intra-molecular connectivity (quasi 3D-MS).

Figure 26:
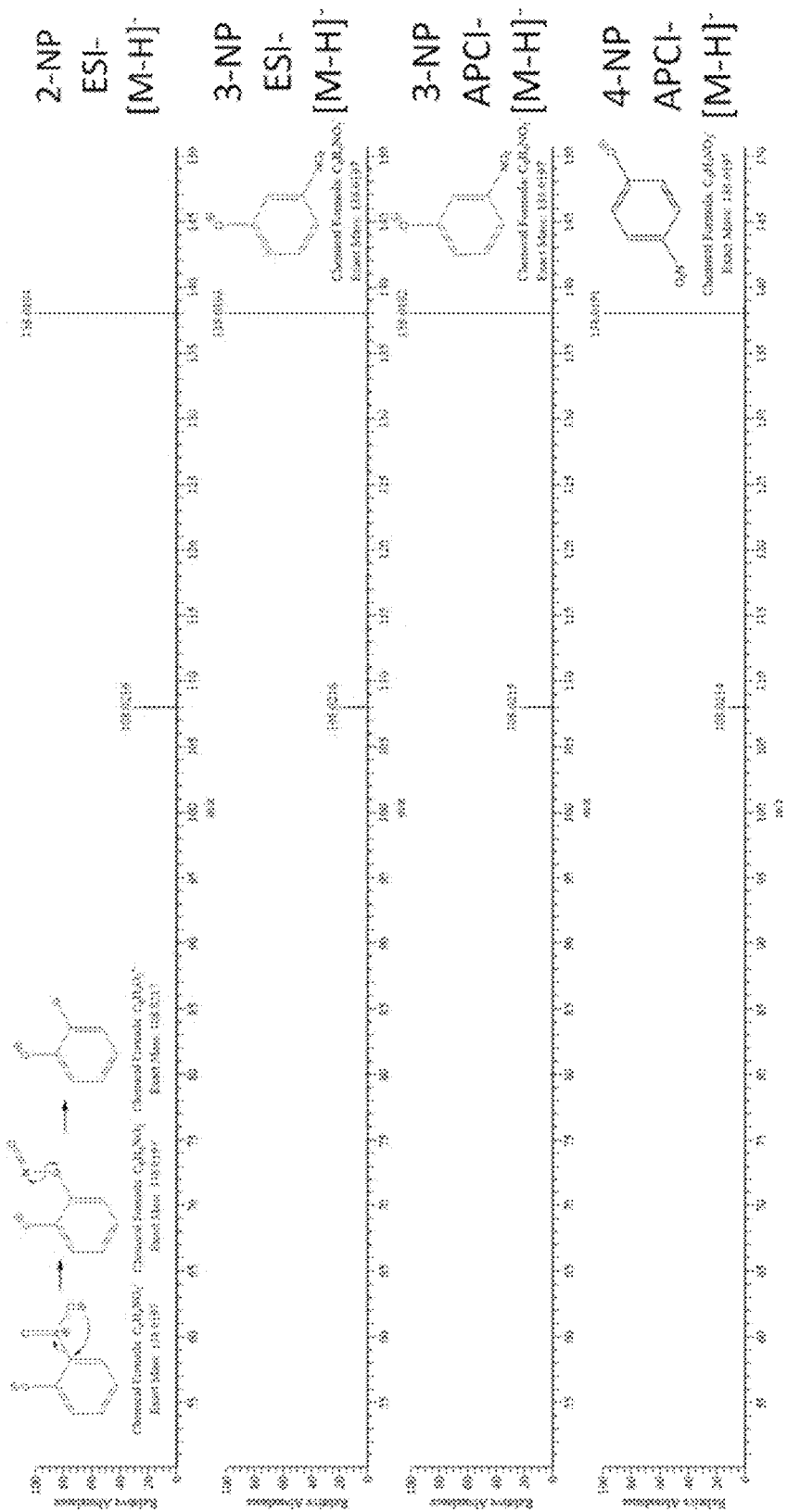
FIG. 26 illustrates structural differentiation for mono-nitrophenols according to an example embodiment.

FIG. 26 illustrates structural differentiation for mono-nitrophenols according to an example embodiment.

Figure 27:
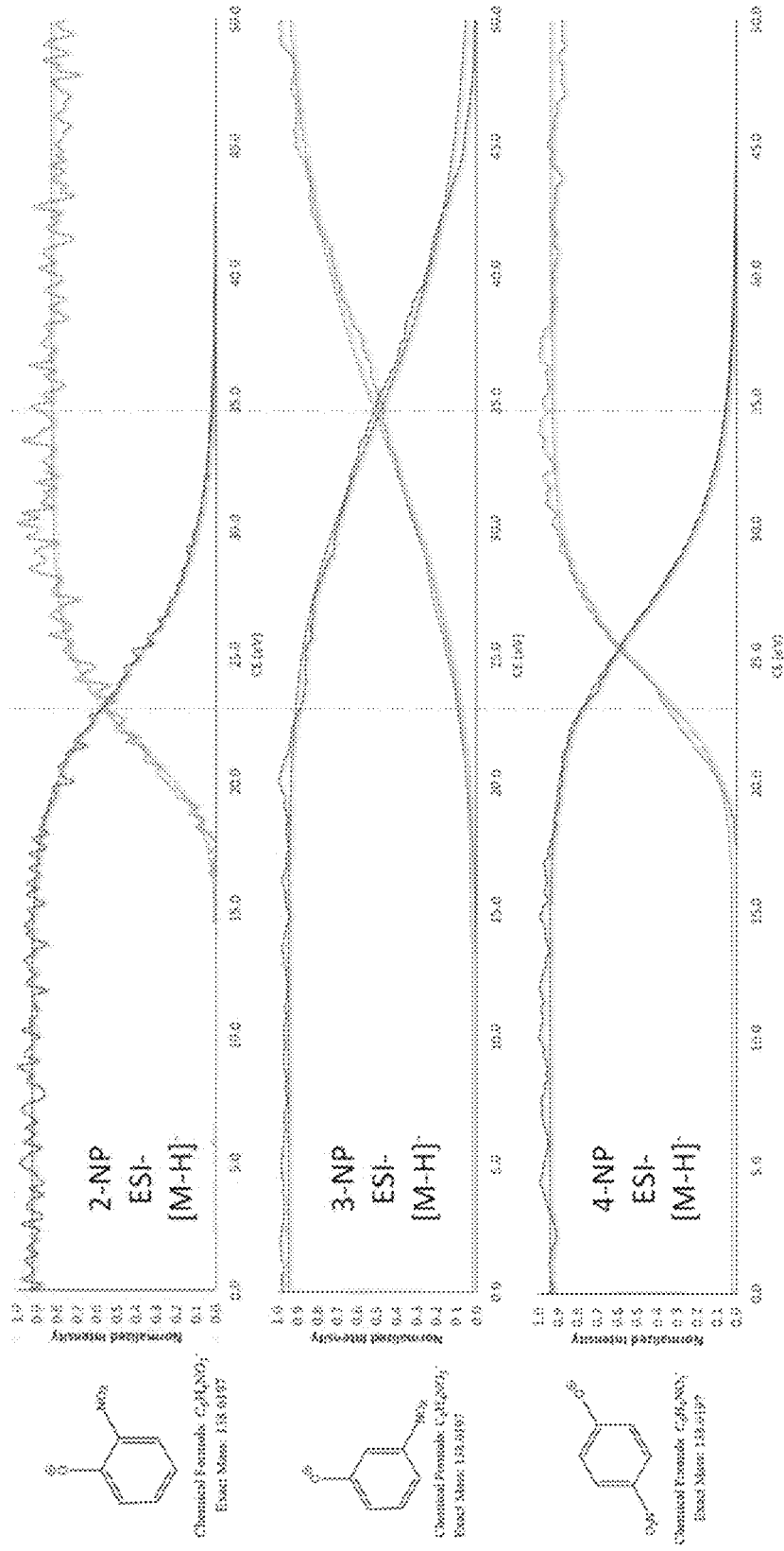
FIG. 27 illustrates FREMS Framework for mono-nitrophenols according to an example embodiment.

FIG. 27 illustrates FREMS Framework for mono-nitrophenols according to an example embodiment.

Figure 28:
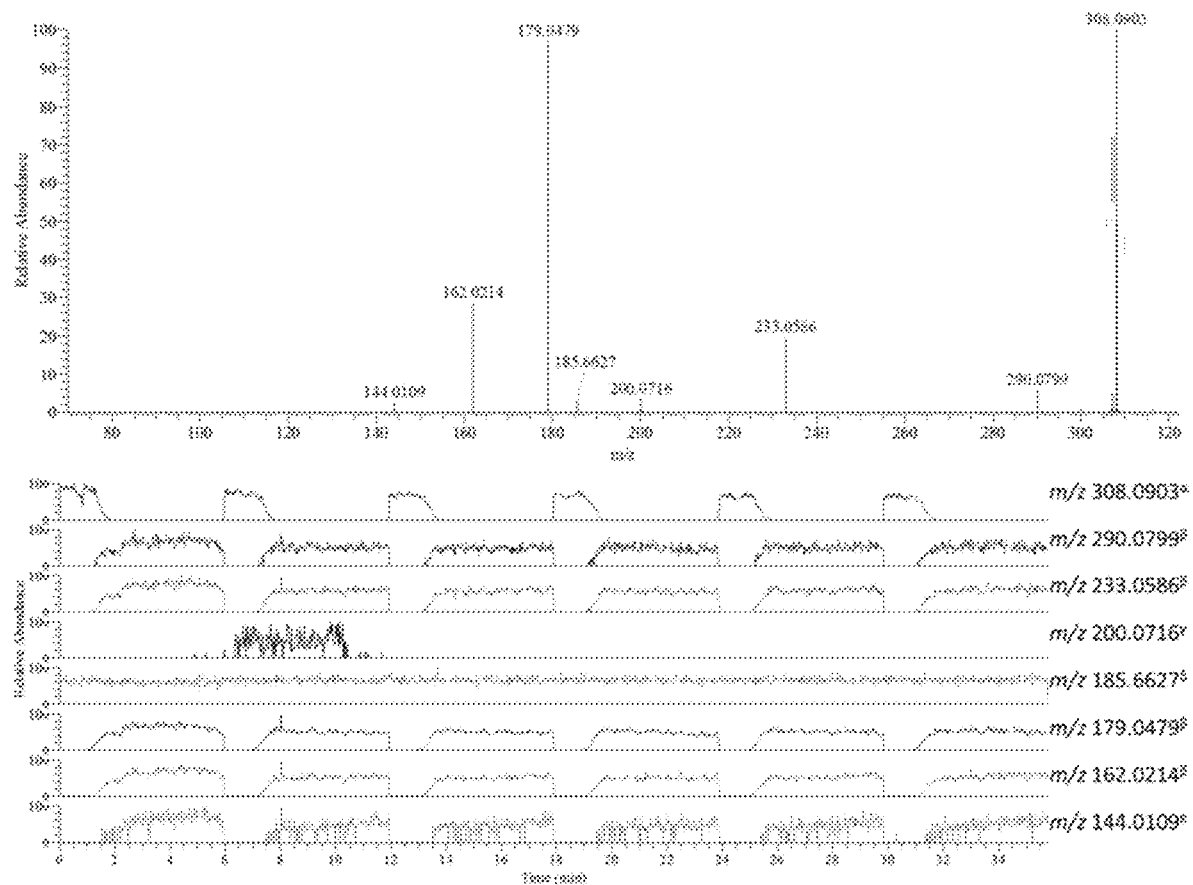
FIG. 28 illustrates FREMS for Glutathione according to an example embodiment.

FIG. 28 illustrates FREMS for Glutathione according to an example embodiment. For FREMS, the larger the compound structure the more potential fragments. Embodiments of FREMS can apply data cleanup and true fragment identification, which enables correct structure assignment. In an embodiment of FREMS, FIG. 28 illustrates 1. Running a full spectra ex. Glutathione, and 2. Trapping the parent of glutathione m/z 308.0903 of the $MS^2$ stage.

Figure 29:
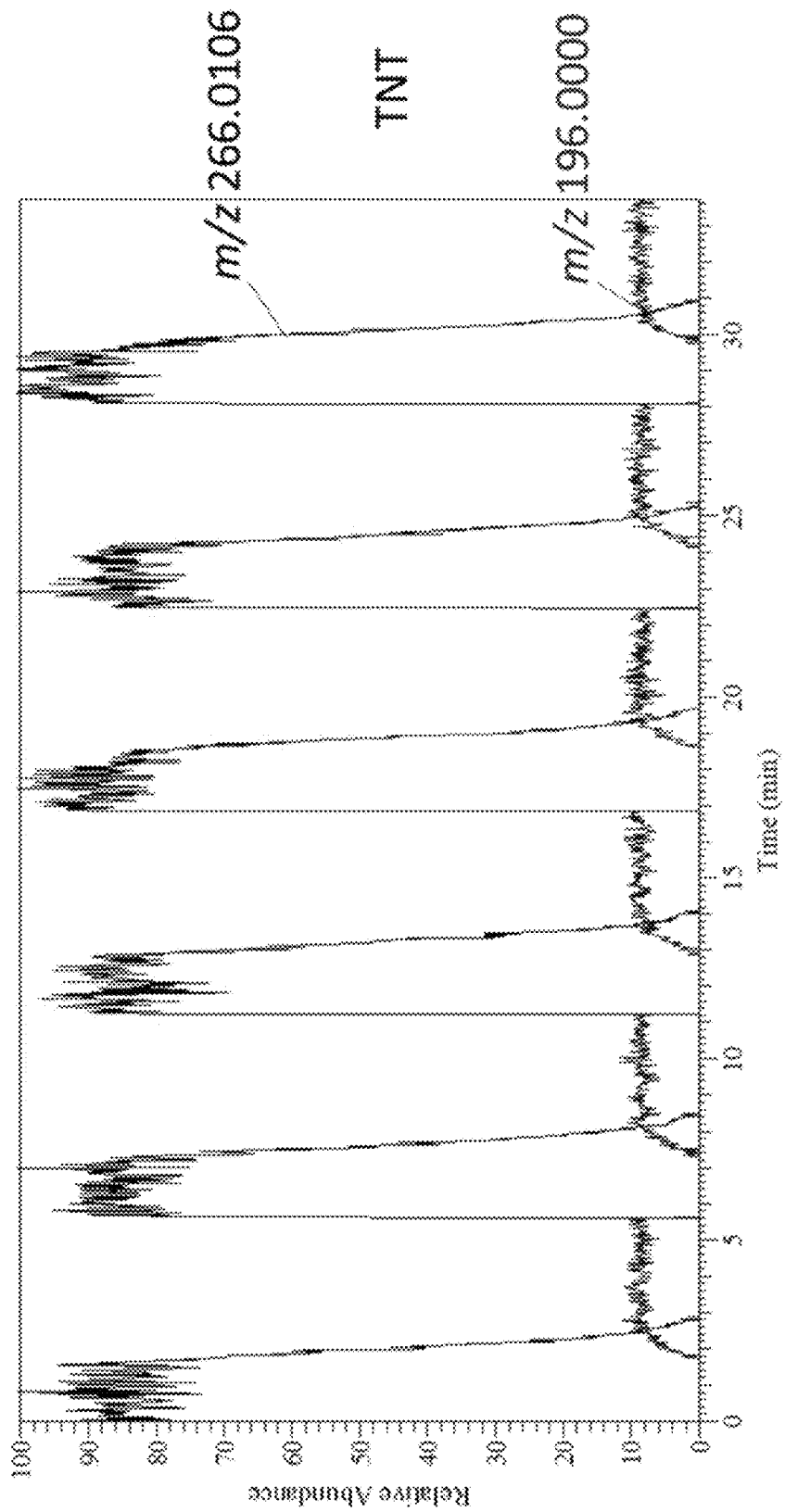
FIG. 29 illustrates FREMS data smoothing according to an example embodiment.

FIG. 29 illustrates FREMS data smoothing according to an example embodiment. FREMS embodiments can provide a new statistical approach for analysis of ERMS data. Each breakdown curve can be analyzed independently from each other. Thus, unlike a SY method, FR can be used, even if no fragments form. FREMS can use data smoothing to average all points across each energy level, and obtain one curve:

$$\sum_{k=0}^{6} \frac{(I)}{6}, \sum_{k=1}^{6} \frac{(I)}{6}, \cdots, \sum_{k=50}^{6} \frac{(I)}{6},$$

where k=energy (eV), and I=intensity (counts).

Fragmentation Resilience (FR) can provide a new statistical approach for analysis of ERMS data. FREMS can perform data transformation, by normalizing the curve based on maximum intensity (all values will be <1) or average of first 15 points (at which energy is kept at 0 eV; values can be >1). FREMS can perform statistical analysis, by running regression analysis using ordinary least square fitting and 4 parameter logistic function to produce a model. FREMS can use regression parameters: Use model's predicted statistical parameters to describe raw data (e.g. FR50, onset and offset points, sensitivity, stability, etc.).

Embodiments of FREMS provide m/z isolation and fragmentation ($MS^n$). Isolation Waveform (trapping specific m/z)—allows to simultaneously eject all ions, but the ion of interest. Superimpose all the waveforms corresponding to individual ions, expect the waveform of the ion of interest.

Collisionally activated dissociation (MS/MS, $MS^n$)—fragmentation of specific (isolated) m/z. As with "resonance ejection," activate the m/z at specific q but not enough voltage is applied to eject it. The ion trap is filled with inert gas (e.g. He), isolated ion will collide and fragment. Fragments no longer have the same q as parent, so they do not resonate. Product ion mode—perform full scan MS of the fragments.

FREMS can be used to test closely related compounds, e.g. mono-nitrated toluenes to fully nitrated toluenes for possible differentiation. FREMS can be used for theoretical computational work to establish the link between observed fragments and calculated activation energies. FREMS can be used to model an entire system, to provide insights in fundamentals of ion trap fragmentation mechanisms and allow creating a set of rules to predict fragmentation. FREMS can be used to compare theoretical and experimental data with other related techniques, such as thermal, e.g. TAM. Where there is a link between gas-phase reactions and thermal stability or activity, FREMS can forecast physiochemical properties on a trace level.

Figure 30:
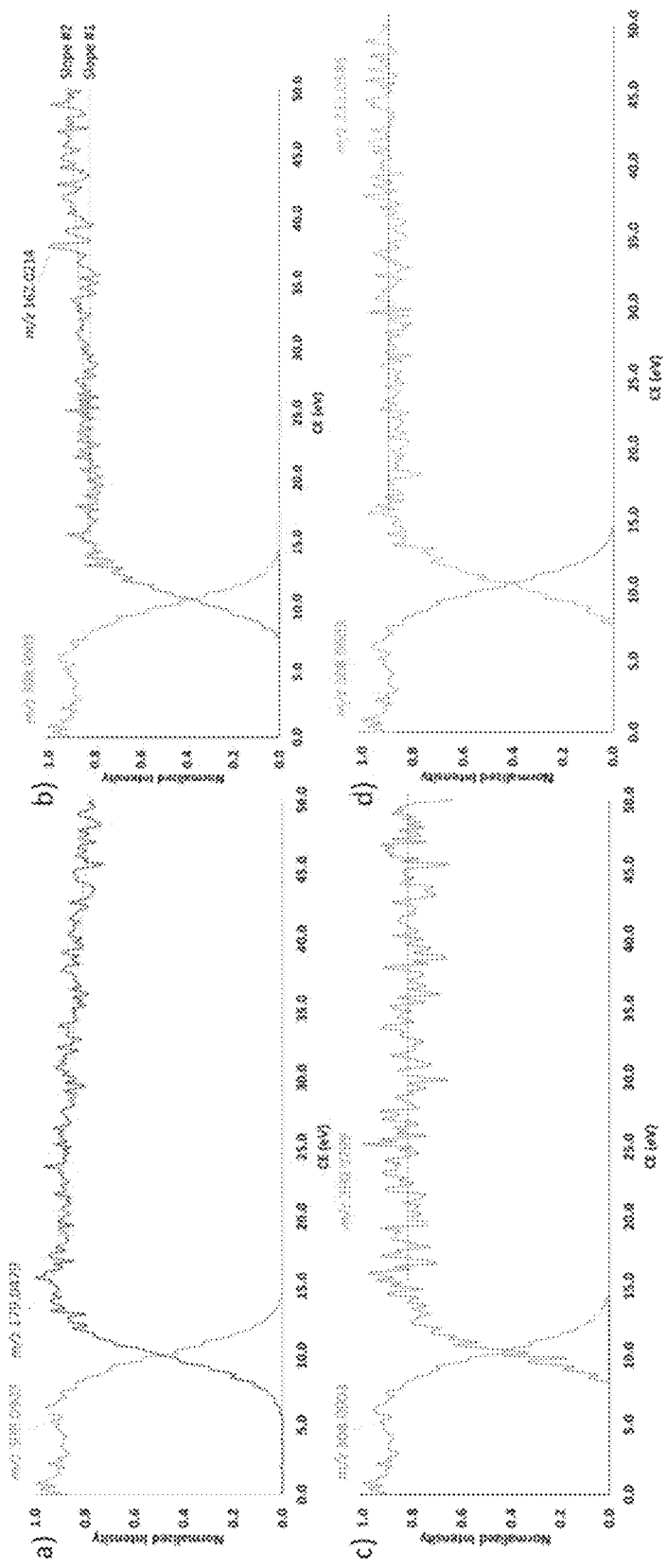
FIG. 30 illustrates different slope types according to an example embodiment.

FIG. 30 illustrates different slope types a), b), c), and d) according to an example embodiment. Flat tails are most common, since fragments do not resonate at the same frequency as parents (c, d). Partial overtone decomposition can cause downward sloping (a). Upward slope can indicate multiple formation (b).

Fragmentation Resilience Energy Mass Spectrometry (FREMS) builds and expands on the field of energy resolved mass spectrometry and previously used methods, e.g. Survival Yield (SY). It exploits breakdown energies at near "continuous" ramp (0.2 eV increments) to offer higher resolution and a reliable method for compound differentiation, contaminants identification and structural elucidation. Implementation of FREMS involves acquiring ion breakdown/formation curves as collision energy is incrementally increased. These curves themselves can be analyzed by several means to give a single metric-either Fragmentation Resilience ($FR_{50}$), modified-Survival Yield ($m-SY_{50}$) or Cross-Intersect (C-I)-shown experimentally to be interchangeable. A full panel of testing on LTQ-Orbitrap revealed that breakdown energies depend only on three controllable parameters—number of ions inside the ion trap, Maximum Inject and Activation Times. Fairly linear relationship ($R^2 > 0.95$) with proposed $FR_{50}$, $m-SY_{50}$ and C-I metrics provides reliable adjustment mechanisms for these variables via calibrations. Consequently, as long as ions are produced, any atmospheric pressure ionization processes are irrelevant for this application and can be treated as exclusively in-vacuo experiments. Applications of FREMS to 4-chlorobenzylpyridinium ion revealed that under CAD conditions, the rate of decomposition of precursor ion is equivalent to the rate of formation of its fragments, i.e. normalized breakdown and formation curves intersect at inflection points. Adaptation of FREMS to multi-stage energy reaction monitoring (3D-MS) develops a novel structural elucidation technique, which was tested on bupropion and glutathione Ultra-high sensitivity modern mass spectrometers generate superb spectra at very low concentrations but may include m/z fragments whose origins are not related to intended precursors. A small subfield, known as energy resolved mass spectrometry (ERMS), was developed in concert with tandem techniques and initially used to study "kinetic shift" effects, i.e. measure the differences in theoretical vs experimental energies due to the mismatch in time required for fragmentation to take place. Once it became evident that bond dissociation energies of more complex molecules could also be investigated, ERMS became a powerful tool for quantification of internal energy distributions produced by various ionization sources. The survival yield (SY) method was developed as a quick way to analyze and quantify these distributions. SY measures the fraction of precursor ion remaining as a sum of intensities of precursor and all its fragments. In order to be more precise during SY experiments, a well-characterized group of compounds from the benzyl-substituted benzylpyridium salts family (so-called thermometer ions) were chosen as internal MS calibrants. Some of the benefits include their already charged state, less amenable to ionization interferences, producing simple fragmentation patterns resulting in formation of one charged and one neutral component. Because energy distributions varied among compounds, SY grew into a technique allowing differentiation of closely related compounds, e.g. structural isomers, not possible by mass spectrometric means alone. A natural progression from compound differentiation was to attempt structural elucidation using SY with varying degree of success. However, potential of the latter has not been extensively explored.

Our development of Fragmentation Resilience Energy Mass Spectrometric (FREMS) sprung from the need to differentiate compounds that produced no fragment(s) in the operational range of the instrument, which ruled out the use of the SY method. Additionally, FREMS methodology provides the means to readily separate fragment ions belonging to the precursor from artifacts and impurities produced during CAD fragmentation, which results in more accurate mechanistic decomposition pathways and leads to better structural elucidations.

In an ion trap instrument, once the ion of desired m/z is trapped, its fragmentation is governed by a specific RF frequency. Energy at this frequency can be modified by increasing the amplitude to promote its vibration and collision with inert gas (e.g. helium) in so-called collisional activated dissociation (CAD). Its resulting fragments cannot breakdown further, no matter how much energy is applied, because they do not resonate at the same frequency as the precursor ion. This type of fragmentation is distinguished from collision-induced dissociation (CID) where a precursor and its fragment ions are continuously dissociated via higher energy collisions with an inert gas by an increased voltage differential (e.g. triple quadrupole, q2 or HCD cell). Methods described herein were initially designed and applied to a trap-type mass spectrometer, but with a small modification were successfully implemented on a beam-type instrument (AB Sciex Qtrap 5500). After extensive validations, FREMS has been applied to internal energy calculations, compound differentiation and structural elucidation.

Experimental Section

Reagents: Optima™ LC/MS grade acetonitrile, methanol, water were purchased from Fisher Scientific (Fair Lawn, NJ, USA). 4-Chlorobenzyl-pyridinium salt was prepared according to literature.

Instrumentation: Experiments were performed on Thermo Scientific LTQ Orbitrap XL™ in MS/MS mode using direct infusion with Hamilton syringe (i.d. 4.61 mm). Specific m/z isolation was performed using linear ion trap and Orbitrap detector. All controllable MS parameters were tested to verify impact on breakdown energies. Standard method conditions (STM) were as follows: sheath=15(arb); auxiliary gas=3; sweep gas=0; ionization voltage=4.5 kV; FT-MS" Ion Population Injection=1E5; FT Inject Time=100 ms; Activation Time=30 ms; Wideband Activation off; Activation Q=0.25; acquisition time=33 min; # of FREMS breakdown curves=6; more details can be found in Tables S.1-10. After ionization source parameters were chosen, a concentration corresponding to a moderate intensity of 1-2E06 was selected for all experiments to produce good signal-to-noise and clearly reveal trends.

Methods Description and Data Evaluation: Fragmentation Resilience (FR), modified-SY (m-SY) and cross-intersect (C-I) will collectively be referred to as FREMS methods/techniques/values. These methods introduce an energy dimension to MS results and aid with structural elucidation and differentiation of closely related compounds. The underlying concept is to trap or filter and then fragment ions of interest using a controlled energy ramp. The linear ion trap MS/MS experiments produce only primary fragments; thus, under controlled conditions the so-called "kinetic shift"5 becomes irrelevant for FR structural elucidation. It follows that the precursor's ion decomposition rate must be equal to the formation rate of its true fragments. Empirical observations confirm that once the precursor ion is completely decomposed, no new fragment formations is observed, even at maximum energy inputs. FR, m-SY and C-I were investigated as tools for structural elucidation and differentiation, but with appropriate modeling they may be used to correlate fragment energies to bulk properties, e.g. thermal techniques.

The FREMS methodologies were applied as follows. First, an ion of interest was trapped inside the LTQ with no external energy added, and to establish the baseline 15 scans were collected at 0 eV. This allowed averaging of spectra for assessing background and better algorithm fitting for ions that had extremely low onset breakdown. Following initial baseline collection, an energy ramp was employed; to assure the appearance of continuous data collection, the number of scans was maximized.

Figure 31:
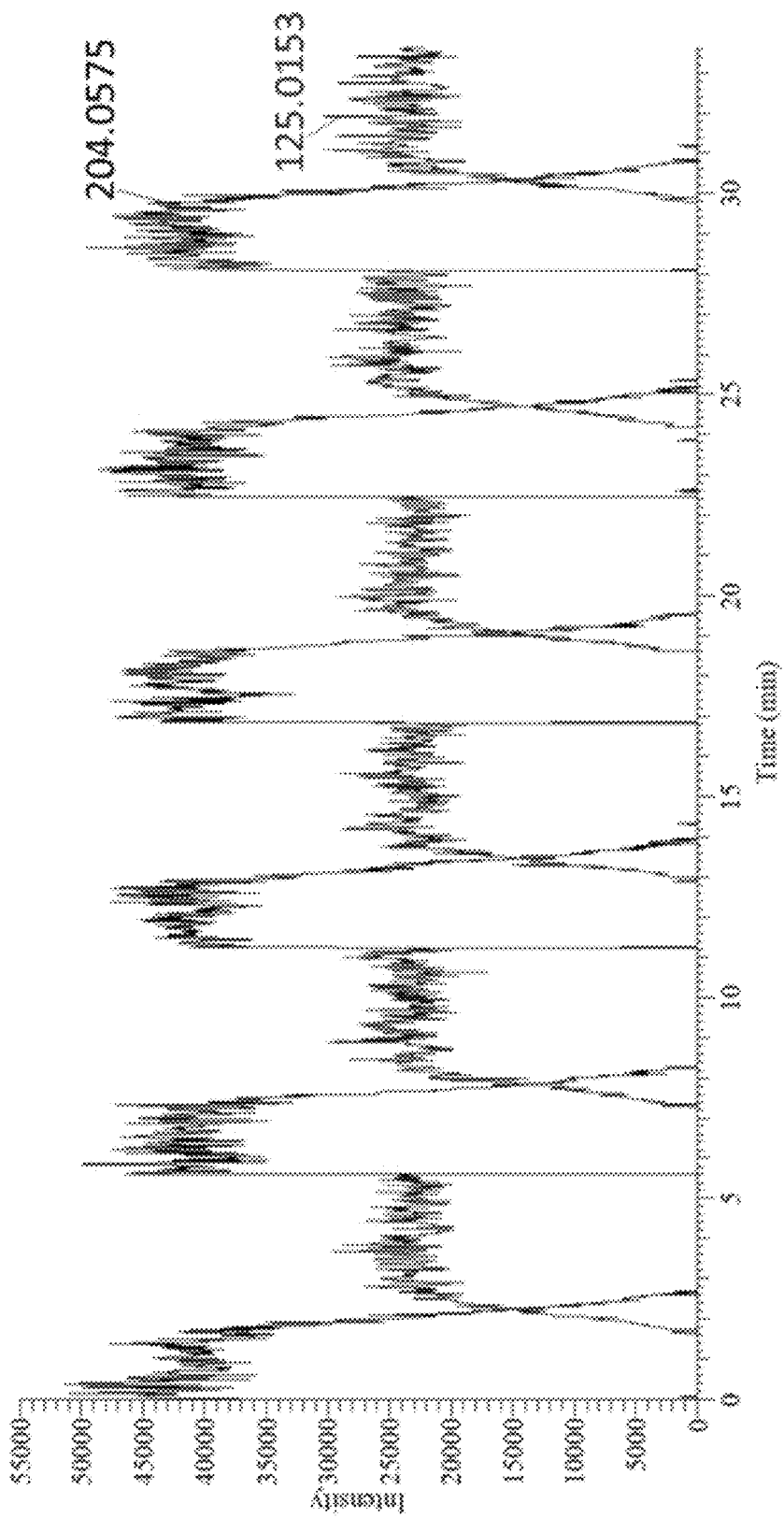
FIG. 31 illustrates an overlay of precursor and fragment ions according to an example embodiment.

FIG. 31 illustrates an overlay of precursor and fragment ions according to an example embodiment. On Thermo LTQ-Orbitrap™ MS, for example, only one segment was used; that allowed scheduling of 265 scans in a single run which translated into 0.2 eV steps from 0 eV to 50 eV (250 points) with 15 points dedicated to collection of background. Such fine step intervals were chosen to increase resolution in order to differentiate between closely related compounds. Replicates were collected to perform statistical analysis and improve signal-to-noise ratios. Breakdown curves (six replicates) are shown in FIG. 31 for the overlay of precursor and fragment ions for 4-ClBP breakdown curves, without normalization (n=6 replicates).

Breakdown curves have been used in ERMS and SY applications, but their full impact appears to have been overlooked. Visualization by overlaying breakdown curves using maximum intensity for all ions obscures their correlation. The intensity of the precursor ion is usually much greater than that of its fragments. Using 4-chloro-benzylpyridinium ion (4-ClBP; [M]+, m/z 204.0575) to illustrate; the fragment intensity is almost half that of the precursor. The intensity differences between the TNT precursor ion, m/z 226.0106, and its fragment, m/z 182.9989, prevent meaningful visual examination.

Figure 32:
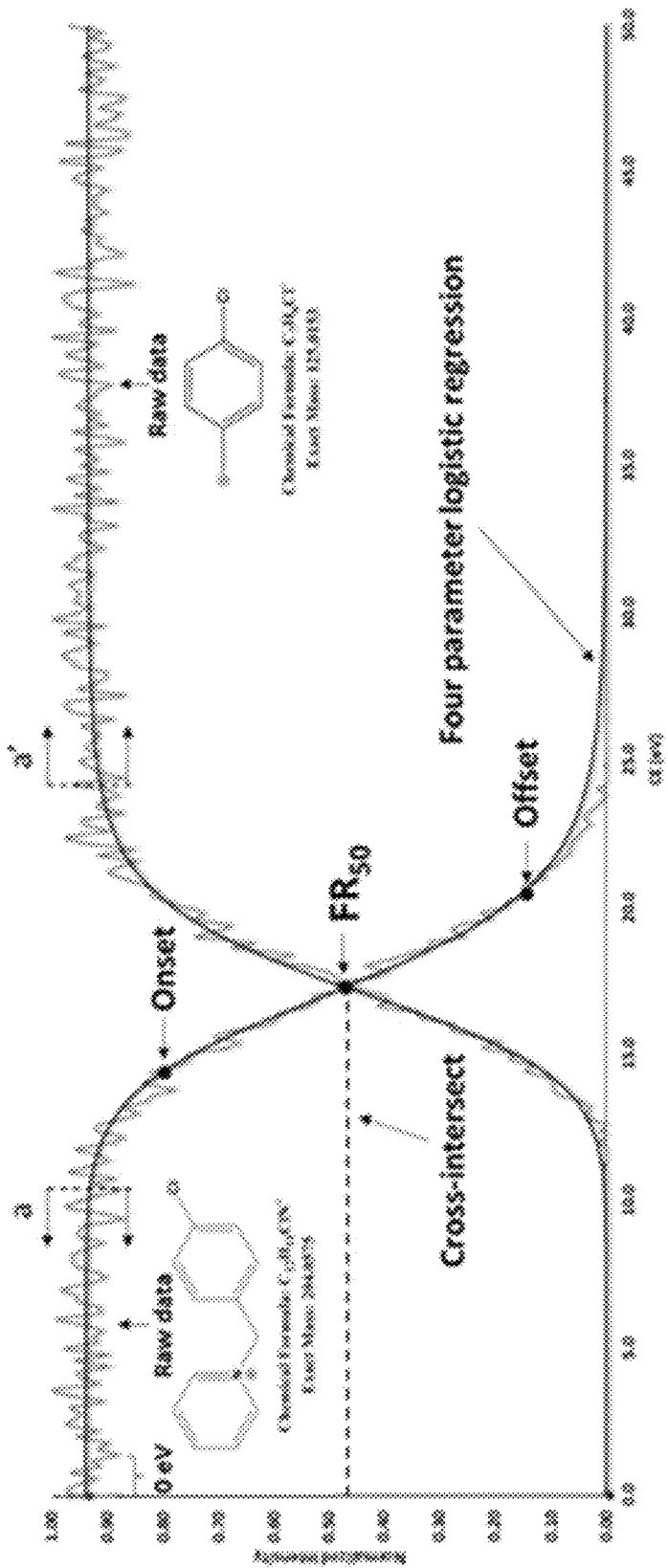
FIG. 32 illustrates traces for normalized TNT precursor ion and its fragment according to an example embodiment.

FIG. 32 illustrates traces for normalized TNT precursor ion and its fragment according to an example embodiment. FR (statistical method) shows identical $FR_{50}$ value as C-I (non-statistical) when applied to same 4-ClBP ion and its fragment. Onset (90%) and Offset (10%) points for FR comprise linear region of sigmoidal curve; a and a' are potential truncation regions. When individual traces are normalized to the same scale (e.g. 0-1, or 0-100), trends can be directly observed. Normalization was done in two ways: 1) scaling all data points to the highest intensity of individual ions, i.e. precursor and each fragment were individually scaled to their highest intensity which allowed representation of all species on the same scale; 2) averaging the first 15 points for the precursor ion, collected at 0 eV, then using the mean as the scaling factor. The second approach could only be used for precursor ions; there is no similar background collection for fragments. Data was smoothed by averaging the same energy levels from the replicate runs, e.g. 20th point from each curve in FIG. 31 to produce a single point in FIG. 32. This method suffers from less skewness than boxcar averaging. Fragmentation Resilience (FR). As energy in the ion trap is increased from 0 eV to 50 eV in incremental fashion, at some instance, the ions in resonance gain enough kinetic energy to initiate breakdown via collisions with the inert gas (e.g. He). This important characteristic parameter is labeled Onset point (FIG. 32), which reveals susceptibility to fragmentation of one ion in comparison to another, thus the name—Fragmentation Resilience. It was strategically chosen to be 90% of the linear region instead of first signs of breakdown for two reasons: 1) it is easier to identify this point because of high signal-to-noise ratio; and 2) in combination with offset point, taken to be 10% of the ion remaining, it creates a linear region allowing for better interpretation and cross-comparison between results. The four-parameter logistic regression:

$$y = d + \frac{a-d}{1+\left(\frac{x}{c}\right)^b} \quad \text{(Eq. 1)}$$

was used to model the ion breakdown curves, where a is lowest asymptote, b is Hill's slope (instantaneous slope at inflection point), c is inflection point ($FR_{50}$), and d is highest asymptote.

The least squares statistical method for minimizing the sum of residual errors (Solver program in Microsoft Excel®) was employed to model the data. Note that for formation curves, all parameters are reversed, meaning onset is 10% and offset is 90%, while the sign of the slope changes. [The specificity of CAD prevents fragments from being further broken down; thus sigmoidal curves are seen. In contrast, data collected using CID conditions (q2 or HCD cell) are Gaussian in shape and produce more than primary fragmentation. However, this difference does not prevent application of a modified FREMS approach.] The inflection point, $FR_{50}$ (FIG. 32), is the most important feature for quick differentiation between compounds. Other parameters e.g. lowest and highest asymptotes, are essentially the same for all observation, 0 and ~1, respectively. $FR_{50}$, in the middle of the breakdown curve, combines onset and offset point into a single value that we use as a metric for differentiation among compounds.

Cross-Intersect Method (C-I): If the precursor ion produces detectable fragments in the MS range, the $FR_{50}$ value can be determined by a non-statistical approach, we term the cross-intersect (C-I) method. Assuming the rates of precursor decomposition and corresponding fragment formation are the same, the mid-point is the point at which their slopes intersect and corresponds to $FR_{50}$ (FIG. 32). For species creating multiple fragments, each must cross-intersect at the same $FR_{50}$. If they do not (if they are well above or below mid-point), then these fragments belong to a different precursor.

Modified-Survival Yield (m-SY): Survival Yield makes use of breakdown energies, albeit examining only limited levels; and it indiscriminately assumes all ions are products, adding them into the denominator in Eq. 2 (below), where Ip is intensity of precursor ion, and $\Sigma I_{f,i}$ is sum of all fragment ion intensities. An obvious drawback of this approach is that it is useless when fragments are absent or outside the instrument detection range. In such cases, SY will be 1, by definition. Moreover, if ions not arising directly from the precursor are mistakenly included, the $SY_{50}$ value will shift to lower apparent energies, contributing to ionization energy mismatch with other techniques. The SY method can be drastically improved, if first the C-I method is applied to select true precursor fragments based on their intersect energies; then the SY method can be employed for statistical analysis.

$$SY = \frac{1}{I_p + \sum I_{f,i}} \quad \text{(Eq. 2)}$$

Results and Discussion

FREMS Validation—Compound Differentiation. We used a modeled compound, 4-chlorobenzylpyridinium (4-ClBP; [M]+, m/z 204.0575), to investigate all MS controllable parameters, in order to ascertain the level at which new techniques can be useful for compound differentiation. The FREMS values ($FR_{50}$, m-$SY_{50}$, C-I) calculated from ion breakdown curves, such as the one shown in FIG. 31, exhibited an extremely small standard deviation, especially for statistical m-SY and FR techniques (Table 1 and Table S.2 for p values).

TABLE 1

FREMS dependence on concentration (as intensity) of 4-ClBP's, using Thermo Scientific LTQ-Orbitrap XL ™. Day = days since first experiment; NI = normalized intensity; C-I = cross-intersect method; $SY_{50}$ = inflection of m-SY curve; $FR_{50}$ = inflection of FR curve; [a]= standard deviation (n = 6 replicates); [b]= statistical analysis all combined curves (single value); [c]= after repair.

| | | FREMS | | | |
|---|---|---|---|---|---|
| Day | NI (counts) | C-I (eV) | m-SY50 (eV) | FR50 (eV) m/z 204.0575 | FR50 (eV) m/z 125.0153 |
| 1 | 6.33E+04 | 17.8 ± 0.3[a] (17.6)[b] | 17.8 ± 0.1 (17.8) | 17.8 ± 0.1 (17.8) | 17.7 ± 0.1 (17.6) |
| 2 | 7.13E+04 | 17.7 ± 0.2 (17.6) | 17.7 ± 0.1 (17.7) | 17.7 ± 0.1 (17.7) | 17.5 ± 0.1 (17.5) |
| 2 | 1.94E+05 | 17.9 ± 0.4 (17.6) | 17.8 ± 0.3 (17.7) | 17.8 ± 0.3 (17.8) | 17.6 ± 0.2 (17.4) |
| 2 | 4.07E+05 | 17.8 ± 0.2 (17.6) | 17.7 ± 0.2 (17.7) | 17.8 ± 0.1 (17.8) | 17.5 ± 0.1 (17.5) |
| 2 | 5.05E+05 | 17.8 ± 0.3 (17.6) | 17.6 ± 0.3 (17.7) | 17.9 ± 0.1 (17.9) | 17.5 ± 0.1 (17.5) |
| 5 | 5.70E+05 | 18.1 ± 0.2 (17.8) | 17.7 ± 0.2 (17.8) | 18.0 ± 0.1 (18.0) | 17.5 ± 0.2 (17.6) |
| 5 | 6.98E+05 | 18.0 ± 0.3 (18.2) | 17.8 ± 0.1 (17.8) | 17.9 ± 0.1 (18.0) | 17.6 ± 0.1 (17.6) |
| 5 | 7.83E+05 | 17.8 ± 0.3 (18.2) | 17.8 ± 0.1 (17.8) | 17.9 ± 0.1 (17.9) | 17.6 ± 0.0 (17.6) |
| 5 | 8.84E+05 | 18.0 ± 0.3 (18.2) | 17.8 ± 0.1 (17.9) | 18.0 ± 0.1 (18.0) | 17.6 ± 0.1 (17.6) |
| 5 | 9.41E+05 | 18.2 ± 0.0 (18.2) | 18.0 ± 0.1 (17.9) | 18.0 ± 0.0 (18.0) | 17.7 ± 0.1 (17.7) |
| 5 | 1.09E+06 | 18.2 ± 0.0 (18.2) | 18.0 ± 0.1 (18.0) | 18.1 ± 0.1 (18.1) | 17.8 ± 0.1 (17.8) |
| 5 | 1.20E+06 | 18.2 ± 0.0 (18.2) | 18.0 ± 0.1 (18.0) | 18.2 ± 0.1 (18.2) | 17.8 ± 0.0 (17.8) |
| 5 | 1.33E+06 | 18.2 ± 0.0 (18.2) | 18.1 ± 0.0 (18.0) | 18.2 ± 0.1 (18.2) | 17.9 ± 0.1 (17.9) |
| 5 | 1.66E+06 | 18.4 ± 0.2 (18.2) | 18.3 ± 0.1 (18.2) | 18.4 ± 0.1 (18.4) | 18.0 ± 0.0 (18.0) |
| 5 | 1.97E+06 | 18.6 ± 0.0 (18.6) | 18.4 ± 0.0 (18.3) | 18.4 ± 0.0 (18.4) | 18.1 ± 0.0 (18.1) |
| 5 | 2.22E+06 | 18.6 ± 0.0 (18.6) | 18.4 ± 0.1 (18.5) | 18.5 ± 0.1 (18.5) | 18.2 ± 0.0 (18.2) |
| 6 | 2.14E+06 | 18.6 ± 0.0 (18.6) | 18.4 ± 0.1 (18.4) | 18.5 ± 0.1 (18.6) | 18.2 ± 0.1 (18.2) |
| 14 | 8.71E+06 | 20.4 ± 0.1 (20.4) | 20.2 ± 0.0 (20.2) | 20.4 ± 0.1 (20.4) | 20.0 ± 0.1 (20.0) |
| 14 | 1.17E+07 | 21.2 ± 0.2 (21.2) | 21.0 ± 0.1 (21.0) | 21.2 ± 0.2 (21.2) | 20.8 ±0.1 (20.7) |

TABLE 1-continued

FREMS dependence on concentration (as intensity) of 4-ClBP's, using Thermo Scientific LTQ-Orbitrap XL ™. Day = days since first experiment; NI = normalized intensity; C-I = cross-intersect method; $SY_{50}$ = inflection of m-SY curve; $FR_{50}$ = inflection of FR curve; [a] = standard deviation (n = 6 replicates); [b] = statistical analysis all combined curves (single value); [c] = after repair.

| | | | FREMS | | |
|---|---|---|---|---|---|
| Day | NI (counts) | C-I (eV) | m-SY50 (eV) | FR50 (eV) m/z 204.0575 | FR50 (eV) m/z 125.0153 |
| 365[c] | 1.96E+06 | 18.8 ± 0.3 (18.8) | 18.6 ± 0.1 (18.5) | 18.4 ± 0.1 (18.4) | 18.2 ± 0.1 (18.4) |
| 365[c] | 2.13E+06 | 18.9 ± 0.2 (18.8) | 18.8 ± 0.1 (18.7) | 18.5 ± 0.1 (18.5) | 18.4 ± 0.2 (18.4) |

TABLE S.2

Measure of significance (p-values) for $FR_{50}$ (Table 1) using one-factor ANOVA ($\alpha = 0.05$) based on intensity. Highlighted values are statistically significant at 95% confidence level (green), 90% confidence level (yellow) for 4- ClBP.

| 7.13E+04 | 1.94E+05 | 4.07E+05 | 5.05E+05 | 5.70E+05 | 6.98E+05 | 7.83E+05 | 8.84E+05 | 9.41E+05 | Intensity |
|---|---|---|---|---|---|---|---|---|---|
| 0.999 | 1.000 | 1.000 | 1.000 | 0.614 | 0.641 | 0.960 | [0.068] | 0.132 | 6.33E+04 |
| | 0.990 | 0.958 | 0.691 | [0.040] | [0.045] | 0.262 | 0.001 | 0.003 | 7.13E+04 |
| | | 1.000 | 1.000 | 0.788 | 0.810 | 0.991 | 0.133 | 0.238 | 1.94E+05 |
| | | | 1.000 | 0.906 | 0.919 | 0.999 | 0.230 | 0.377 | 4.07E+05 |
| | | | | 0.997 | 0.998 | 1.000 | 0.597 | 0.773 | 5.05E+05 |
| | | | | | 1.000 | 1.000 | 1.000 | 1.000 | 5.70E+05 |
| | | | | | | 1.000 | 1.000 | 1.000 | 6.98E+05 |
| | | | | | | | 0.983 | 0.997 | 7.83E+05 |
| | | | | | | | | 1.000 | 8.84E+05 |

| 1.09E+06 | 1.20E+06 | 1.33E+06 | 1.66E+06 | 1.97E+06 | 2.22E+06 | 2.14E+06 | 8.71E+06 | 1.17E+07 | Intensity |
|---|---|---|---|---|---|---|---|---|---|
| 8.01E−05 | 1.37E−05 | 1.00E−05 | 1.93E−12 | 4.32E−13 | 4.21E−13 | 4.21E−13 | 4.21E−13 | 4.21E−13 | 6.33E+04 |
| 3.06E−07 | 4.46E−08 | 3.19E−08 | 4.24E−13 | 4.21E−13 | 4.21E−13 | 4.21E−13 | 4.21E−13 | 4.21E−13 | 7.13E+04 |
| 0.000 | 4.13E−05 | 3.05E−05 | 5.74E−12 | 4.62E−13 | 4.20E−13 | 4.20E−13 | 4.21E−13 | 4.21E−13 | 1.94E+05 |
| 0.001 | 0.000 | 8.32E−05 | 1.74E−11 | 5.53E−13 | 4.21E−13 | 4.21E−13 | 4.21E−13 | 4.21E−13 | 4.07E+05 |
| 0.005 | 0.001 | 0.001 | 2.63E−10 | 2.49E−12 | 4.22E−13 | 4.22E−13 | 4.21E−13 | 4.21E−13 | 5.05E+05 |
| 0.256 | [0.096] | [0.080] | 1.77E−07 | 1.62E−09 | 2.00E−12 | 2.00E−12 | 4.21E−13 | 4.21E−13 | 5.70E+05 |
| 0.236 | [0.087] | [0.072] | 1.48E−07 | 1.35E−09 | 1.73E−12 | 1.73E−12 | 4.21E−13 | 4.21E−13 | 6.98E+05 |
| [0.093] | 0.030 | [0.024] | 5.45E−08 | 6.01E−10 | 1.21E−12 | 1.21E−12 | 4.21E−13 | 4.21E−13 | 7.83E+05 |
| 0.924 | 0.707 | 0.657 | 2.23E−05 | 2.64E−07 | 3.05E−10 | 3.05E−10 | 4.21E−13 | 4.21E−13 | 8.84E+05 |
| 0.808 | 0.523 | 0.471 | 7.40E−06 | 8.15E−08 | 8.95E−11 | 8.95E−11 | 4.21E−13 | 4.21E−13 | 9.41E+05 |
| | 1.000 | 1.000 | [0.028] | 0.001 | 2.11E−06 | 2.11E−06 | 4.21E−13 | 4.21E−13 | 1.09E+06 |
| | | 1.000 | [0.092] | 0.004 | 1.32E−05 | 1.32E−05 | 4.21E−13 | 4.21E−13 | 1.20E+06 |
| | | | 0.111 | 0.005 | 1.79E−05 | 1.79E−05 | 4.21E−13 | 4.21E−13 | 1.33E+06 |
| | | | | 1.000 | 0.620 | 0.620 | 4.21E−13 | 4.21E−13 | 1.66E+06 |
| | | | | | 0.995 | 0.995 | 4.21E−13 | 4.21E−13 | 1.97E+06 |
| | | | | | | 1.000 | 4.21E−13 | 4.21E−13 | 2.22E+06 |
| | | | | | | | 4.21E−13 | 4.21E−13 | 2.14E+06 |
| | | | | | | | | 4.21E−13 | 8.71E+06 | temperature, could not be controlled on our instrument but have been reported to have an effect on breakdown energies. To account for uncontrollable shifts, a daily single point calibration (*STM in Tables) was performed to account for any deviations based on intensity. Exhaustive trials were performed applying FREMS methodology to 4-ClBP, varying every parameter within the analyst's control. No statistical significance was found between breakdown values of precursor ions for all FREMS methods when the same intensity (concentration) levels were considered (Table 1, S.1). Thus, all three methods can be used interchangeably. More importantly, FREMS values>0.3 eV are unique and allow differentiation of closely related compounds. Furthermore, because the rate of precursor decomposition is equal to the rate of product formation, their FREMS values must be the same. The statistical significance between $FR_{50}$ values of precursor (204.0575) and fragment (125.0153) ions (i.e. 0.2-0.4 eV difference) was attributed to noise levels. The statistical fit model for the precursor ion breakdown curve on average was 1.7 times better than for that of the fragment ion, measured as the sum of squared errors (n=82). Trunca- Ideally, the three methods should produce identical results. However, to demonstrate method robustness and consistency it was more important that each can be repeated precisely. Certain parameters, e.g. collision gas pressure and tion of the breakdown curve at the highest asymptote regions (FIG. 32, a and a') would improve analysis by minimizing the artificial spread between values due to S/N differences. To fully test applicability of FREMS methods, an intra-instrument comparison is usually required. There was no access to an identical piece of equipment; however somewhat fortuitously for this purpose, but begrudgingly costly to authors, about a month into data collection the instrument on which these experiments were originally performed catastrophically failed. A plasma flash caused an ion trap, c-trap and ion optics to be completely replaced, resulting in virtually new instrument. To highlight the robustness of FREMS methods, no difference (p-value>0.05 for all observations) was found for two sets of data run under standard conditions 360 days apart, including before and after repair (Table 1, day 365 compared to day 5).

Analyte Concentration: As seen in Table 1, FR50, m-SY and C-I values shifted to higher breakdown energies as analyte concentration increased. Indeed, it has been shown that ion population greater than 10E5 can contribute to space charge effects in ion traps, adversely affecting trapping capacity, mass discrimination, resolution, and, more importantly, fragmentation efficiency. In line with these reports, $FR_{50}$, $SY_{50}$ and C-I energies were stable up to about 10E5 intensity and then started to shift significantly (p-values<0.05, FIG. S.22). We suspect that greater ion population (i.e. higher concentration) creates denser ion clouds and shields the main ion core from fragmentation at the same energies as the more dispersed clouds. Fortunately, $FR_{50}$, $SY_{50}$ and C-I demonstrated a linear dependency with respect to intensity over the entire tested range (four orders of magnitude), with $R^2 > 0.98$. (See FIG. 33).

Figure 33:
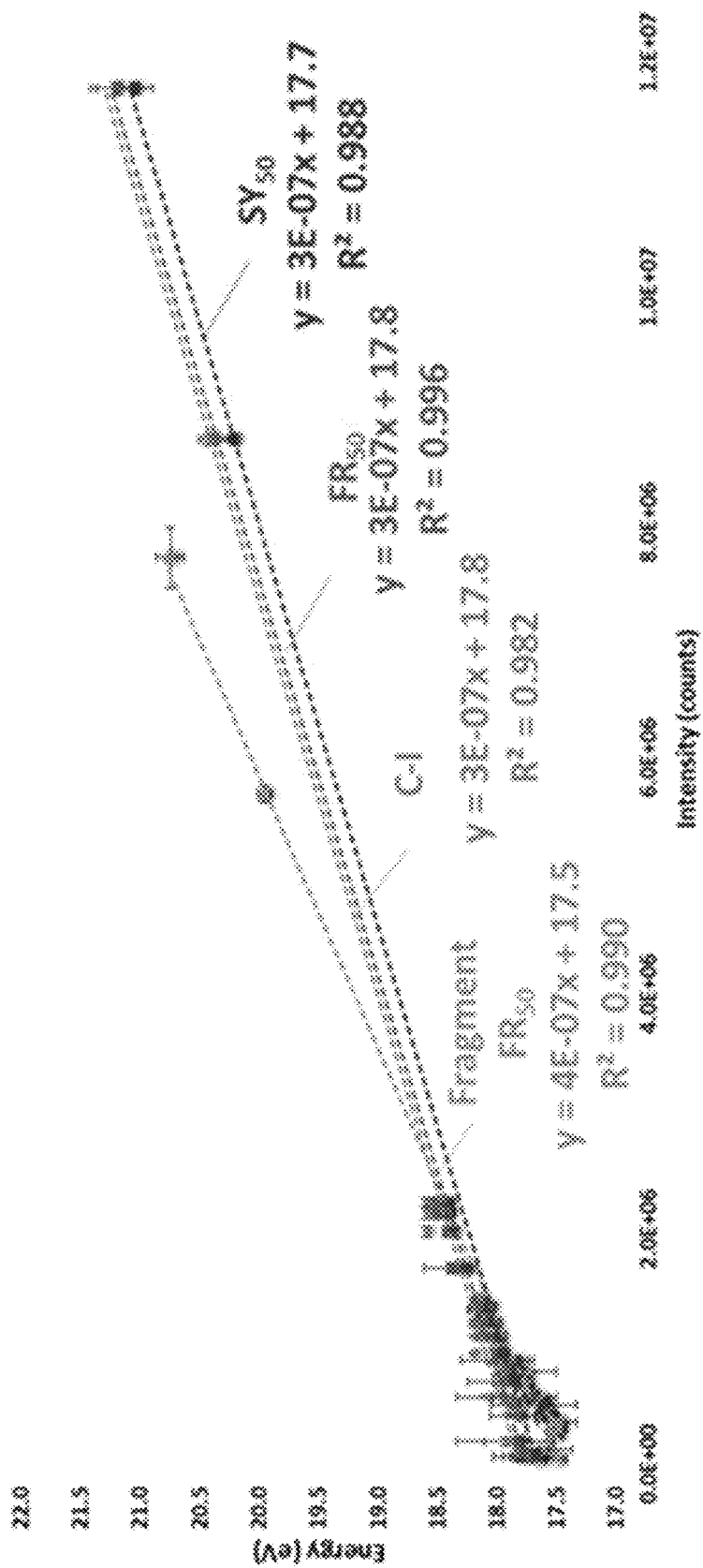
FIG. 33 illustrates 4-ClBP's $FR_{50}$, $SY_{50}$ & C-I dependence on concentration according to an example embodiment.

FIG. 33 illustrates 4-ClBP's $FR_{50}$, $SY_{50}$ & C-I dependence on concentration (as intensity) from Table 1 according to an example embodiment. Other metrics, e.g. onset and offset values for FREMS also showed good linear relationship ($R^2 > 0.94$, We used a modeled compound, 4-chlorobenzylpyridinium (4-ClBP; [M]+, m/z 204.0575), to investigate all MS controllable parameters, in order to ascertain the level at which new techniques can be useful for compound differentiation. Therefore, the small breakdown energy variation below 10E5 intensity was likely due to small ion population changes inside the ion trap. To determine the appropriate range for a specific sample, an energy calibration should be performed over the desired intensity.

Ionization Source—No Influence on FREMS performance: Atmospheric pressure ionization (API) techniques take place in an open environment and are inherently flawed in achieving high levels of consistency and reproducibility. These limitations hinder creation of unified spectral libraries analogous to NIST Mass Spectral Library for compound identifications via GC-MS. Since FREMS is purely MS-based, performed in vacuum and decoupled from the initial ionization process, as long as MS parameters are kept the same, trapping (or filtering) resets the ion's energy to the same state at the initiation of each $MS^2$ experiment. This ensures reproducible results and same fragmentation pattern every time. To ascertain the effects that front-end conditions have on breakdown energies, all accessible conditions were tested (See FIG. 34).

Figure 34:
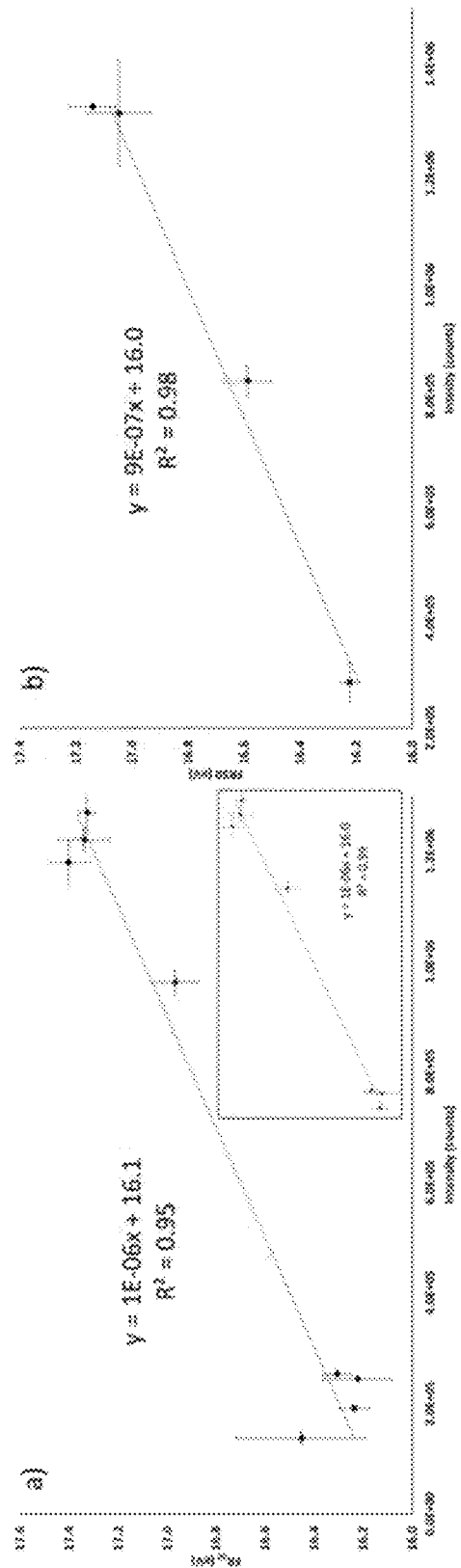
FIG. 34 illustrates $FR_{50}$ dependence on gas flows according to an example embodiment.

FIG. 34 illustrates $FR_{50}$ dependence on gas flows according to an example embodiment. As shown in a), $FR_{50}$ dependence on gas flows and in-source CID, insert shows linear improvement with the removal of outlier at the lowest intensity level. As shown in b), $FR_{50}$ dependence on ion optics and ionization source housing. All experiments showed that front-end variables affect only intensities, and these have been shown to have a linear relationship to $FR_{50}$, $SY_{50}$ and C-I values. Using an energy calibration curve (R2=0.98-0.99), intensity-adjusted parameters were no longer statistically significant. There was no statistical significance ($\alpha = 0.05$) between FR, m-SY and C-I methods (p-value>0.05) for n=27 out of 29 pairs. Outliers resulted from low intensity and decreased S/N under high sweep gas flow and high in-source CID, causing a poor fit.

Automatic Gain Control (AGC) Parameters Dependence. Ion Population Injection parameter allows the user to set the number of ions entering the ion trap (IT) or Orbitrap (FT) for each experiment, i.e. Full MS, SIM or $MS^n$. Low values may result in shorter injection time; too many ions may affect isolation/fragmentation efficiency and mass accuracy. All IT and FT ion population parameters, with the exception of FT-$MS^n$, had no effect on FREMS values (p-value>0.05, n=38) testing at each extreme level (Table S3, Table S.4). This was not surprising since FREMS $MS^2$ detection was performed in the Orbitrap.

There were no significant mass accuracy defects observed for the varying amount of ions (1E3-1E6<2 ppm, 1E7-6 ppm). Interestingly, despite isolation and fragmentation taking place inside the ion trap, no IT parameter had any effect on FREMS values. The deviation of $FR_{50}$, $SY_{50}$ and C-I from the expected, at the same intensity level, to lower values started once the number of ions fell below 1,000 (FIG. S.5. MS2 spectra for mono-nitrated toluenes; Table S.13, 17.4 eV; p-value<0.05). Lower injection amounts resulted in shorter run times, but much noisier signal, which diminished the model's effectiveness and explained deviations. No signal was observed below 100 ion counts. No statistical significance was observed between all FT and IT parameters set to maximum (1E7 and 1E6, respectively) and a 1-point calibration for that day. The cross-intersect method showed to be statistically significant in some instances when compared to m-SY (p-value<0.05 for n=14 out of 109 tested pairs), while m-SY and FR had no differentiation. To avoid artificial energy shifts, it is advised to operate in the 5E4-1E7 number of ions range.

Maximum Inject Time: This AGC variable likewise affected $FR_{50}$, $SY_{50}$ and C-I values only in FT-$MS^n$ and not in any other modes (Tables S.5, S.6). It controls time duration for ion batch accumulation before send off to the detector, and competes with the Ion Population Injection parameter from above. When Maximum Inject Time was set to 1 ms, it sped up data acquisition, producing an extra breakdown curve for the same time interval as the standard method (100 ms). However, as this reduces the amount of ion introduced into MS for analysis, this lowered S/N ratio and diminished efficiency of statistical modeling. On the contrary, acquisition times got expectedly longer as the injection time was increased—only 2 breakdown curves were collected in 1000 ms.

Figure 35:
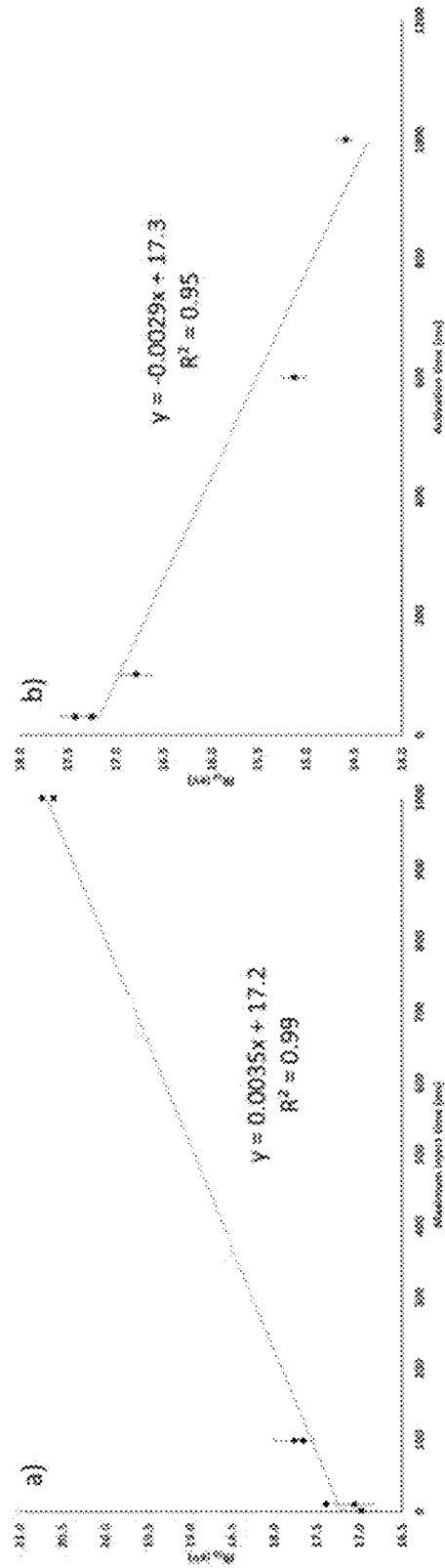
FIG. 35 illustrates $FR_{50}$ relative to a) Maximum Inject Time and b) Activation Time, in $FT-MS^n$ according to an example embodiment.

FIG. 35 illustrates $FR_{50}$ relative to a) Maximum Inject Time and b) Activation Time, in FT-$MS^n$ according to an example embodiment. There was a linear upward trend for FREMS values with respect to the Inject Time parameter (FIG. 35, a), attributed to more efficient collisional cooling from longer residence times. As internal energy gets dampened during vibrational relaxation, it would require more energy to initiate the fragmentation. Beyond 1000 ms time interval, the Ion Population parameter started to compete with Inject Time, making it unreliable and breaking a linear trend. Maximum Inject Time had no influence on total ion current over the entire tested range, and therefore had its own direct effect on $FR_{50}$, m-$SY_{50}$ and C-I values (i.e. it cannot be intensity-adjusted). This parameter should be fixed (e.g. 10 ms) or calibrated over a linear range before using FREMS for compound differentiation. No statistical significance among FREMS values (p-value>0.05) was observed for n=46 pairs.

Activation Time Dependence: Activation Time parameter allows the user to set how long RF is used for fragmentation and has a direct link to studies of kinetic shift. It is different from Inject Time AGC parameter described above, but has some similar attributes. Increasing Activation Time also increases the acquisition run; two curves were obtained in 1000 ms instead of six for the standard method (30 ms), but in contrast to Inject Time, an increase in Activation Time produced a downward trend for FREMS values ($R^2$=0.95), indicating shorter RF pulses induced lower ion kinetic energy and produced less fragmentation. Despite a not perfectly linear relationship, it still raises questions regarding the classical understanding of kinetic shift—an excess of energy required to produce detectable fragmentation on a laboratory time scale (~10 µs). To clarify, an ion might have enough internal energy but not enough time to fragment, therefore it will need an external energy to do so. Having the ability to extend time scale into >1000 µs time regions, we were expecting to reach a time at which no external energy would be required to set off the fragmentation, but no such point was observed. Perhaps a new look at this phenomenon is required to answer some of these discrepancies. Because the correlation of Activation Time with FREMS values was not perfectly linear, the analyst should use a fixed value (e.g. 30 ms) for this parameter. For most observations there was no statistical significance among FR, m-SY and C-I methods (p-value>0.05 for n=16 pair observations, exception 600 ms two observations).

Wideband Activation and Activation Q Parameters Dependence—Fixed Values: Wideband Activation is a parameter that provides RF voltage with a wide range of excitation frequencies. While it might be useful for multiple fragmentation of the precursor and its fragment ions, this parameter can only be switched on or off without control for energy deposition. FERMS techniques used with Wideband Activation were statistically significant (p-value<0.05 for all observations) in respect to the standard method with $FR_{50}$ at intensity 2.5E6 (22.4±0.3 eV and 18.7±0.3 eV, respectively). Because this parameter offers no advantages for FERMS methods, it should be avoided.

Another parameter that directly affects FERMS values was Activation Q, which allows adjusting of the RF frequency used in fragmentation. Typically, a smaller value for this parameter results in less energy deposition/fragmentation but allows for observation at lower m/z fragments, extending the ion trap so-called "⅓ rule." Experiments lowering Activation Q to 0.05 produced no observable fragment, m/z 125.0153. With less energy deposition, greater FERMS values were expected with comparison to the standard (Q=0.25) method; instead the opposite was observed with $FR_{50}$ of 12.4±0.2 eV (3.5E5 intensity) vs. 17.5±0.3 eV (7.4E5 intensity), respectively. Intensity-adjusted values were still statistically significant (p-value<0.05) for this observation. Because this parameter affects multiple variables, i.e. FERMS values and fragment presence/absence, it is advised to fix this value for all observations (e.g. 0.25 as in STM).

Other Parameters—No Dependence: The Microscans (µsc) parameter affects how many scans are summed in the background to produce a final, single output. Only FT-MS$^n$ mode had any influence on the data output—increasing the number of Microscans increases the acquisition time. The relationship was almost linear as it produced 17 breakdown curves for 1 µsc, 3 curves for 6 µsc and 1 curve for 15 µsc, while no FREMS values were affected (p-value>0.05, Table S.8). A single breakdown curve for 15 µsc had low signal-to-noise, resulting in high fitting error for the statistical model and was omitted from consideration for $FR_{50}$ comparison; otherwise, no differences between FREMS methods were observed (p-value>0.05 for n=36 pair observations). Because Microscans were the most influential parameter in reducing acquisition times without affecting FREMS values, it is advised to set the value to 1 µsc and, if necessary, perform any smoothing post data acquisition. Remainder of controllable parameters: Mass Range, Data Type, Resolution had no effect on FREMS values (p-values>0.05 for all.). However, lower resolution sped up acquisition time, since it lowered transient times inside the Orbitrap. However, by applying FREMS framework, these compounds can be readily differentiated, with $FR_{50}$ values of: 24.1 eV, 34.8 eV, and 26.7 eV, respectively (FIG. 36).

Figure 36:
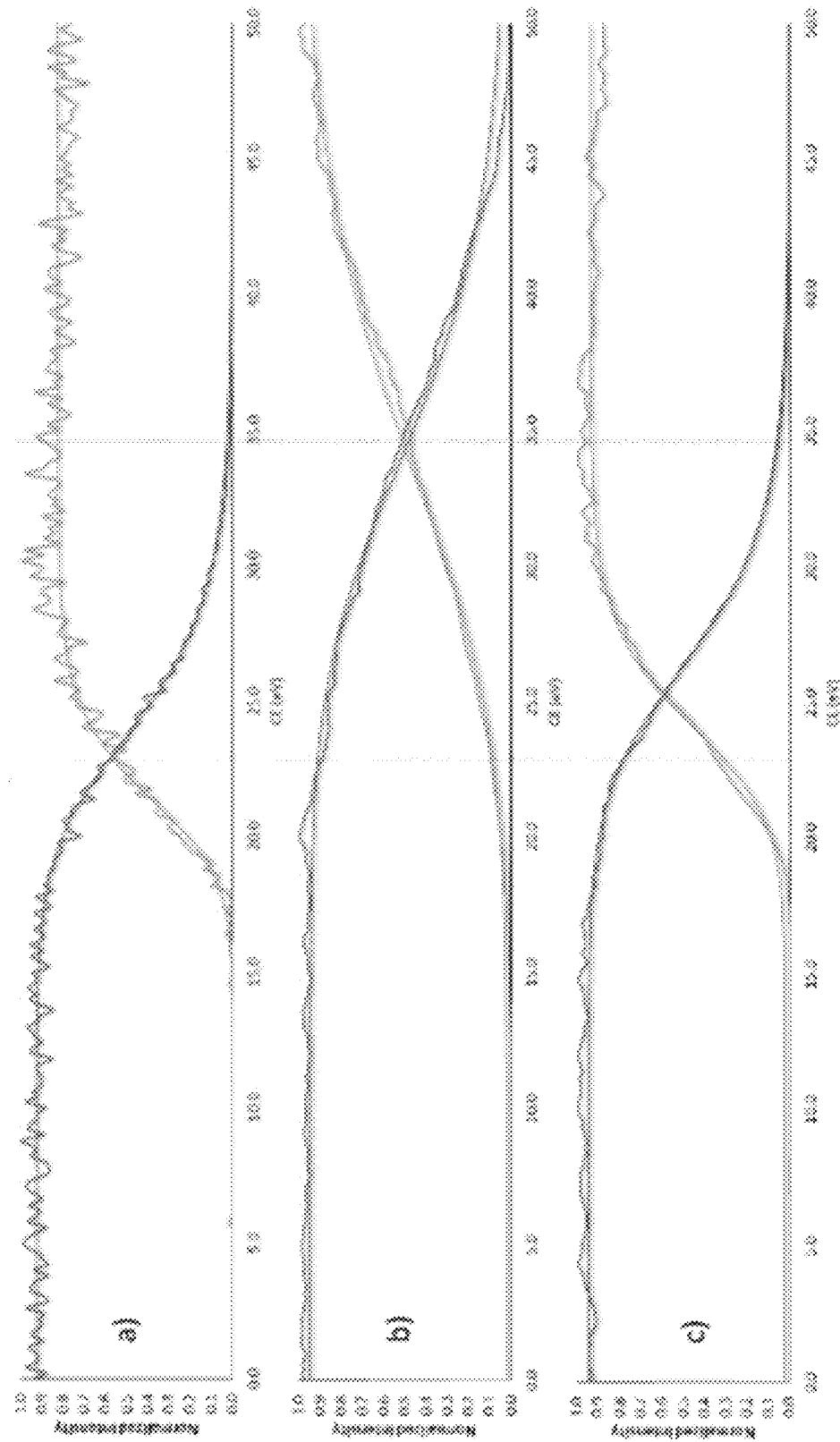
FIG. 36 illustrates a FREMS analysis showing ready differentiation of a) 2-NP; b) 3-NP; and c) 4-NP according to an example embodiment.

FIG. 36 illustrates a FREMS analysis showing ready differentiation of a) 2-NP; b) 3-NP; and c) 4-NP according to an example embodiment.

FREMS—Differentiation of Similar Compounds: Here we use 2-, 3-, and 4-nitrophenols (NP) as a trivial example, showing that precursor ion, m/z 138.0197 [M−H]−, produces a single fragment, m/z 108.021 [M−NO]●−, during MS/MS experiments regardless of the mode of ionization (ESI- or APCI-), resulting in indistinguishable spectra (FIG. S.5).

FREMS—Data Cleanup: Addition of the energy dimension provides orthogonality to MS and chromatographic approaches. The power of FREMS for structural elucidation was demonstrated using 4-ClBP, m/z 204.0571.

Figure 37:
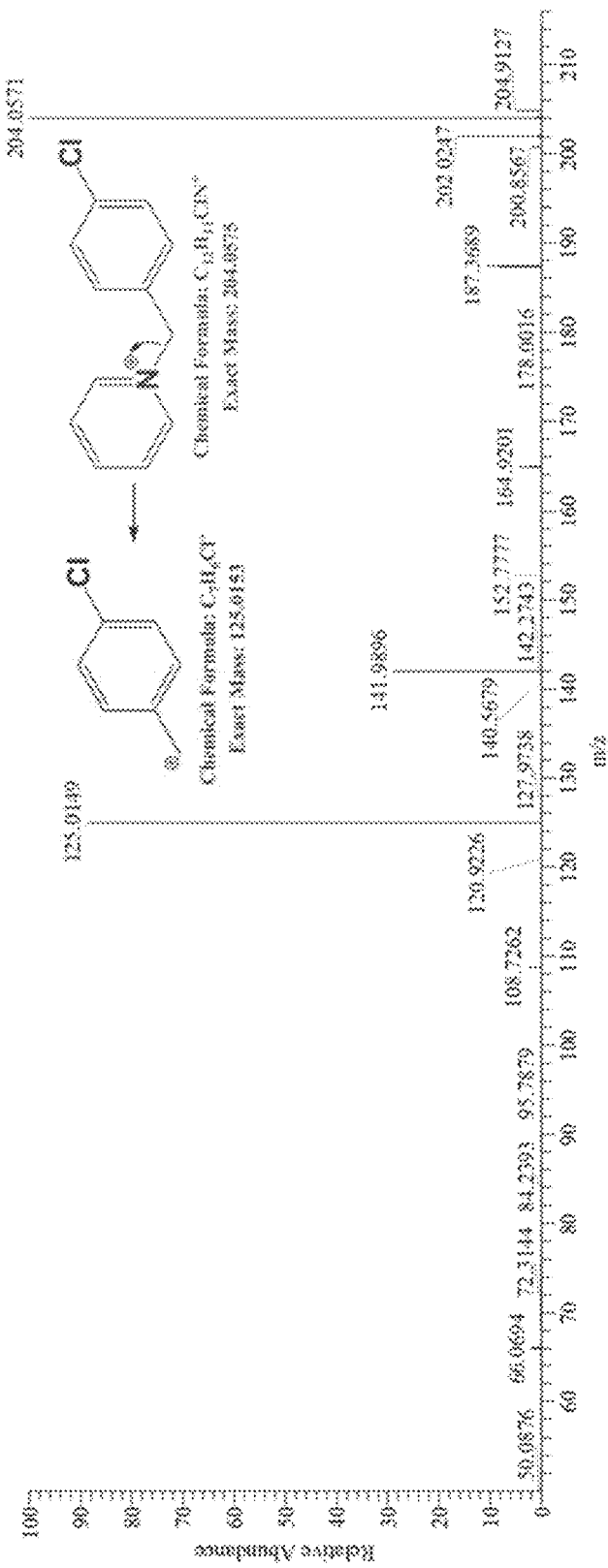
FIG. 37 illustrates $MS^2$ according to an example embodiment.

FIG. 37 illustrates $MS^2$ according to an example embodiment. The "first stage" ($MS^2$) under the current method for mass spectral tree building. First stage $MS^2$ experiments for [M]$^+$4-ClBP; spectra are averaged over 265 scan events—0-50 eV range.

TABLE 2

| FREMS values for 4-ClBP & its fragment, m/z 125.0149 (n = 6 replicates). | | | | |
|---|---|---|---|---|
| NI | C-I | m-SY$_{50}$ | FR$_{50}$ m/z 204.0571 | m/z 125.0149 |
| 6.66E+05 | 17.7 ± 0.2$^a$ (17.6)$^b$ | 17.6 ± 0.1 (17.6) | 17.6 ± 0.1 (17.6) | 17.5 ± 0.1 (17.5) |

$^a$standard deviation,
$^b$all combined curves (single value)

Here the isolation and fragmentation of 4-ClBP, m/z 204, was performed in the linear ion trap with subsequent accurate mass detection of primary "fragments" in the Orbitrap: m/z 202.0247, m/z 187.3689, m/z 164.9201, m/z 141.9896, m/z 125.0149. However, even high resolution/accuracy mass spectral data does not prevent possible structural misassignment. The thermometer ions have been well characterized; therefore, it was known that m/z 125.0149 was the only true fragment. In situations when compounds are unknown, any ion of high intensity in MS$^n$ experiments can mislead or complicate structural elucidation. These ions can come from multiple sources, including contamination of the sample or instrument. Thus, some of the products most likely correspond to impurities with a nominal mass of m/z 204 that cannot be readily separated from the ion of interest in the isolation window. This example emphasizes the pitfalls of the current spectral tree building process. It fails to distinguish between true fragments and artifacts or impurities, especially impurities of the same nominal m/z; thus, misdirecting structural assignments and work effort. The FREMS method addresses the shortcomings of current spectral tree building approach by making proper ion selection (i.e. directly correlated to precursor) as part of experimental data setup. Correlation of m/z 202.0247 to the precursor ion was highly questionable since it could only result from the loss of two hydrogen atoms. Accurate mass MS can disprove this outright, but in nominal mass instruments it can result in incorrect assignment.

Figure 38:
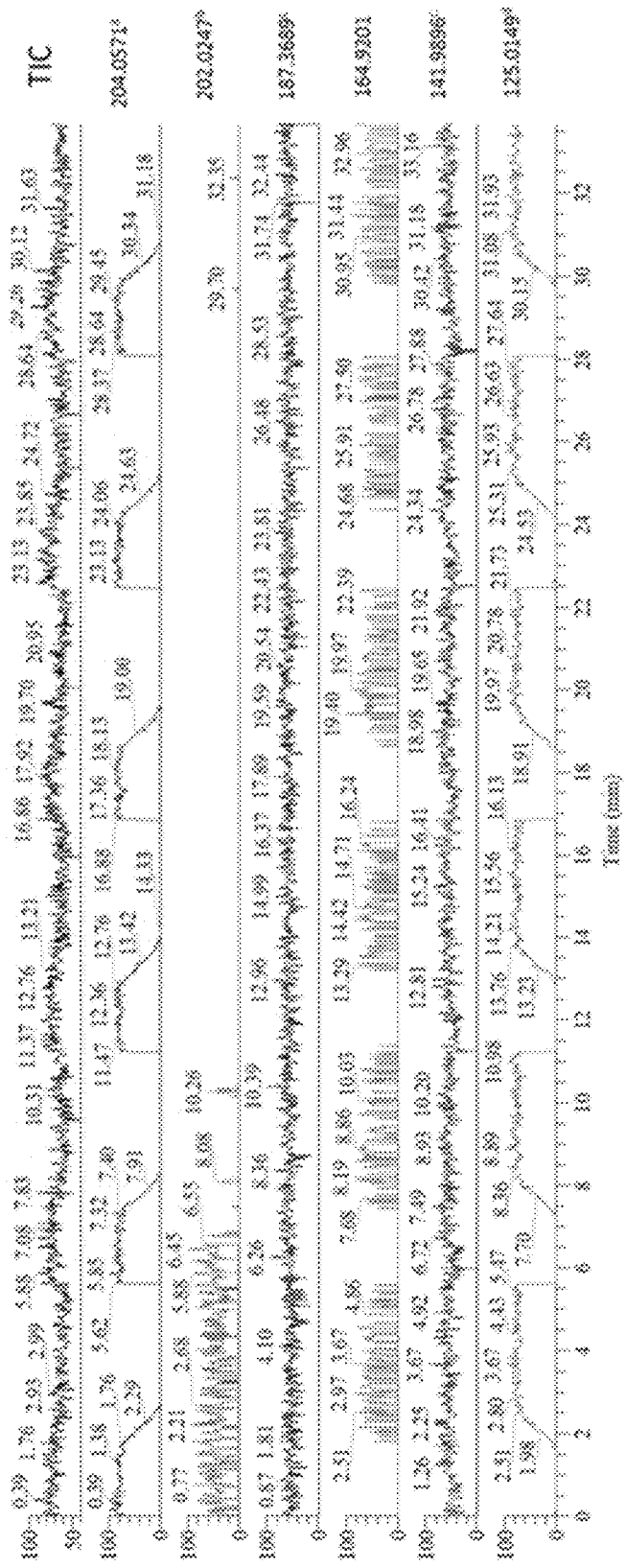
FIG. 38 illustrates FREMS curves of 4-ClBP fragments according to an example embodiment.

FIG. 38 illustrates FREMS curves of 4-ClBP fragments according to an example embodiment. The FREMS curves show 4-ClBP fragments (4) a) precursor; contamination b) sample, c) instrument; d) real fragment. FREMS allows objective, unequivocal elimination of m/z 202.0247. Examining FREMS extracted ion chromatograms (FIG. 38), shows that this ion disappeared in less than two acquisition cycles. Similarly, impurities that are always present during spectral scans can be easily identified with FREMS methodology because their traces do not fluctuate with energy ramps, e.g. m/z 187.3689 and m/z 141.9896. (Note: FREMS values need not be normalized when performing structural elucidation, as opposed to when doing compound differentiation.) The ion with m/z 164.9201 had different $FR_{50}$, $SY_{50}$ and C-I values from m/z 204.0575; thus, it is statistically eliminated as a real fragment. Only if the precursor and its fragment ions intersect at the same $FR_{50}$ (or C-I or $SY_{50}$) are they correlated; and only m/z 125.0149 produced the same FREMS values as those of the precursor ion. FREMS provides a two-prong solution for data cleanup and structural elucidation by focusing the analyst's efforts on only correct precursor-fragment transitions.

Fragmentation Resilience Energy Mass Spectrometry (FREMS) helps the analyst differentiate real products from impurities and interpret data, even if anticipated fragments are missing. FREMS encompasses and replaces SY applications. Evaluation and comparison showed that, in most cases, $FR_{50}$, C-I and m-SY values produce the same results (p-values>0.05 for 220 out 236 pair observation). Limited statistical difference between C-I and m-SY methods were attributed to low signal to noise data. Otherwise, all three methods can be used interchangeably. The process of ionization affects ion intensity (# of ions) but showed exceptional linear dependence over four orders of magnitude ($R^2$>0.99) and, therefore, can be calibrated. No statistical significance was found for FREMS results once they were intensity-adjusted, thus completely decoupling the ionization process (API) from the rest of the experimental conditions and putting FREMS values exclusively in the vacuum environment. Robustness of the method was tested 360 days apart and showed no statistical significance (p-value>0.05, for all observations). Such outcome allowed consistent product formation, as long as experimental conditions were the same. This, in turn, serves as a segue into creation of common databases that would simplify compound identification. Only Maximum Inject and Activation Times parameters directly influenced FREMS values. However, as with intensity dependence, they showed fairly linear relationship ($R^2$>0.95) and, thus, can be predicted. Robustness of FREMS methodology was demonstrated using 4-chlorobenzylpyridinium. It illustrated that the decomposition rate of the precursor must equal that of the appearance of its fragment when FERMS methods are used under CAD conditions, thus, providing direct correlation of true fragment to precursor. FREMS becomes a powerful method for detection and elimination of impurities and irrelevant fragments. It allows the analyst to concentrate on correlated fragments, which increases the efficacy of structural elucidation.

Fragmentation Resiliency Energy Mass Spectrometry (FREMS) is a 2-dimensional mass spectrometric technique that offers differentiation of closely related species, as well as, identification of unrelated ions resulted from contamination. Here we extend the use of this method to structural elucidation, using multi-stage $MS^n$ experiments, by fully characterizing [M+H]+ precursor ions of two model compounds—bupropion and glutathione. Isolation and fragmentation was performed in the linear ion trap-Orbitrap instrument, which allowed separation of the analysis into individual stages. The FREMS methodology usually produces fragments in sequential manner with each $MS^n$ stage being its own experiment. This simplifies elucidation of mechanistic pathways. Moreover, akin to cross-peaks in NMR spectroscopy, "cross-branching" resulting from a merger of two distinct FREMS pathways enhances the ability to define fragment structures based solely on MS data. Cross-branching anchors certain structural conformations in place, providing greater confidence in structural identification, and points to certain structural connectivity, making it a quasi-3D-MS technique.

Mass spectrometry (MS) is a powerful analytical tool for compounds identification and structural confirmations. Use of accurate mass instruments, isotopically labeled compounds, and isotopic patterns along with hyphenated techniques aid the establishment of connectivity and stereochemical annotation, but currently the most powerful $MS^n$ approach for structural elucidation is based on "growing" spectral trees. Briefly, during the first stage ($MS^2$), the analyst isolates the ion of interest and establishes its primary fragmentation pattern, usually at a single energy level. In the next step ($MS^3$), the analyst isolates the precursor's product and further fragments it at the same or different energy level, producing the next family of fragments. This procedure is repeated until the lowest $MS^n$ threshold or some user defined parameters or experimental limitations are met. However, due to the nature of atmospheric pressure ionization (API) LC-MS instruments, the tandem mass spectrometry data generated by these steps are generally less reproducible between laboratories than electron impact (EI) data, thus limiting library creations.

Fragmentation Resilience Energy Mass Spectrometry (FREMS), as discussed above, expands on previous MS/MS methods based on energy resolved mass spectrometry (ERMS), and extends it to multi-stage ($MS^n$) experiments at a near continuous energy ramp (0.2 eV increments). This method proved to be reliable for compound differentiation and contaminant elimination and here will be described for mechanistic structural elucidation. FREMS exploits the energy dimension of mass spectral data (2D-MS). Applying the method involves examining ion breakdown/formation curves as the resonance excitation in an ion trap is incrementally increased. These curves themselves can be used or computationally modeled by several means to give the single metrics: Fragmentation Resilience ($FR_{50}$), modified-Survival Yield (m-$SY_{50}$) or Cross-Intersect (C-I). A full panel of testing using linear ion trap-Orbitrap MS revealed that breakdown energies depend only on parameters that control the ion population inside the ion trap. However, a fairly linear relationships ($R^2$>0.95) between those parameters and proposed $FR_{50}$, m-$SY_{50}$ and C-I metrics provide a way for adjustments via calibrations. As a result, as long as ions are produced, any processes happening during API are irrelevant, putting the whole application exclusive inside the vacuum environment, which promotes reproducibility across different labs.

Herein FREMS is applied for structural elucidation of bupropion, a well-known CYP2D6 inhibitor in drug-drug interaction studies, and glutathione that plays an important role as an abundant antioxidant in biological systems. Embodiments include the application of FREMS methodology using a linear ion trap-Orbitrap MS, but should be applicable to any trap-type MS (e.g., such as beam instruments).

Experimental Section

Chemical and Reagents: Optima™ LC/MS grade acetonitrile, methanol, water and reduced glutathione (GSH) were purchased from Fisher Scientific (Fair Lawn, NJ, USA). Bupropion Hydrochloride (>98%) was purchased from TCI (Portland, OR, USA).

Instrumentation: Experiments were performed on Thermo Scientific LTQ Orbitrap XL™ in MS/MS mode using direct infusion with Hamilton syringe (i.d. 4.61 mm). Specific m/z isolation was done in a linear ion trap with detection in a high-resolution Orbitrap. Standard method conditions (STM) were described above; here we list only certain conditions: ESI+ mode; no in-source CID; sheath gas—15 (arb); auxiliary gas—3; sweep gas—0; ionization voltage—4.5 kV; FT-MS$^n$ Ion Population Injection—1E5, FT Inject Time—100 ms, Activation Time-30 ms, Wideband Activation—off; Activation Q—0.25; acquisition time=33 min; number of FREMS breakdown curves=6. Note, FREMS values do not need to be normalized for structural elucidation, as oppose to compound differentiation as discussed in Part I. In multi-stage FREMS experiments each precursor ion was fragmented at 50 eV to produce product ion scans for the next stage. For example, the precursor ion of GSH, m/z 308, was trapped and fragmented at 50 eV, to produce m/z 179 (MS$^2$). In MS$^3$ stage, m/z 179 was trapped and fragmented by incrementally increasing voltage from 0 to 50 eV to produced m/z 162. In the MS$^4$ stage, m/z 162 was isolated and fragmented to produce its own product spectra: m/z 308 (50 eV)→m/z 179 (50 eV)→162 (0-50 eV).

Methods Description and Data Evaluation: Fragmentation Resilience (FR), modified-SY (m-SY) and cross-intersect (C-I), collectively referred to as FREMS methods/techniques/values, were described above. The underlying concept is to trap or filter and then fragment ions of interest using a controlled, incremental energy ramp (0 eV to 50 eV). First, an ion is trapped inside the LTQ and the data is collected at 0 eV for 15 scans to establish the baseline. This allows spectra averaging for assessing background interferences and better algorithm fitting for ions that had extremely early Onset breakdown. Following initial baseline collection, an energy ramp was employed.

Figure 39:
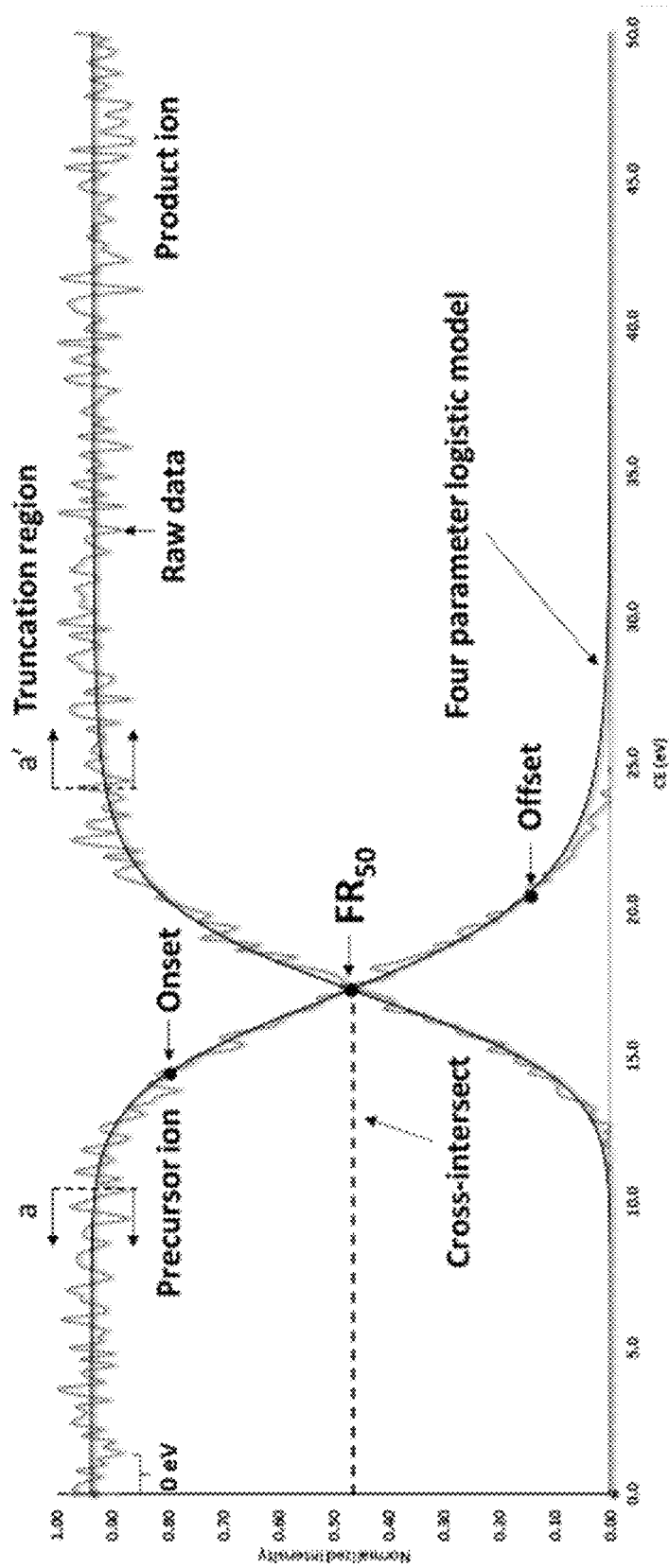
FIG. 39 illustrates FR (statistical) according to an example embodiment.

FIG. 39 illustrates FR (statistical) according to an example embodiment. FR (statistical) shows identical FR50 value as C-I (non-statistical) when applied to precursor ion & its fragment. To assure the appearance of continuous data collection and increase resolution, the ramp from 0 eV to 50 eV was performed in 0.2 eV steps (250 points) (see FIG. 39). On Thermo LTQ-Orbitrap™ MS, for example, only one segment was used that allowed scheduling of 265 scans in a single run. Breakdown curves were collected in replicates (n=6) to perform statistical analysis and improve signal-to-noise ratios. Individual traces were normalized to the same scale (e.g. 0-1, or 0-100). The inflection points provide a single metric for the breakdown energy of the ion and can be either statistically modeled (FR$_{50}$, m-SY$_{50}$) or manually inferred (C-I). These metrics are the foundation for structural elucidation, based on the hypothesis that the rates of precursor decomposition and corresponding rate of fragment formation are the same. Meaning, "true" fragments must intersect at inflection points with corresponding precursor ion for normalized data. If they do not, then they belong to a different ion or are impurities.

A single stage precursor ion-fragment correlation was described above for model compound 4-chloro-benzyl-pyridinium (thermometer) ion. Due to specificity of ion traps only "primary" fragments are being formed during each stage, with the exception of partial decompositions caused by "overtones," i.e. RF frequency used for precursor fragmentation also partially activates the fragment ion. Examples of these are shown below. To accommodate full compound characterization, akin to a spectral tree building approach, data-dependent acquisition was employed to sequentially trap and fragment each ion of interest, but using FREMS energy ramp, rather than a single energy level. Data analysis and cleanup were performed using the FR method (described above). It offers advantages over the other methods because it is statistical, unlike C-I, and requires less data manipulation, unlike m-SY. In rare cases when S/N of the extracted traces prevented meaningful statistical analysis, C-I, in combination with m-SY, was used as an alternative. Segregating each stage into a separate CAD experiment allowed focus on correlated precursor-fragment(s) pairs only, thus simplifying structural elucidation.

Although the above description (Part I) claimed that a precursor and its true fragments would exhibit the same FR$_{50}$ value, there were cases where the fragment exhibited slightly smaller FR$_{50}$ values that were statistically different than the precursor (p-value<0.05). This observation appeared to correlate with fragmentation proceeding through either radical or rearrangement mechanisms. To distinguish these ions from unrelated fragments, another metric, Onset, must be used. The justification for small FR$_{50}$ values, i.e. appearance at higher RF values, is that such gas-phase reactions are kinetically favored and thus proceed at faster reaction rates. However, true primary fragments are never observed at a lower FR$_{50}$ than that of the precursor, limiting FREMS values for real fragments to overlap no higher than their inflection points.

Results and Discussion

Figure 40:
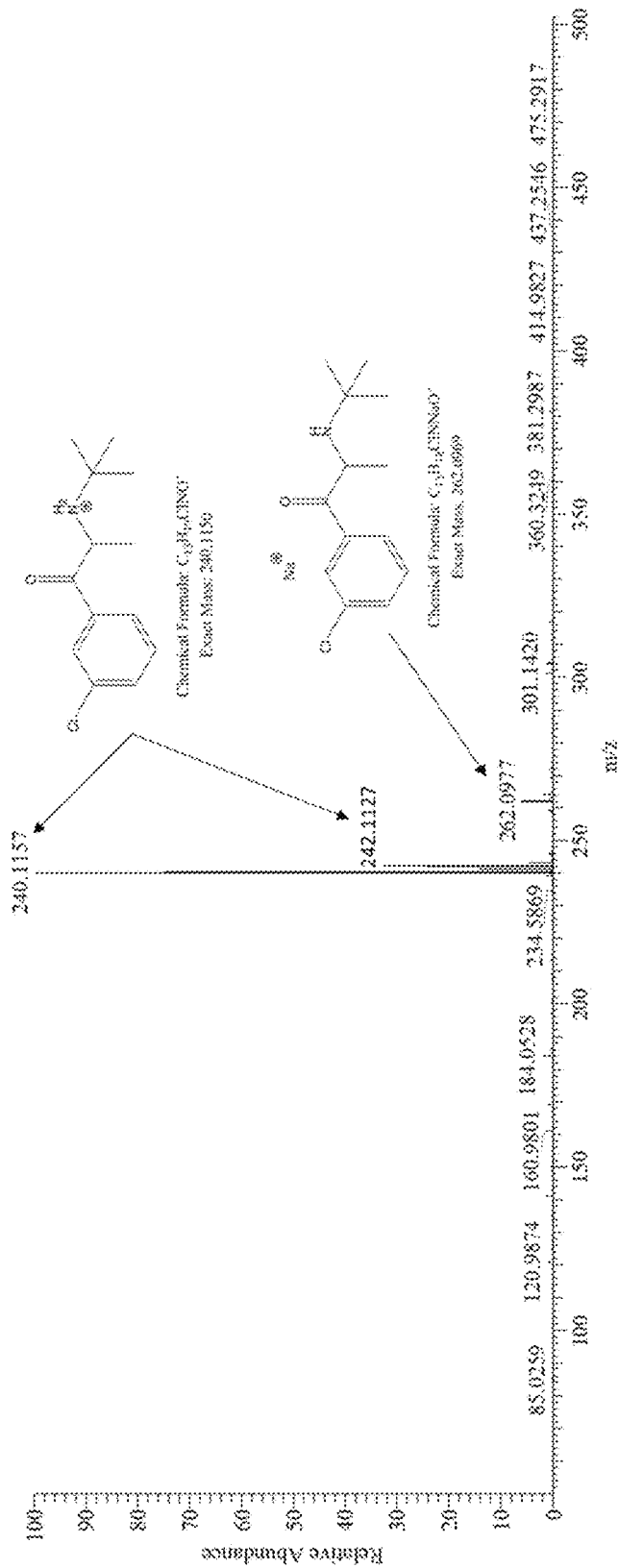
FIG. 40 illustrates a full scan MS of Bupropion according to an example embodiment.

Multi-Stage FREMS Structural Elucidation—Bupropion:

FIG. 40 illustrates a full scan MS of Bupropion according to an example embodiment. The Full scan MS of Bupropion was averaged over 0-50 eV (n=265), showing m/z 240.1157 ($^{35}$Cl)[M+H]$^+$, m/z 242.1127 ($^{37}$Cl)[M+H]$^+$ and m/z 262.0977 [M+Na]$^+$. A full scan of bupropion in methanolic solution produced a simple spectrum with protonated molecule at m/z 240.1150 (FIG. 40). Because it featured a chlorine atom, the characteristic isotopic peak at m/z 242.1120 was also observed. Isotope confirmation and accurate mass capabilities are a great help for complex pathways elucidation. Sodiated adduct, m/z 262.0969, was also present but provided little insight into fragmentation mechanisms and, therefore, was omitted from consideration. The fragmentation of bupropion has been characterized by quadrupole and ion trap mass spectrometers using various sources, but it was noted that high-resolution mass measurements revealed extensive gas-phase rearrangements that was disguised by nominal mass instruments.

Figure 41A:
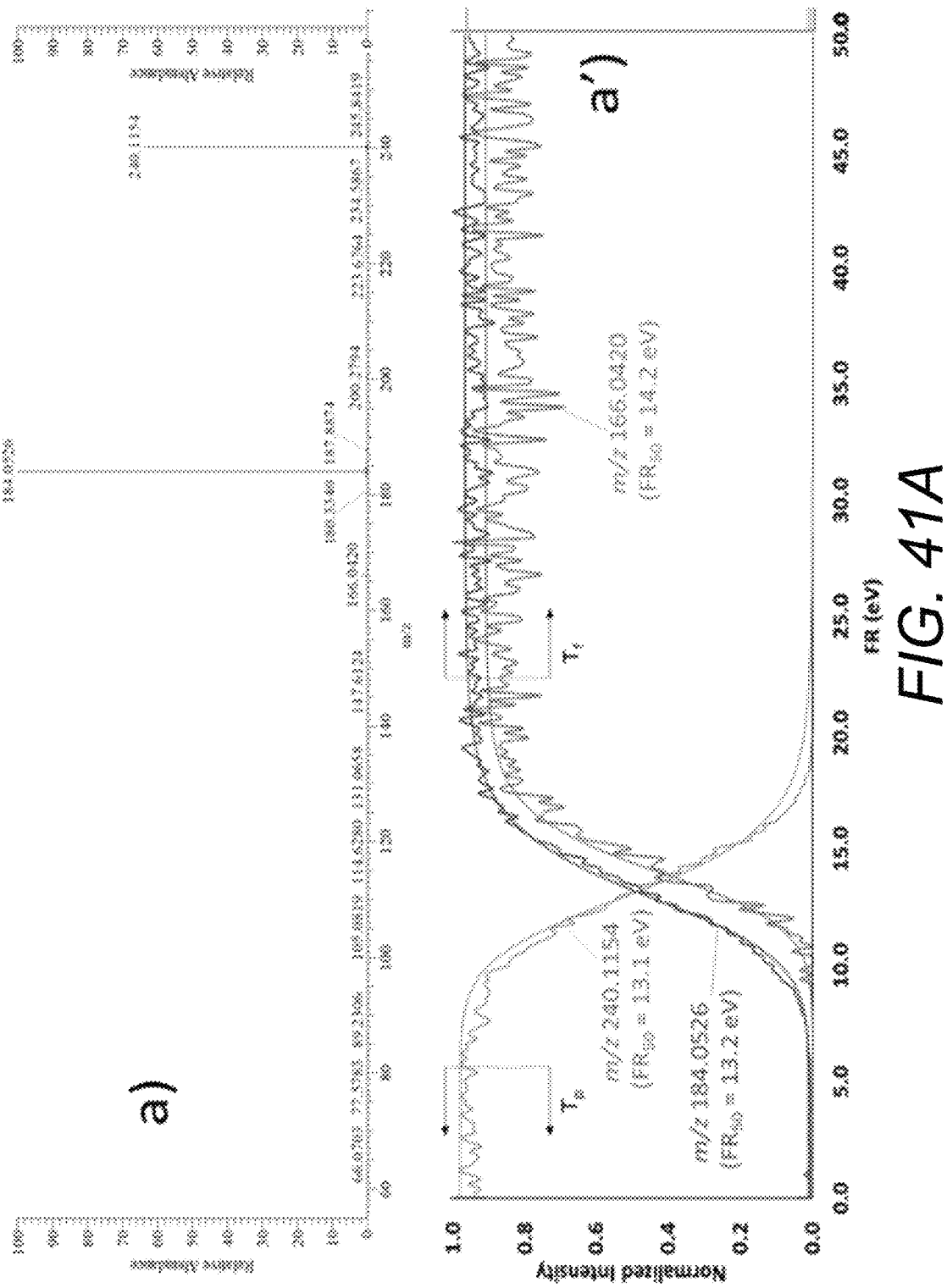
FIG. 41A and FIG. 41B illustrate a series of CAD FREMS experiments according to an example embodiment.
Figure 41B:
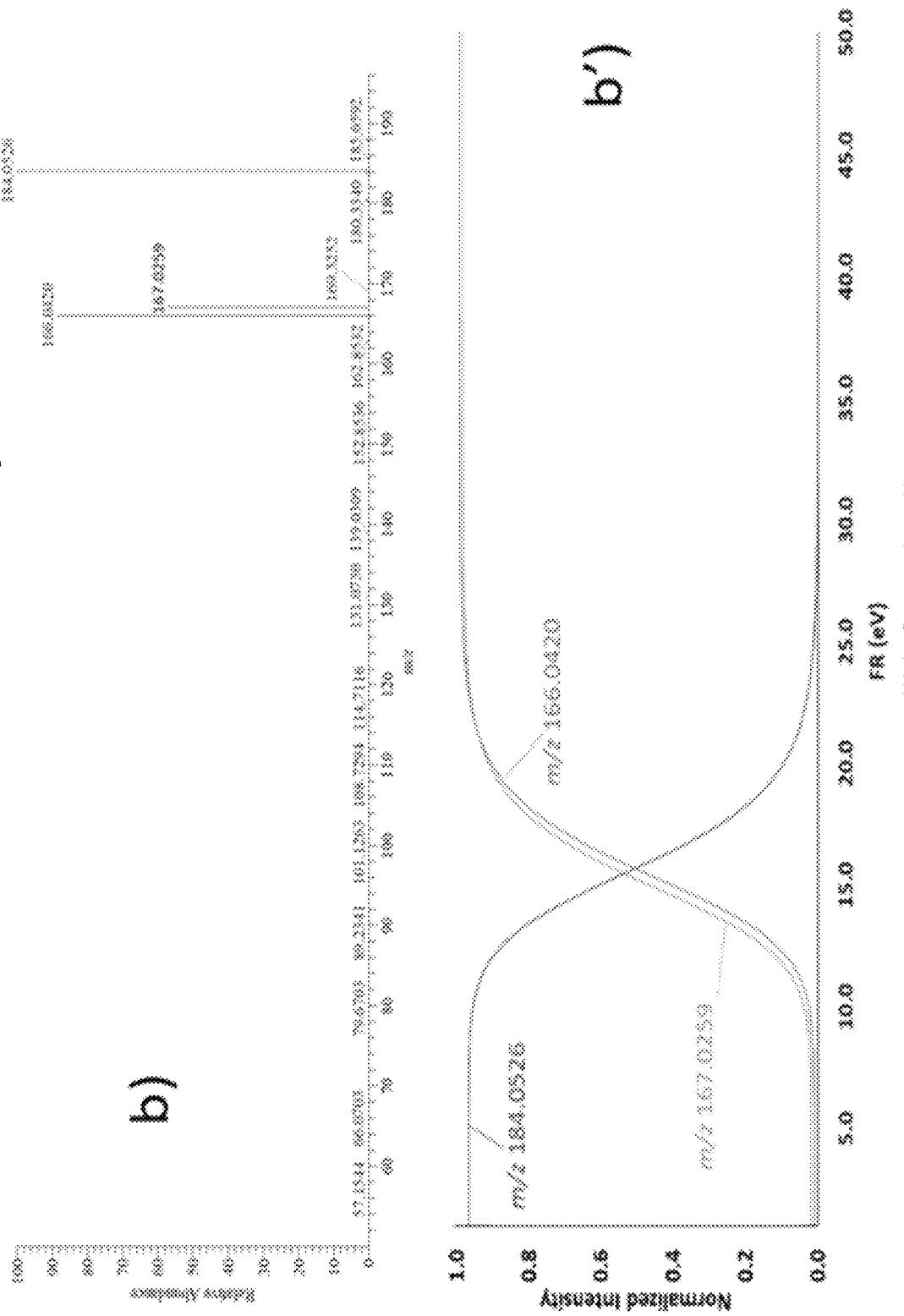

FIG. 41A and FIG. 41B illustrate a series of CAD FREMS experiments according to an example embodiment. The series of CAD FREMS experiments show: (a) isolated m/z 240 ($^{35}$Cl) [M+H]$^+$; (a') FREMS statistical analysis (FR) shows raw data with 4-parameter sigmoidal model—$T_p$ and $T_f$ are truncated regions (5-10 point moving average) for precursor and fragment ions, respectively; (b) MS$^3$ for m/z 240→184; (b') FR 4-parameter sigmoidal model for truncated data produced by FREMS in (b). A series of isolation and FREMS fragmentation steps were performed on all detected fragments to provide a full, 2D-MS projection of bupropion behavior. First stage (MS$^2$) CAD experiments on protonated ion, m/z 240.1150, revealed formation of m/z 184.0524 and m/z 166.0418 (FIG. 41A a)). FREMS analysis showed that only m/z 184.0524 was directly related to m/z 240.1150, with $FR_{50}$=13.1 eV and 13.2 eV, respectively (FIG. 41A a')). The m/z 166.0418 ion (<2% TIC) had different $FR_{50}$ (14.2 eV) and Onset values and was either an artifact (data cleanup described in Part I) or more likely a secondary fragment caused by RF activation of m/z 184.0524.

Another characteristic of a secondary fragment is that one of the future stages, e.g. MS$^3$ for m/z 184.0524, should contain said ion, e.g. m/z 166.0418, even at no energy input (0 eV), because it was already being produced in a prior stage. Such conditions will be referred to as "leak-through" effect. Since, $FR_{50}$ values for m/z 240.1150 and m/z 184.0524 were almost identical, it most likely proceeded via a single mechanistic pathway. The ($^{37}$Cl) isotope experiments confirmed the fragmentation pathway and energy distribution with virtually identical results for m/z 242.1120 (13.2 eV), m/z 186.0494 (13.1 eV) and m/z 168.0389 (14.2 eV). Note, for structural elucidation the only important parameter is the $FR_{50}$ within a single stage because all ions experience the same conditions during an isolated experiment. Therefore, the only obvious mechanistic choice was a unimolecular loss of butene moiety. For that to happen, protonation must be at carbonyl oxygen, as shown in FIG. 42, B1.

Figure 42:
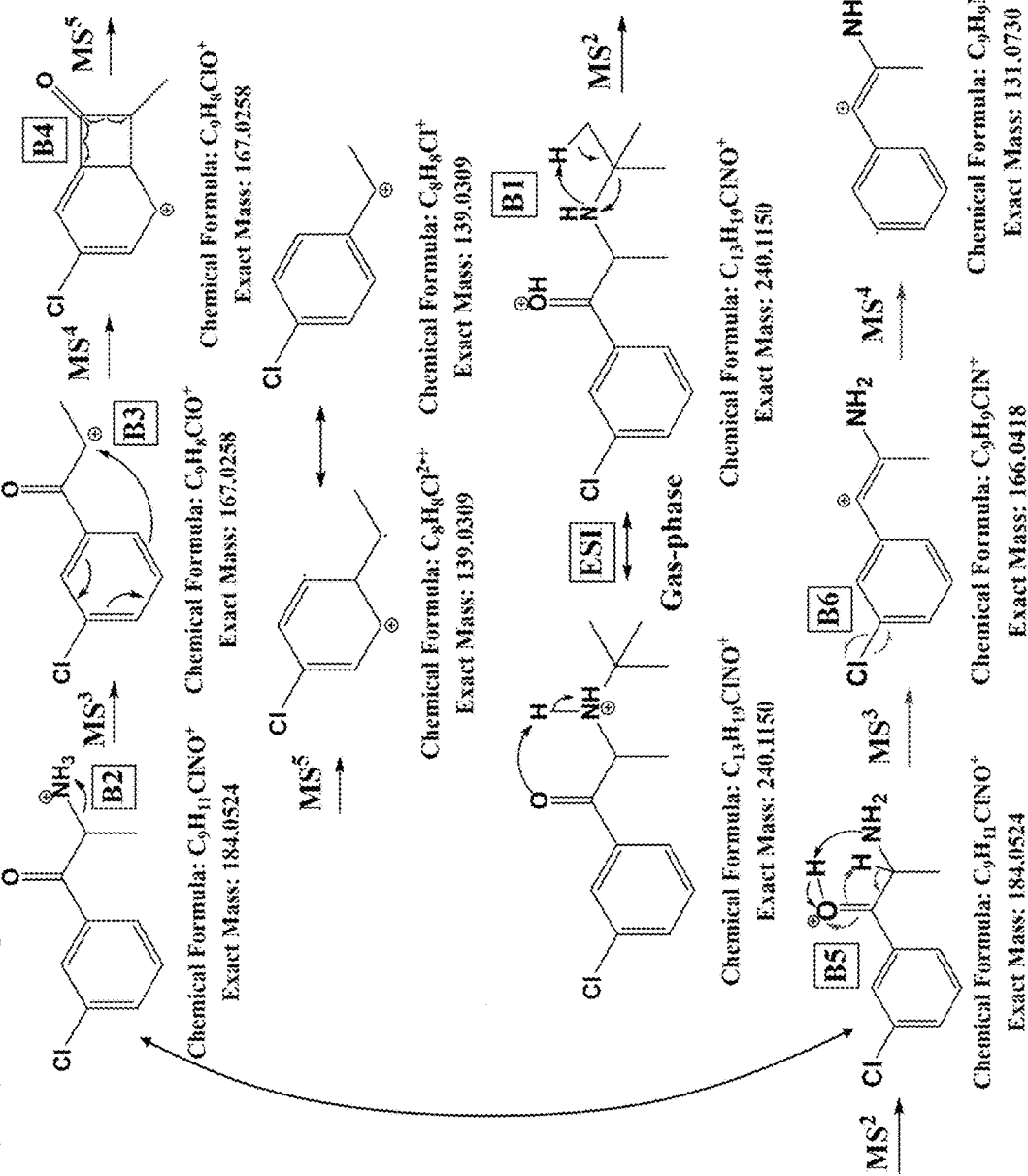
FIG. 42 illustrates a proposed bupropion fragmentation mechanism based on FREMS framework for $^{35}Cl$ according to an example embodiment.

FIG. 42 illustrates a proposed bupropion fragmentation mechanism based on FREMS framework for $^{35}$Cl according to an example embodiment. This is further evidence for 0-tautomer protonation associated with protic solvents (e.g. methanol, water, FIG. 42, ESI), in contrast to N-protonation in aprotic solvent that causes "kinetic trapping." Therefore, FREMS provides insight into not only elemental composition but possible structural conformation.

The MS$^3$ stage for precursor m/z 184 revealed two fragment ions m/z 167.0258 (loss of NH$_3$) and m/z 166.0418 (loss of H$_2$O). The latter was already observed during MS$^2$ experiments, albeit low intensity, suggesting that m/z 184 was activated by an RF overtone. Interestingly, both fragments were present at 0 eV, which is characteristic of a leak-through effect. Most likely, the m/z 167.0258 was not different from the noise and thus was not detected in MS$^2$ stage, which was supported by its intensity in comparison to m/z 166.0418 (see FIG. 41B b)). The $FR_{50}$ values for m/z 184.0524 and most intense fragment, m/z 166.0418, were virtually identical at 15.8 eV and 15.7 eV, respectively (see FIG. 41B b')). The observed shift in $FR_{50}$ value for less intense fragment, m/z 167.0258 (15.3 eV), can be attributed to the difference in conformation/ionization site through which the fragmentation had taken place. Thus, FREMS predicted that the mechanism for formation of these two fragments had to branch off into two independent pathways (FIGS. 42—B2 & B5). Isotopic evaluation revealed about the same $FR_{50}$ difference for m/z 169.0229 (14.8 eV) compared to 15.2 eV for m/z 186.0494 and m/z 168.0389, confirming this assumption.

Figure 43A:
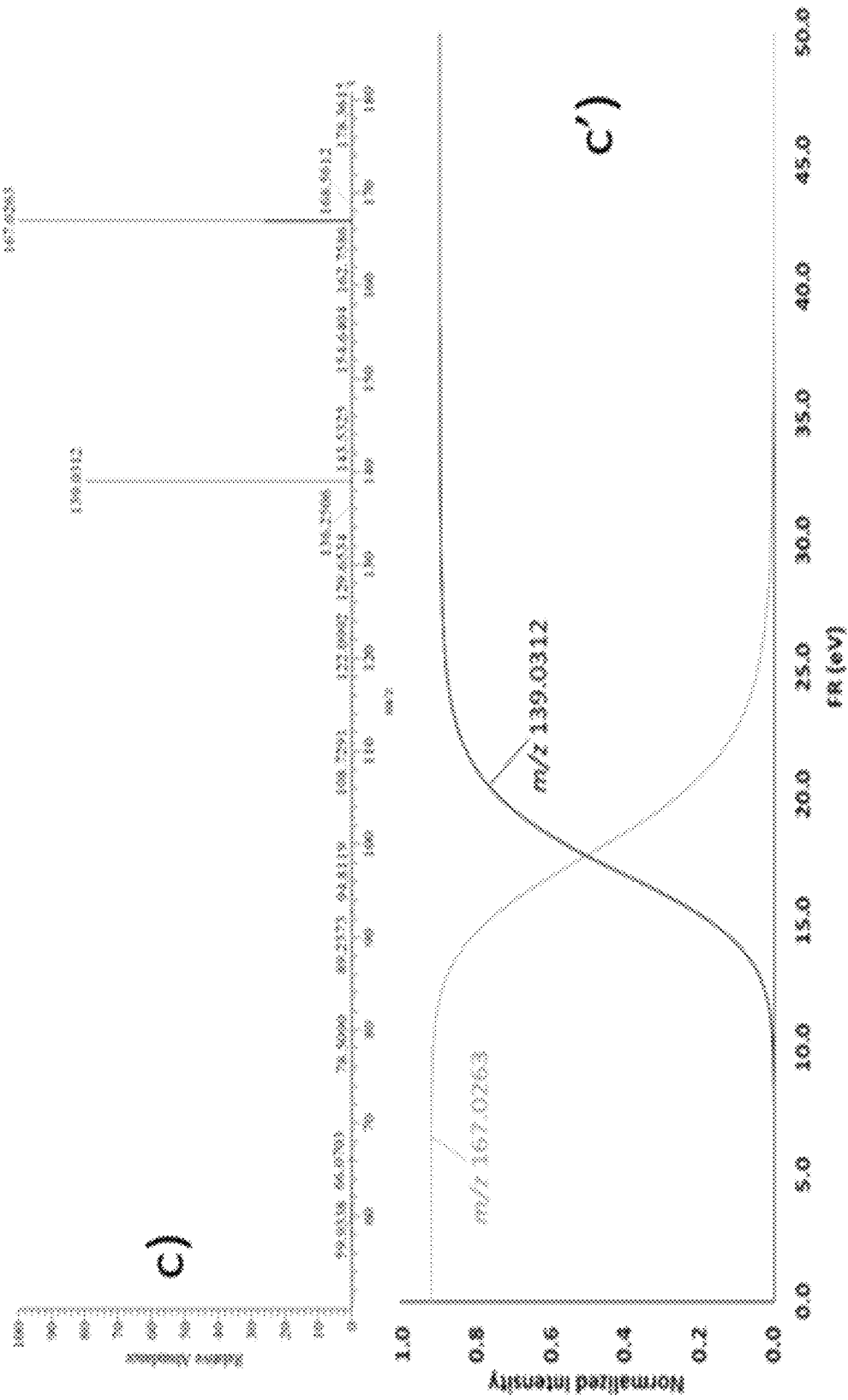
FIG. 43A and FIG. 43B illustrate a series of ($^{35}Cl$) CAD FREMS experiments according to an example embodiment.
Figure 43B:
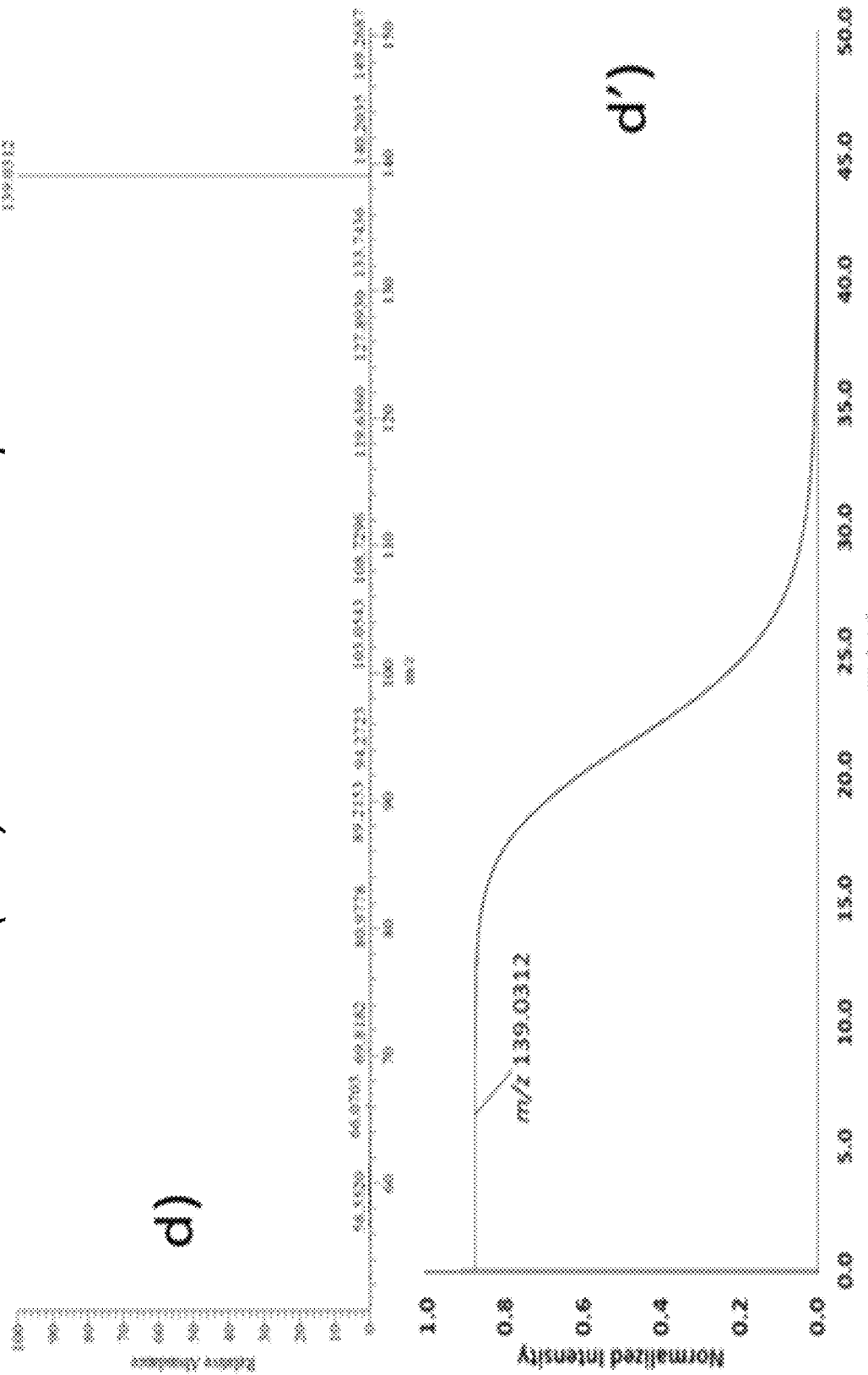

FIG. 43A and FIG. 43B illustrate a series of ($^{35}$Cl) CAD FREMS experiments according to an example embodiment. The series of ($^{35}$Cl) CAD FREMS experiments are for the m/z 167 branch of FIG. 41A and FIG. 41B: (c) MS$^4$ for m/z 240→184→167; (c') FR 4-parameter sigmoidal model for FREMS truncated data in (c); (d) MS$^5$ for m/z 240→184→167→139 shows terminal ion in the branch; (d') FR 4-parameter sigmoidal model for truncated data produced by FREMS in (d). The third stage CAD experiments (MS$^4$) for m/z 167 ($FR_{50}$=17.9 eV) ion showed presence of a single fragment, m/z 139.0309 ($FR_{50}$=17.2 eV), FIG. 43A c). The Onset values for m/z 167.0258 and 139.0309 were 14.1 eV and 14.0 eV, respectively (FIG. 43A c')), with similar observation for isotope confirmation m/z 169.0229 and 141.0280 at 14.0 eV.

This was in line with FREMS conditions for either rearrangement or radical pathway. The most plausible mechanism is cyclization at the α-carbon (NH$_3$ loss site in MS$^3$ stage) into an unstable four-membered ring and subsequent homolytic cleavage of carbonyl bonds (B3, B4). Thus, FREMS indicated a mechanism with a loss of CO with rearrangement, instead of loss of C$_2$H$_4$ without rearrangement that had been previously reported. Accurate mass measurements confirmed that CO instead of C$_2$H$_4$ was lost, validating FREMS results. In the final stage (MS$^4$), m/z 139, and similarly $^{37}$Cl m/z 141, did not produce any fragment ions in the ion trap (FIG. 43B d)). In the absence of fragments, FR method only can be used for this stage of experiments (FIG. 43B d')). This concluded the sequential characterization of m/z 167 branch, where each fragment(s) formation was bounded by its own isolated stage experiment.

The second branch of CAD experiments from ($^{37}$Cl) m/z 186.0494 and ($^{35}$Cl) m/z 184.0524 resulted in production of (37Cl) m/z 168.0389 and (35Cl) m/z 166.0418, respectively, as was described above. Virtually identical $FR_{50}$ values for precursor-fragment pairs indicated that FREMS did not suggest any rearrangement or radical mechanism. Therefore, a simple heterolytic cleavage of the water moiety was most likely the mechanism through which the fragment ion was formed (FIG. 42, B5), instead of rearrangement reported elsewhere.

Figure 44A:
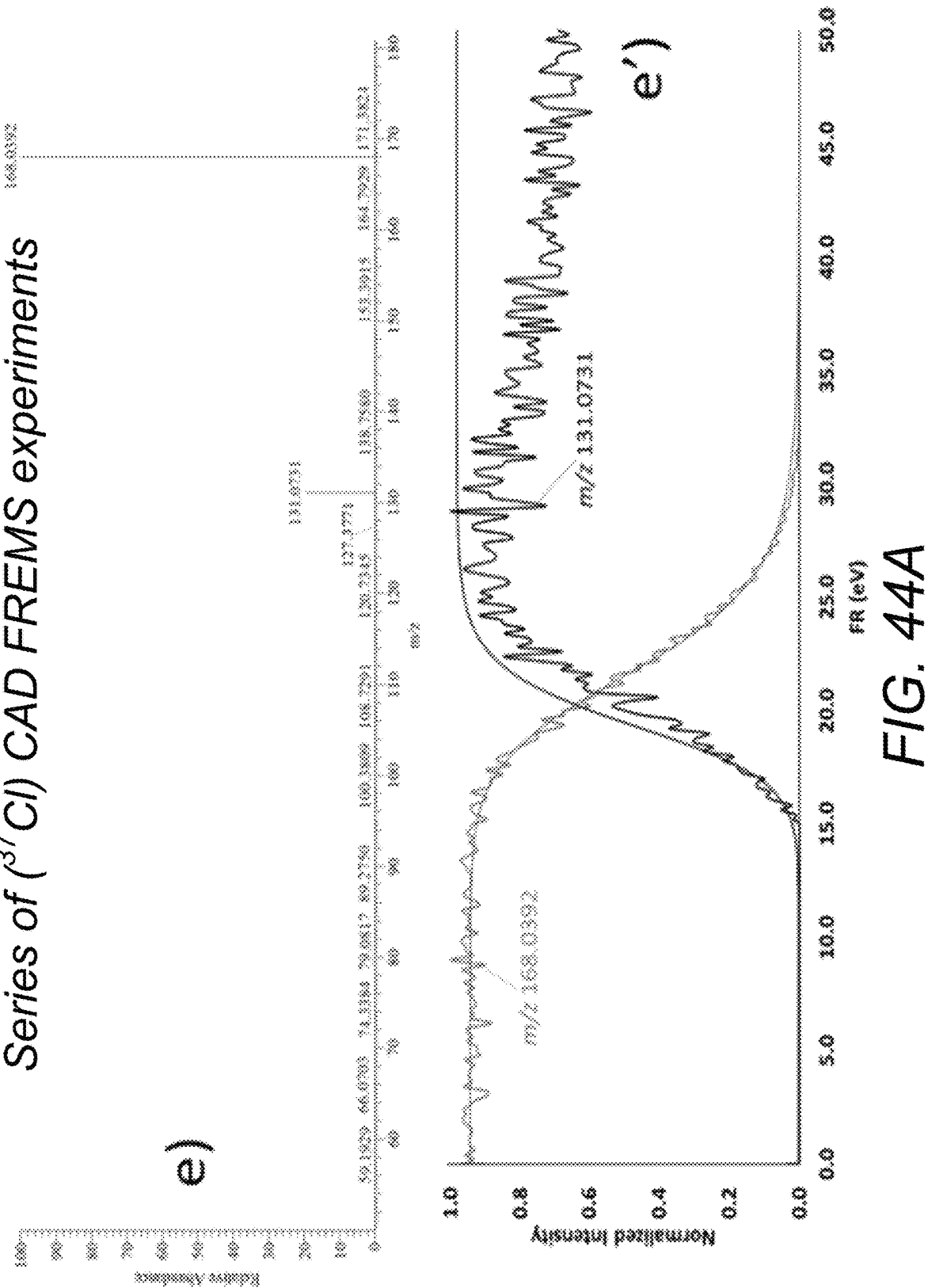
FIG. 44A and FIG. 44B illustrate a series of ($^{37}Cl$) CAD FREMS experiments for m/z 168 branch according to an example embodiment.
Figure 44B:
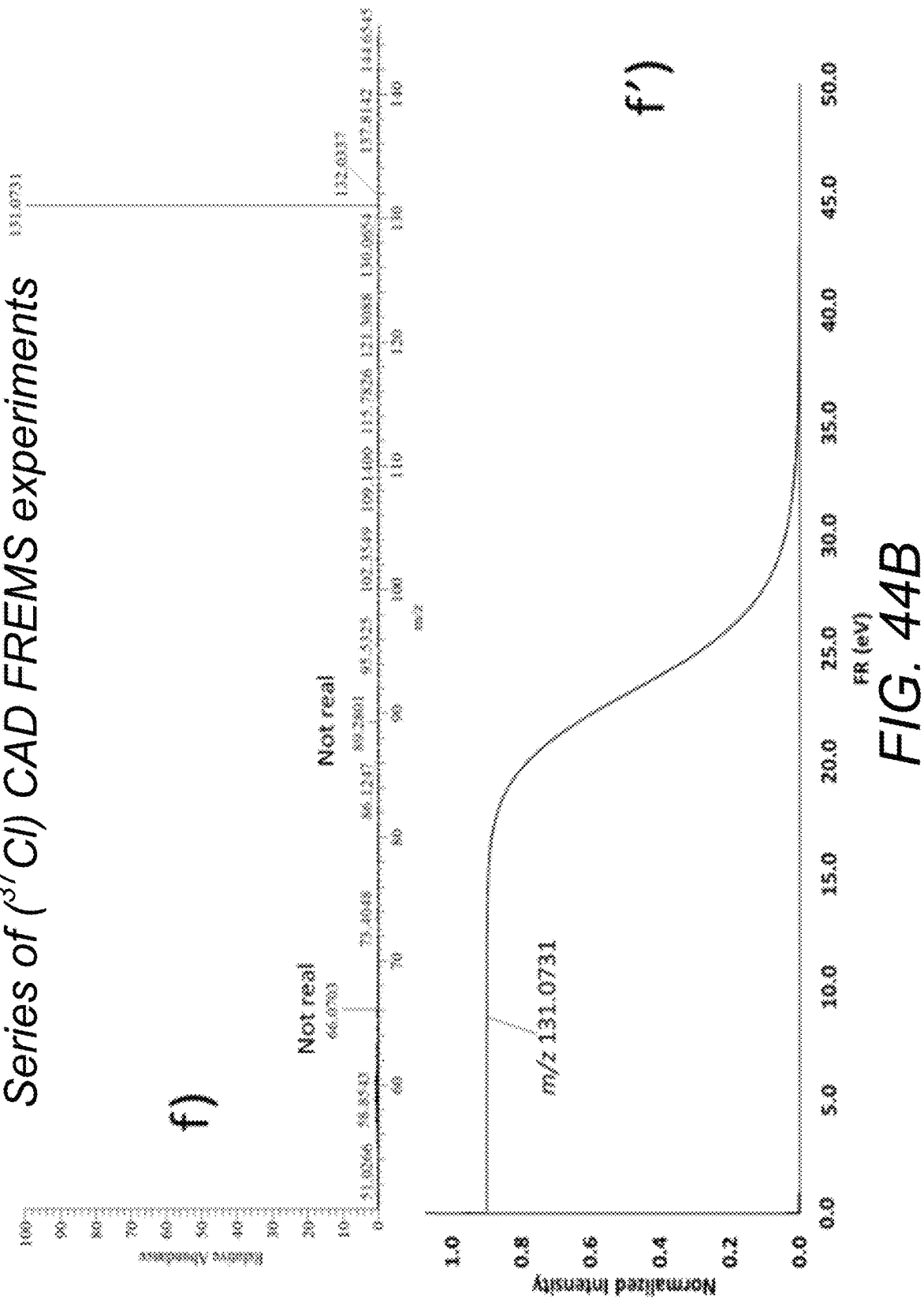

FIG. 44A and FIG. 44B illustrate a series of ($^{37}$Cl) CAD FREMS experiments according to an example embodiment. The series of ($^{37}$Cl) CAD FREMS experiments for m/z 168 branch illustrate: (e) MS$^4$ for m/z 242→186→168; (e') raw data and FR 4-parameter sigmoidal model for FREMS truncated data in (e); (f) MS$^5$ for m/z 242→186→168→131 shows terminal ion in the branch; (d') FR 4-parameter sigmoidal model for truncated data produced by FREMS in (d). The MS$^3$ stage for both isotopes, m/z 168.0389 and m/z 166.0418, produced the same fragment ion m/z 131.0730 (FIG. 44A e)), indicating that chlorine was lost. The downward slope of the final truncation region suggested the fragment ion was severely affected by an RF overtone, but no secondary fragments were observed, suggesting that the masses of the fragments were below instrumental detection range (<m/z 50) or are otherwise lost. The $FR_{50}$ values were skewed by a fitting error and noise level associated with the fragment ion (FIG. 44A e')); therefore, instead of the FR method, modified-Survival Yield was used, producing m-$SY_{50}$ of 21.0 eV. The overlay was not perfectly symmetrical with that of the fragment having an earlier inflection value, suggesting either a rearrangement or radical mechanism, with the latter being the most plausible option (FIG. 42 B6). The MS⁴ for m/z 131.0730 was the terminal branch, as no real fragments were produced. Ions at m/z 89.2801 and m/z 66.0703 (FIG. 44B f)) were instrument contamination as determined by FREMS data cleanup, described in Part I (and also have no exact mass correlated to any molecular formula).

FREMS framework provided a full 2D-MS characterization of bupropion, with each stage being treated as its own isolated experiment. It revealed that certain fragment ions, e.g. m/z 166.0418 in MS² stage, are formed in sequence, from other fragments, rather than directly from the first stage. Therefore, FREMS not only simplified structural elucidation, by forcing separate evaluation of the puzzle pieces but clarified structural assignments, e.g. m/z 139.

Figure 45:
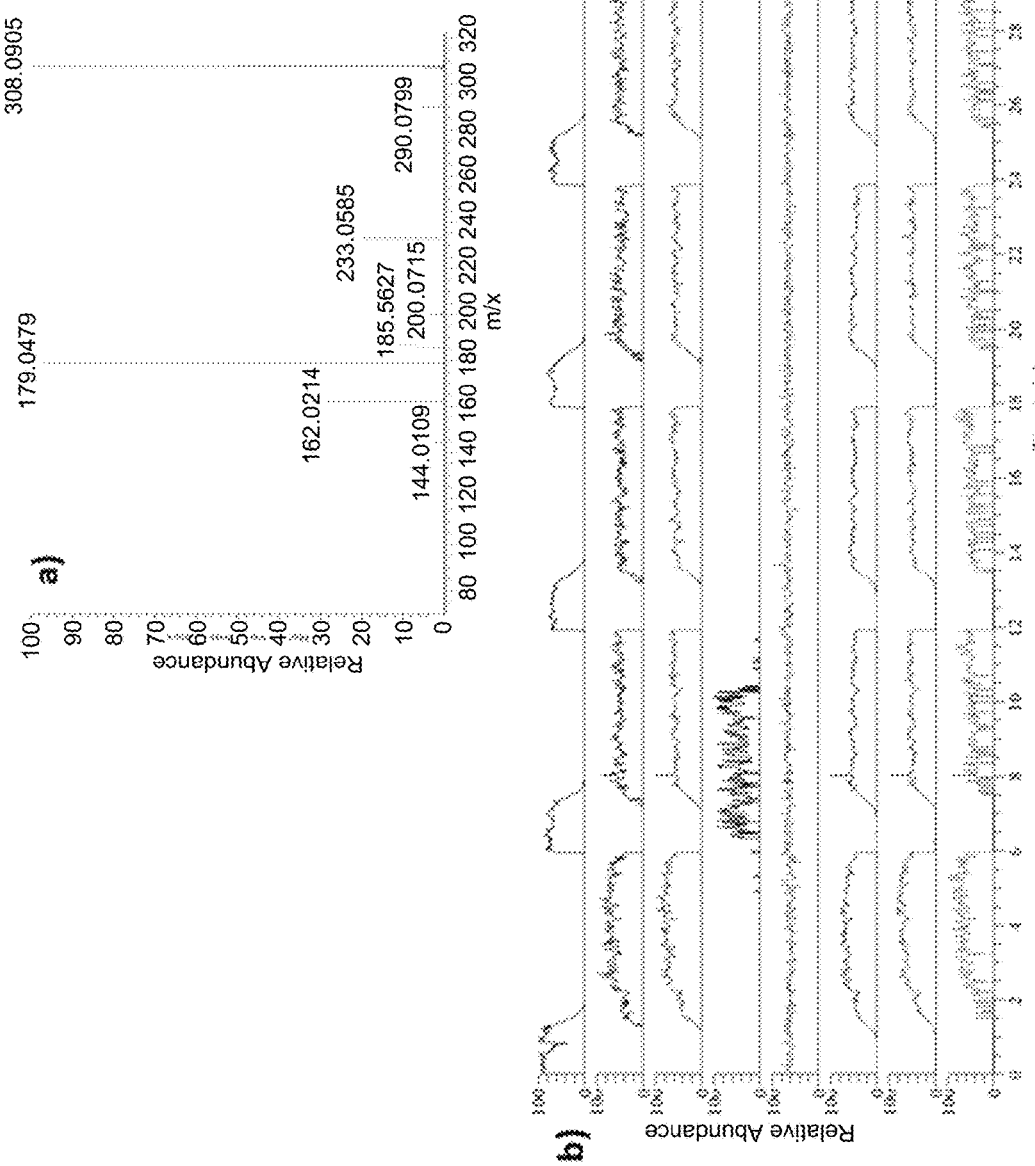
FIG. 45 illustrates first-stage FREMS (MS$^2$) experiments (6 replicates) for glutathione according to an example embodiment.

Multi-Stage FREMS Cross-Branching—Molecular Connectivity of Glutathione (3D-MS):

FIG. 45 illustrates first-stage FREMS (MS²) experiments (6 replicates) for glutathione and extracted ion chromatograms according to an example embodiment. Illustrated are a) First-stage FREMS (MS²) experiments (6 replicates) for glutathione, $[M+H]^+$ m/z 308.0911, averaged over 0-50 eV (n=265 scans); b) Extracted ion chromatograms >2% threshold from (a) used in FR data cleanup & structural elucidation: α—precursor ion; β—real fragment; γ—sample contaminant; δ—instrument contamination; ε—not "real" or not belonging to this stage. Applying FREMS framework to glutathione (GSH), $[M+H]^+$ m/z 308.0911 (FIG. 45a) and all its fragments provides further demonstration of the technique. First stage FREMS data cleanup, revealed that four out of seven "fragments" above 2% cutoff threshold, were real—m/z 290.0805, m/z 233.0591, m/z 179.0485 and m/z 162.0219 (FIG. 45b). The m/z 200.0716 was evanescent, clearing out during one of the FREMS acquisition cycles, indicating sample contamination. However, its presence during an analysis time window may complicate or mislead structural assignment. Similarly, m/z 185.6627, was considered as instrument contamination. It persisted through all six replicate cycles, showing no intensity fluctuations with energy input, indicating it was not formed from the precursor ion.

Figure 46A:
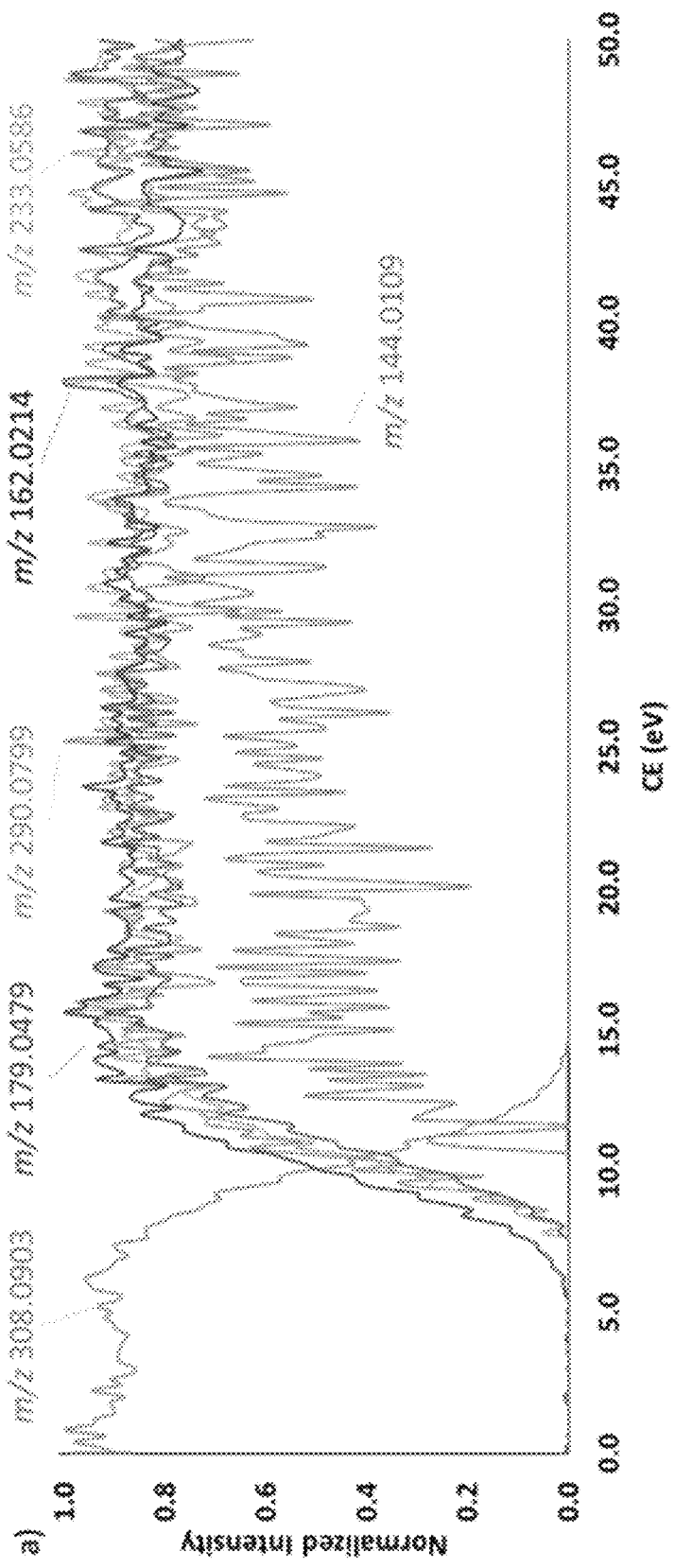
FIG. 46A and FIG. 46B illustrate correlation of GSH to first-stage real fragments using FREMS and FR 4-parameter sigmoidal model according to an example embodiment.
Figure 46B:
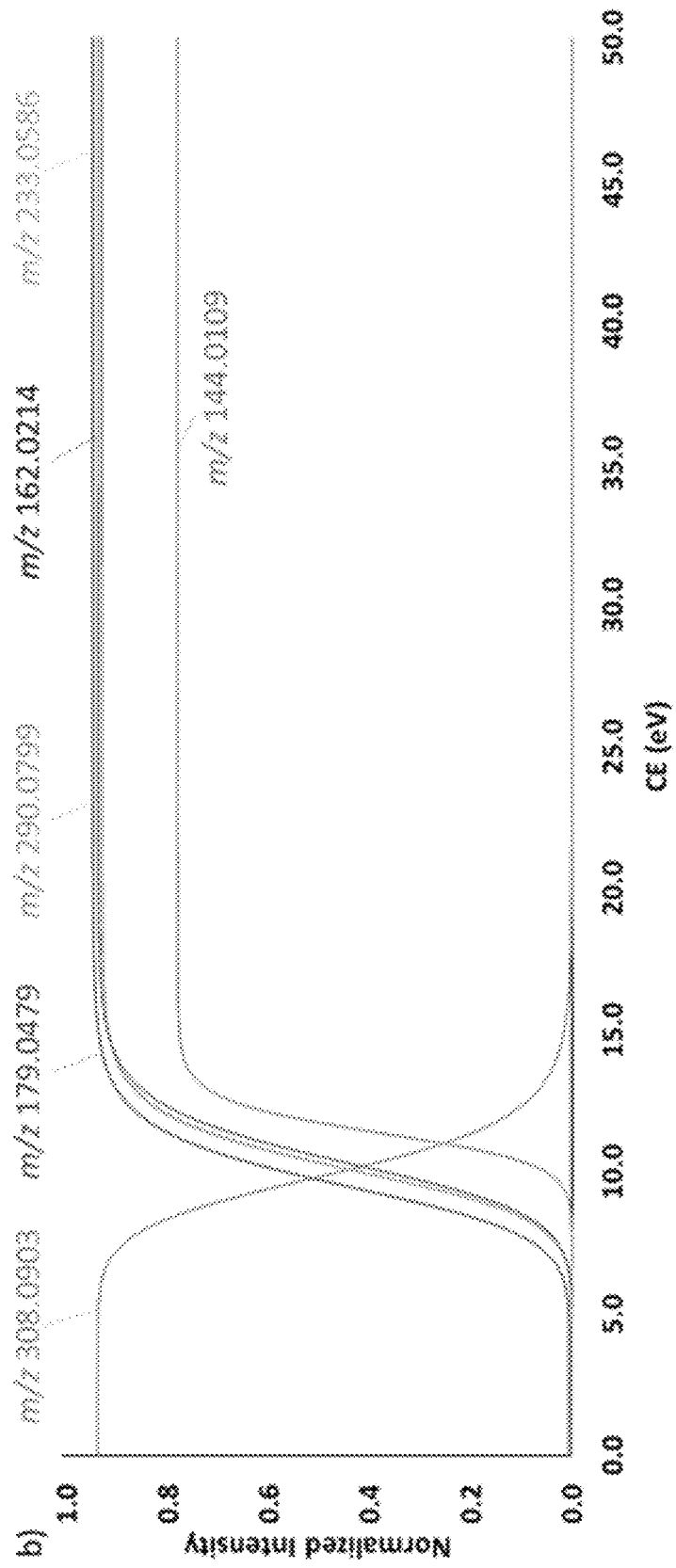

FIG. 46A and FIG. 46B illustrate correlation of GSH to first-stage real fragments using FREMS and FR 4-parameter sigmoidal model according to an example embodiment. Illustrated are a) Correlation of GSH, m/z 308.0911 $[M+H]^+$, to first-stage real fragments using FREMS—raw data; m/z 144.0109 is secondary product (does not form directly from m/z 308); b) FR 4-parameter sigmoidal model for truncated data in (a). FREMS analysis grouped m/z 233.0591 and 290.0805 as being closely related to precursor ion, m/z 308.0911, with $FR_{50}$=10.2 eV for all (FIG. 46 a, b).

Figure 47A:
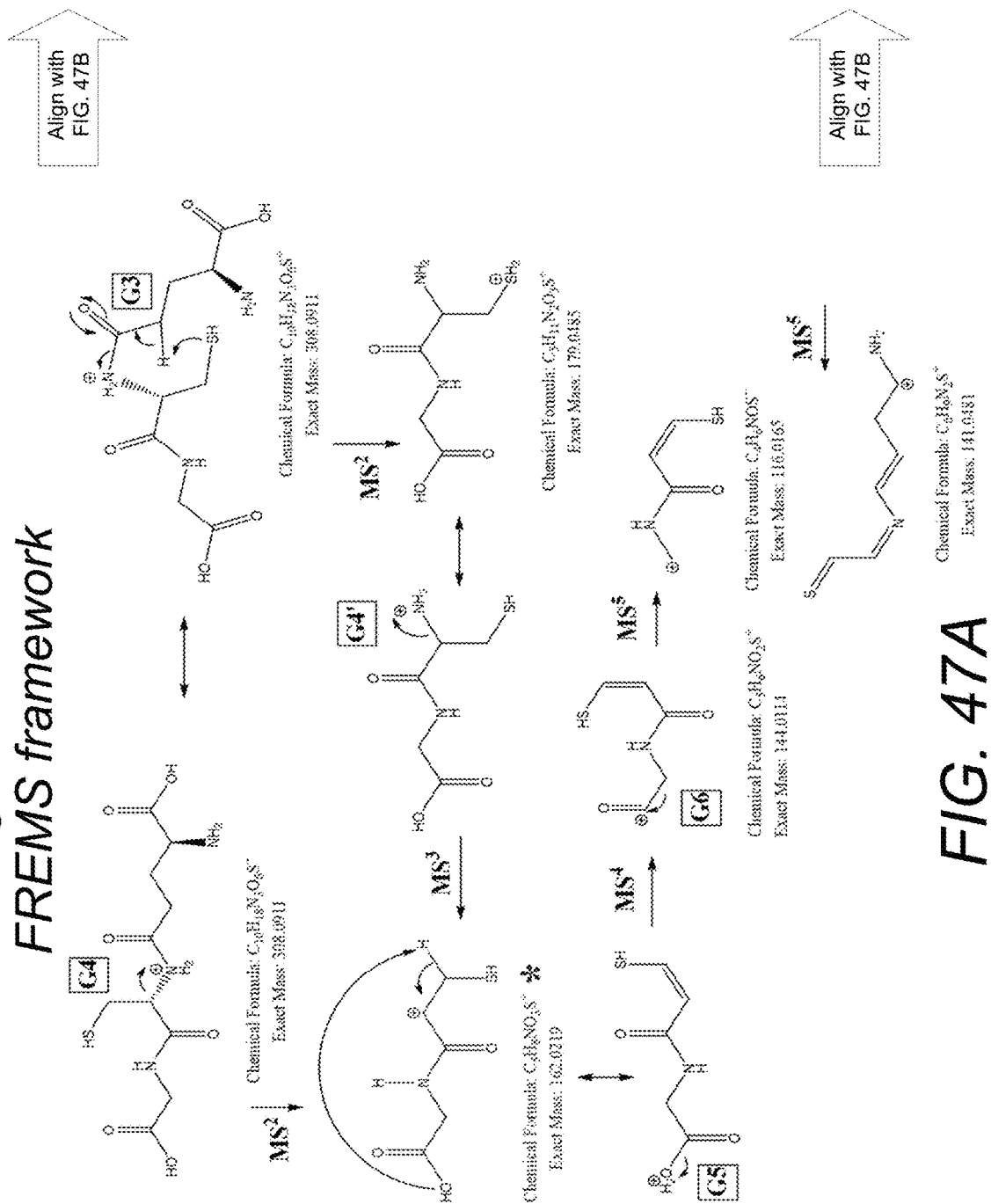
FIG. 47A and FIG. 47B illustrate proposed Glutathione fragmentation mechanism based on FREMS framework according to an example embodiment.
Figure 47B:
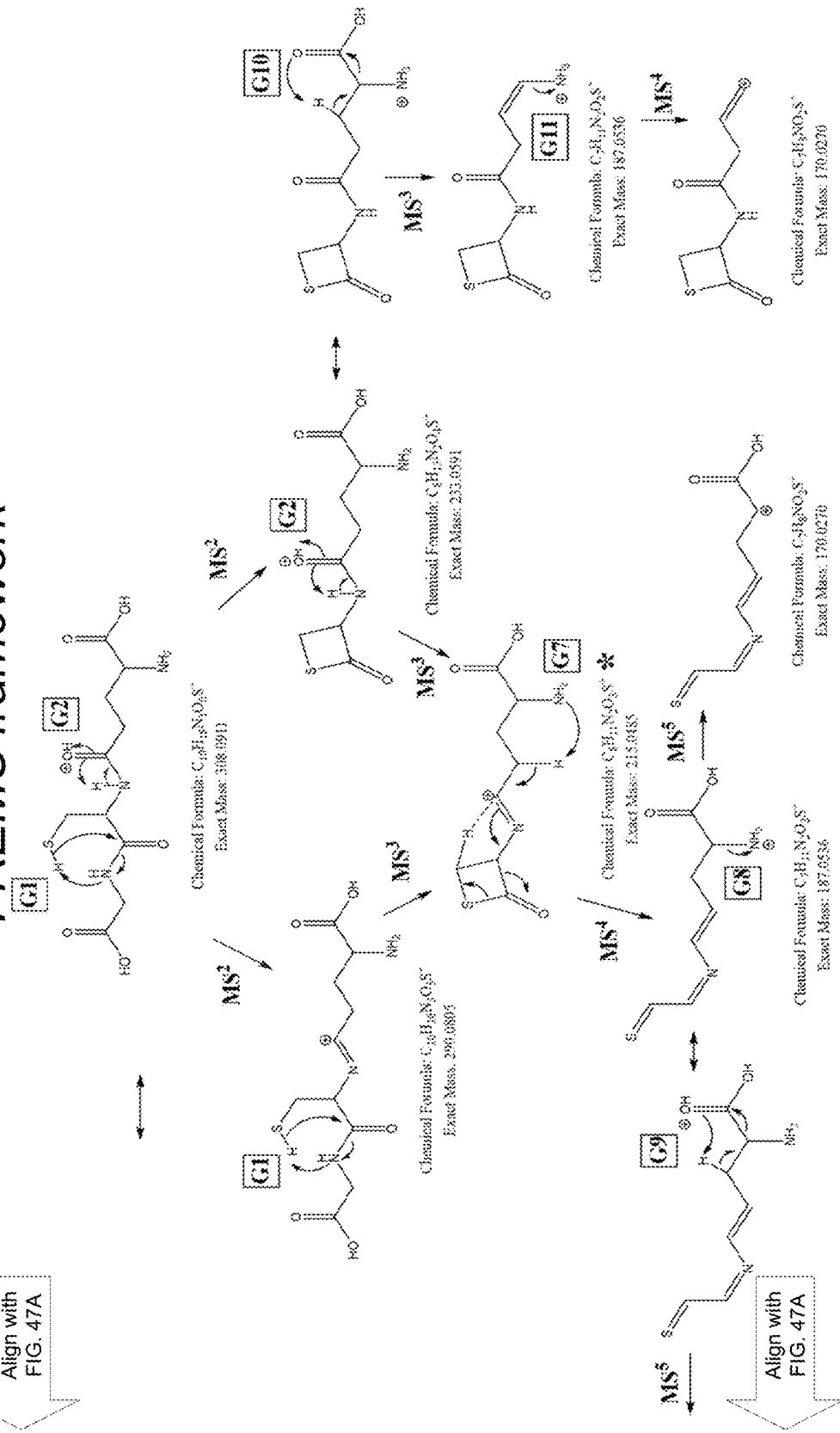

FIG. 47A and FIG. 47B illustrate proposed Glutathione fragmentation mechanism based on FREMS framework according to an example embodiment. The fragmentation of these ions most likely followed a simple mechanistic pathway, with loss of glycine (FIG. 47B, G1) or water (FIG. 47B G2) during MS² stage. However, even without the modeled data (FIG. 46a), m/z 179.0485, showed slightly lower $FR_{50}$, from the precursor and related fragments ($FR_{50}$=9.6 eV). As discussed above, we typically observed this type of behavior for radical and rearrangement mechanisms. Therefore, the mechanism was expected to be more complex, involving multiple atoms (FIG. 47A G3).

Figure 48A:
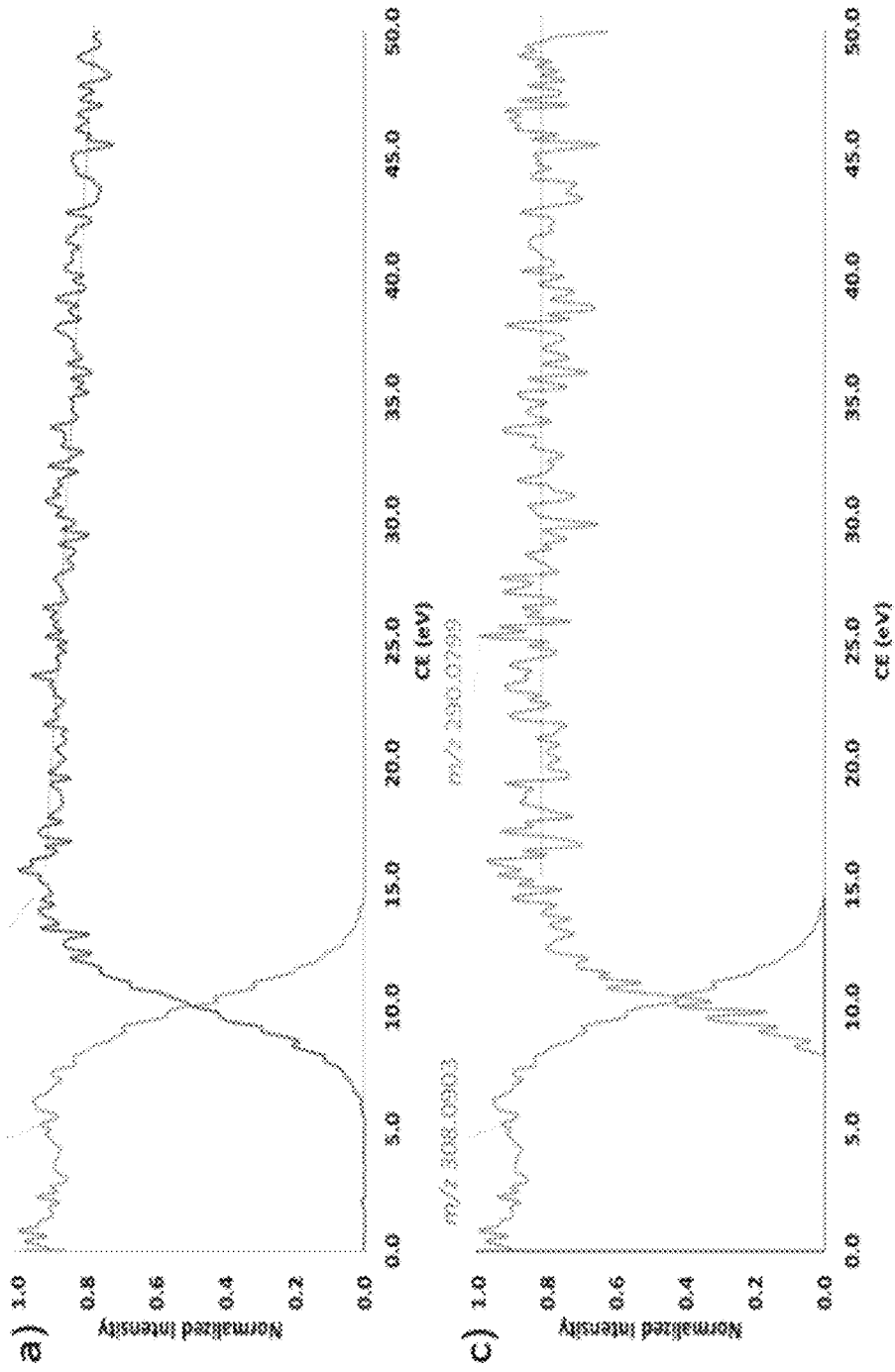
FIG. 48A and FIG. 48B illustrate deconvoluted FREMS traces according to an example embodiment.
Figure 48B:
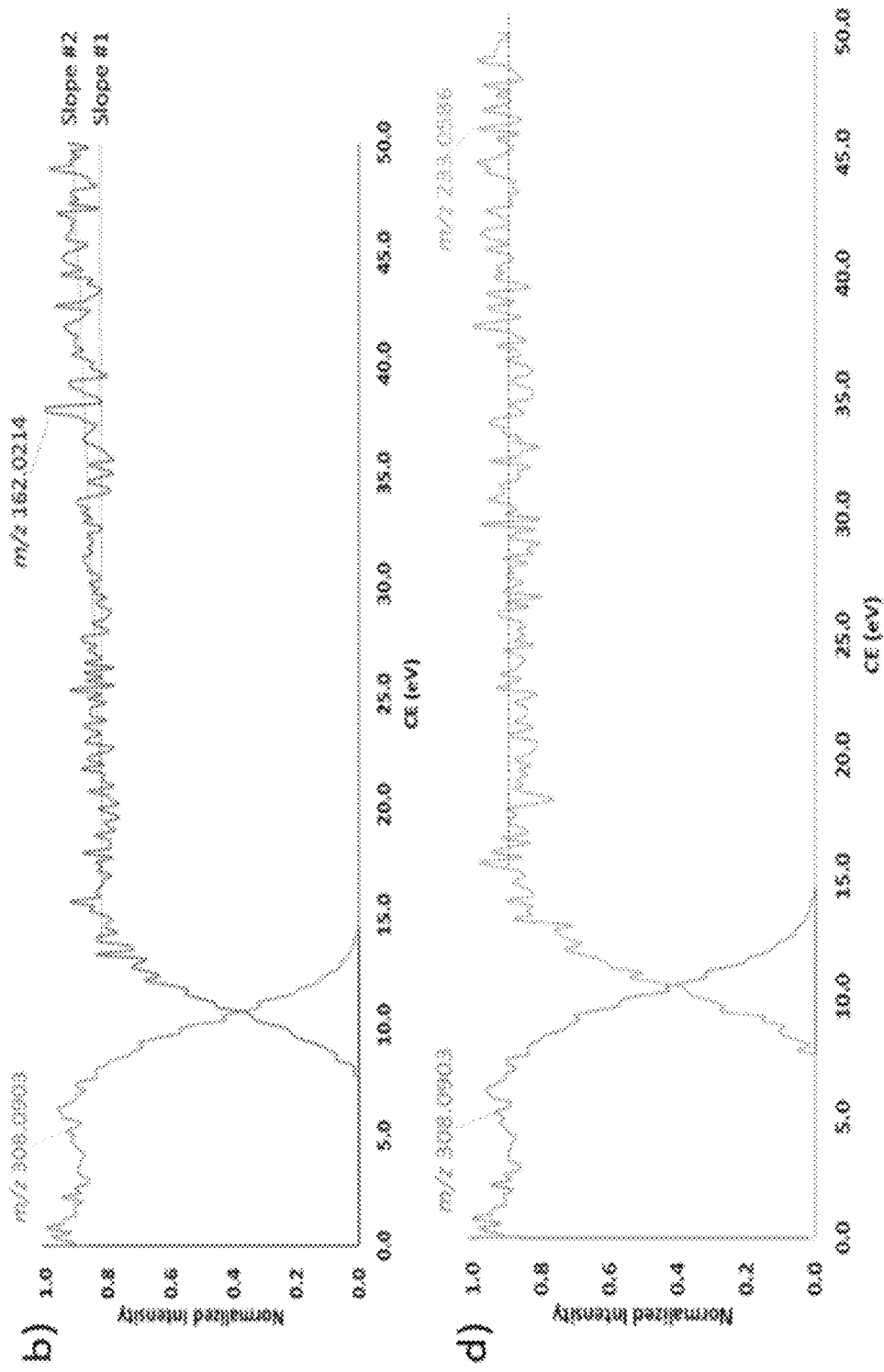

FIG. 48A and FIG. 48B illustrate deconvoluted FREMS traces according to an example embodiment. The deconvoluted FREMS traces are based on FIG. 46A and FIG. 46B. Illustrated are a) FREMS fragment ion, m/z 179.0479, showing downward slope caused by overtone of RF frequency used for fragmenting m/z 308; b) two slope behavior of m/z 162.0214, resulting from two parent ions m/z 308.0903 and m/z 179.0479; fragment formation not affected by overtones—c) m/z 290.0799, and d) m/z 308.0903. The formation tail of m/z 179.0485 sloped notably downward, suggesting it was partially decomposed by RF overtone of m/z 308 (FIG. 48A a)). As seen in later stages, one of the fragments of m/z 179 is m/z 162; thus the decay of m/z 179 via RF overtones offers a possible explanation for the appearance of two distinct slopes of the "tail-end" region for ion, m/z 162.0219 (FIG. 48B b)); it was formed by two fragmentation pathways: primary—m/z 308 and secondary—m/z 179. These observations were confirmed during later MS" stages but would have been missed, if FREMS methods were not employed. Overtone fragmentations are not common because most fragments do not resonate at the same RF frequency as the precursor ions. Thus, most extracted ions, e.g. m/z 290.0805 and 233.0591, produced flat tail-ends no matter how much energy was put into the system (FIG. 48A c), FIG. 48B d)). Because m/z 162.0219 was formed by two decomposition routes, it exhibited slightly different, but not statistically significant (p-value>0.05), $FR_{50}$ value (10.4 eV) from m/z 308.0911, 233.0592 and 290.0805 ($FR_{50}$=10.2 eV). However, regardless of whether a primary fragment was also formed in later MS" stages, we found that its FREMS values overlapped with precursor's $FR_{50}$ value for each respective stage. The closely related $FR_{50}$ values for m/z 162.0219 and 308.0911 suggest the simple loss of an amino group at cysteinylglycine site (FIG. 47A G4, G4'), rather than rearrangement or radical mechanism, reported elsewhere; such rearrangement usually results in FREMS values slightly lower than the precursor. In contrast, distinctly different $FR_{50}$ values for m/z 144.0114 (11.4 eV) indicated that the ion did not form directly from m/z 308.0911 but was caused by an overtone fragmentation of m/z 162.0219 (proved in later MS" stages).

Figure 49A:
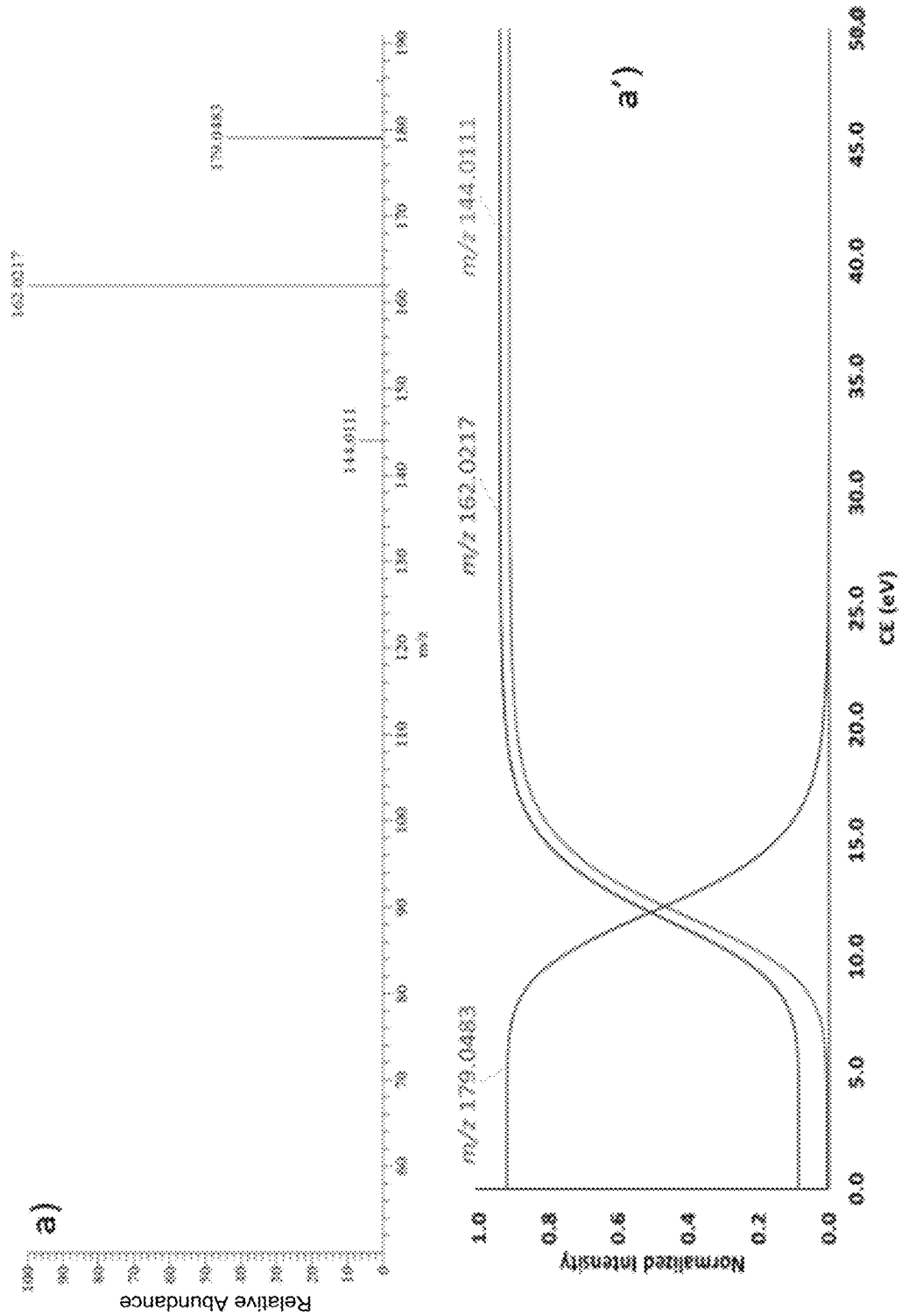
FIG. 49A and FIG. 49B illustrate a GSH MS$^3$ FREMS experiment according to an example embodiment.
Figure 49B:
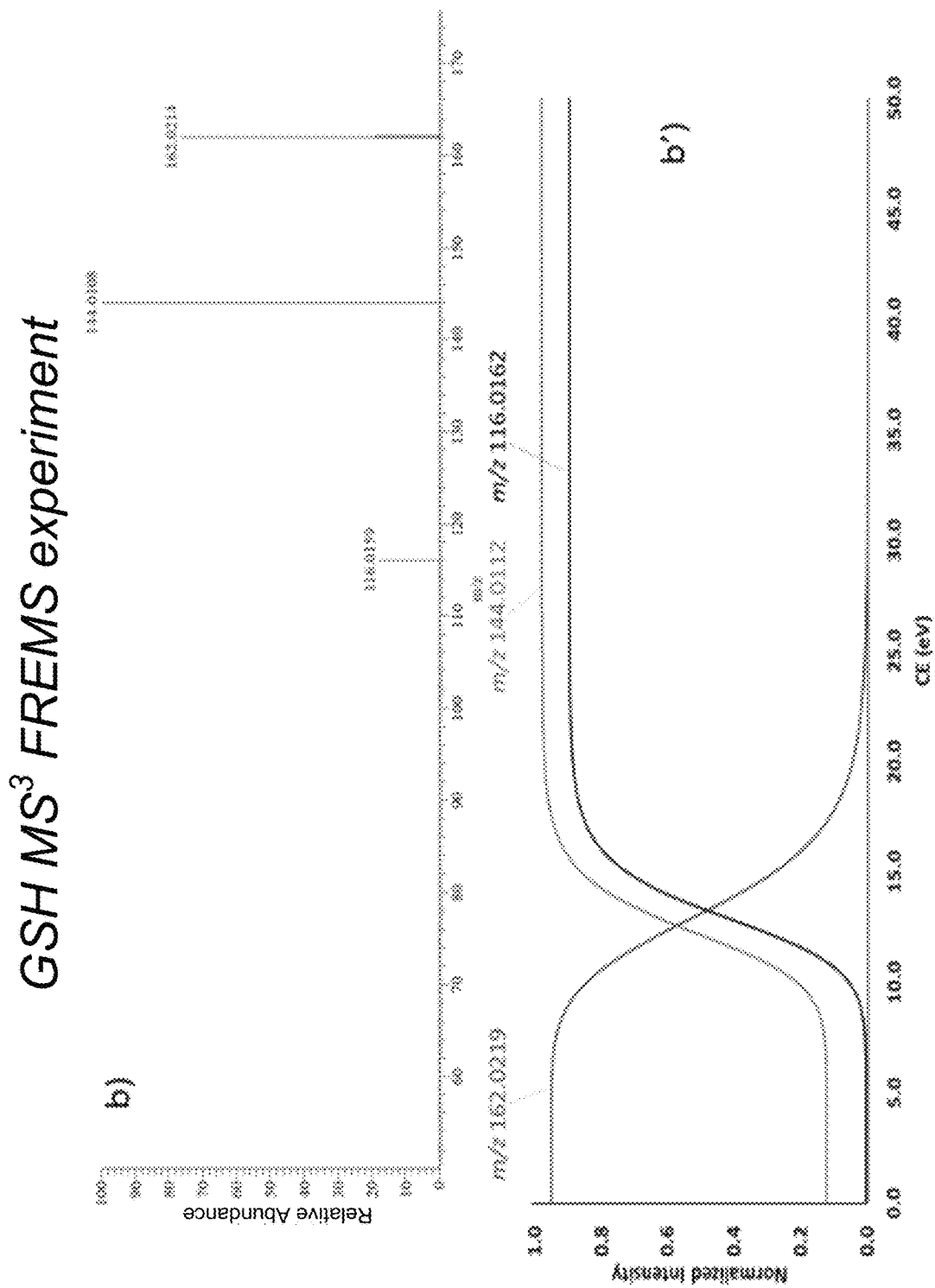

FIG. 49A and FIG. 49B illustrate a GSH MS³ FREMS experiment according to an example embodiment. Illustrated are: a) GSH MS³ FREMS experiment, m/z 308→179; a') FR 4-parameter sigmoidal model for truncated FREMS data in (a); b) MS⁴ FREMS experiment for m/z 308→179→162; b') FR 4-parameter sigmoidal model for truncated FREMS data in (b). The second stage (MS³) FREMS experiments for m/z 308→179 (FIG. 49A a)), confirmed earlier hypothesis of leak-through effect for m/z 162.0219 and m/z 144.0114 (FIG. 49A a')). The difference in the amount of these ions present at initiation (0 eV) prompted assignment of m/z 162.0219 as the primary fragment of m/z 179.0485, and m/z 144.0114 as fragment of m/z 162.0219. MS⁴ stage (FIG. 49B b)) confirmed these assignments, because transitions m/z 308→179→144 could not be isolated. Only m/z 308→179→162 ($FR_{50}$=12.8 eV) produced the desired fragment, m/z 144.0112 ($FR_{50}$=12.6 eV, FIG. 49B b')), via the loss of water (FIG. 47A, G5). The ion m/z 116.0165 had a drastically different $FR_{50}$ value (13.7 eV) from m/z 162; therefore, it was either unrelated or a secondary fragment caused by overtone fragmentation.

Figure 50A:
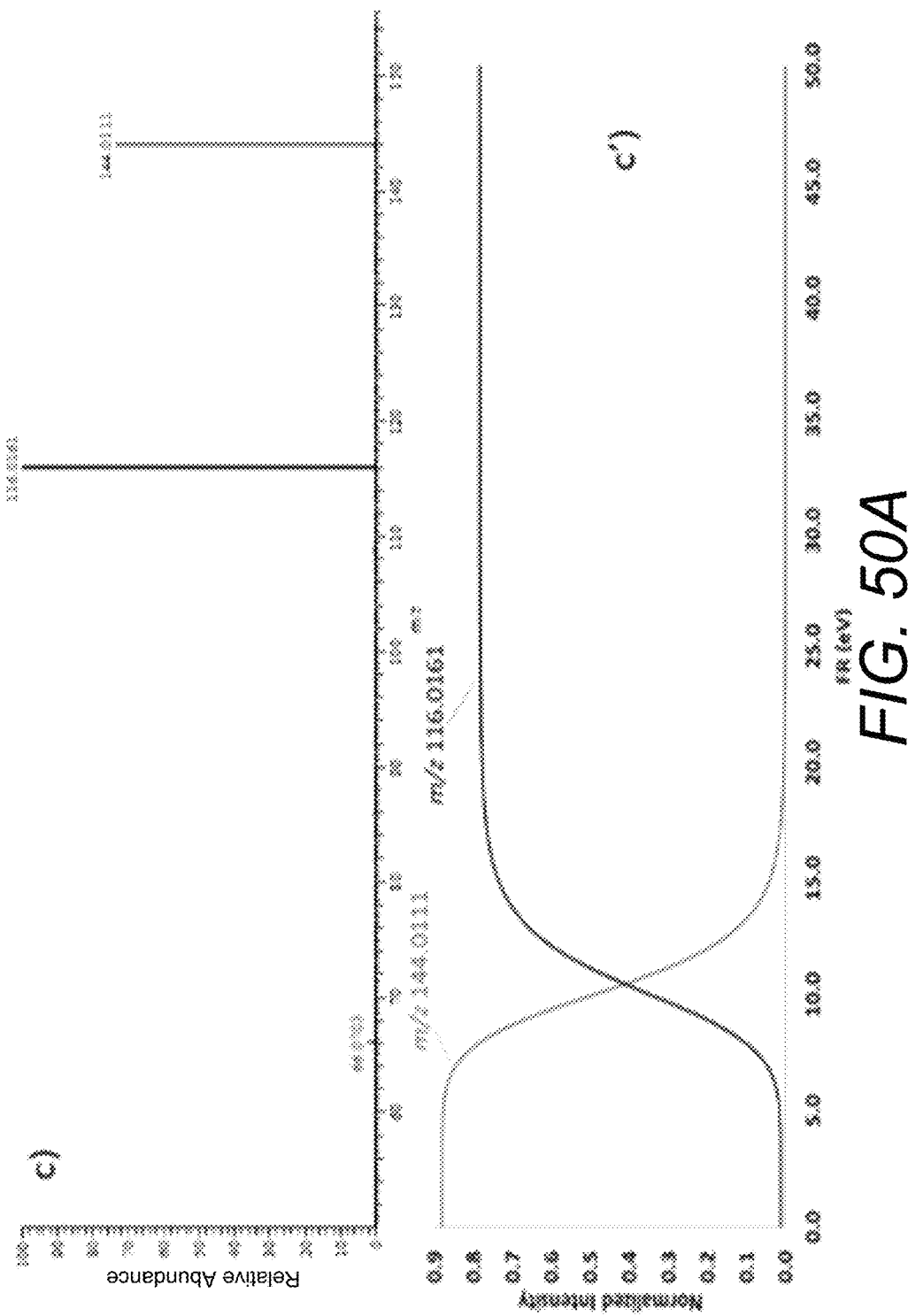
FIG. 50A and FIG. 50B illustrate a GSH MS$^5$ FREMS experiment according to an example embodiment.
Figure 50B:
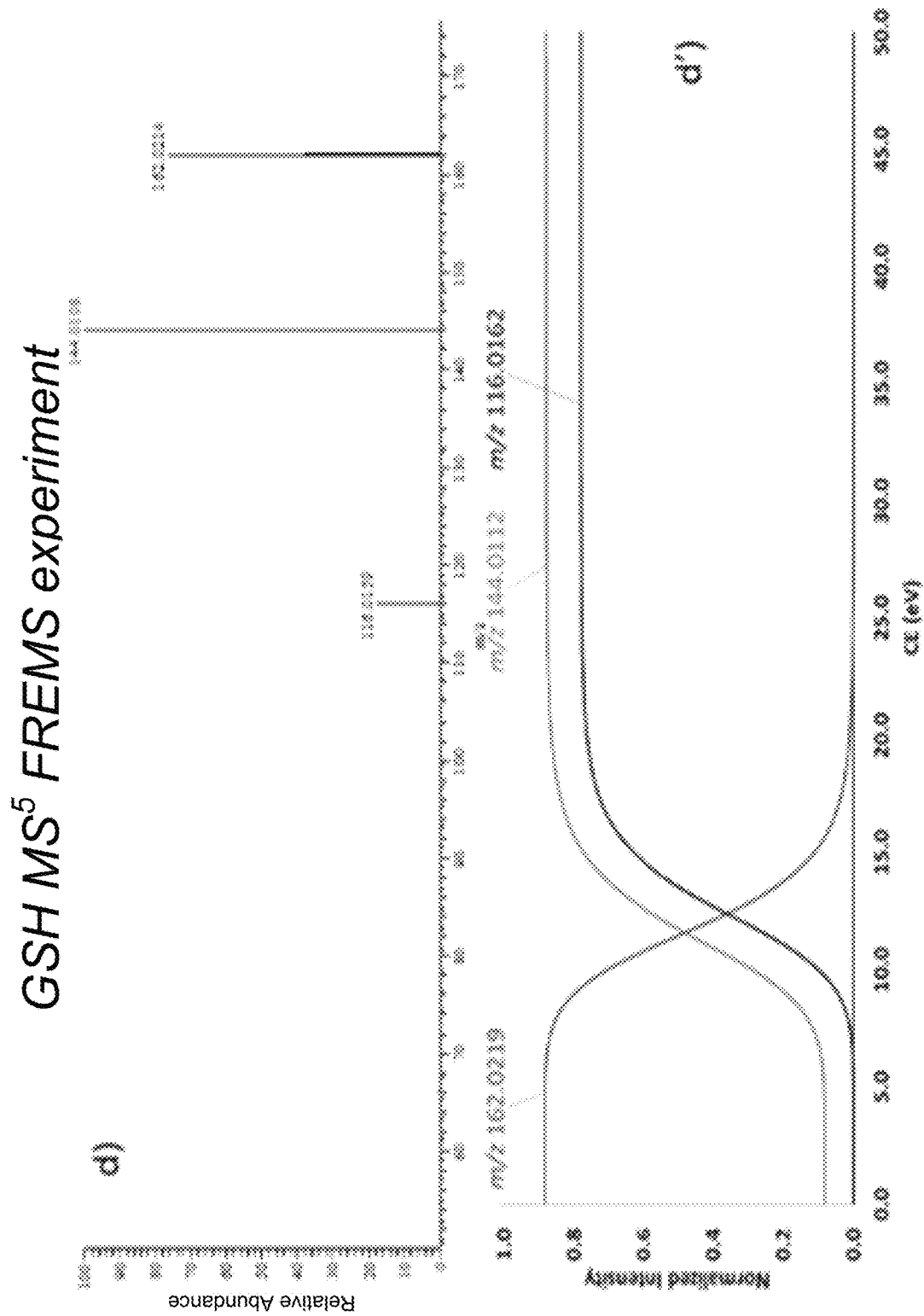

FIG. 50A and FIG. 50B illustrate a GSH MS⁵ FREMS experiment according to an example embodiment. Illustrated are: c) MS⁵ FREMS experiment GSH m/z 308→179→162→144; c') FR 4-parameter sigmoidal model for truncated data in (c); d) MS³ FREMS experiment for m/z 308→162; d') FR 4-parameter sigmoidal model for truncated FREMS data in (d). The MS⁵ stage confirmed the leak-through effect of m/z 116.0165 ($FR_{50}$=10.4 eV) and its correlation to m/z 144.0112 ($FR_{50}$=10.3 eV, FIG. 50A c))

with the loss of —CH$_2$O (FIG. 47A, G6). An extremely important phenomenon, providing the link to intra-molecular connectivity, was observed when "cross-branching" occurred, i.e. two fragmentation pathways merged (FIG. 47A,*). The spectra and FREMS (intensity adjusted, Part I) of product ion scan for m/z 162.0219, which was formed from m/z 179.0785 (FIG. 49B b), FIG. 49B b')) and m/z 308.0911 (FIG. 50B d), FIG. 50B d')), produced virtually indistinguishable results; therefore, their structures must be identical. The cross-branching "anchors" the structure within the decomposition scheme and limits possible precursor conformations, which provides the ability to perform quasi-3D-MS analysis not previously available to the analyst. Another cross-branching occurred for MS$^3$ transitions m/z 308→290→215 and m/z 308→233→215 (FIG. 47B,*), producing identical spectra and m/z 187 ion via ring opening according to FREMS analysis (FIG. 51A e), FIG. 51B f)) (FIG. 47B G7).

Figure 51A:
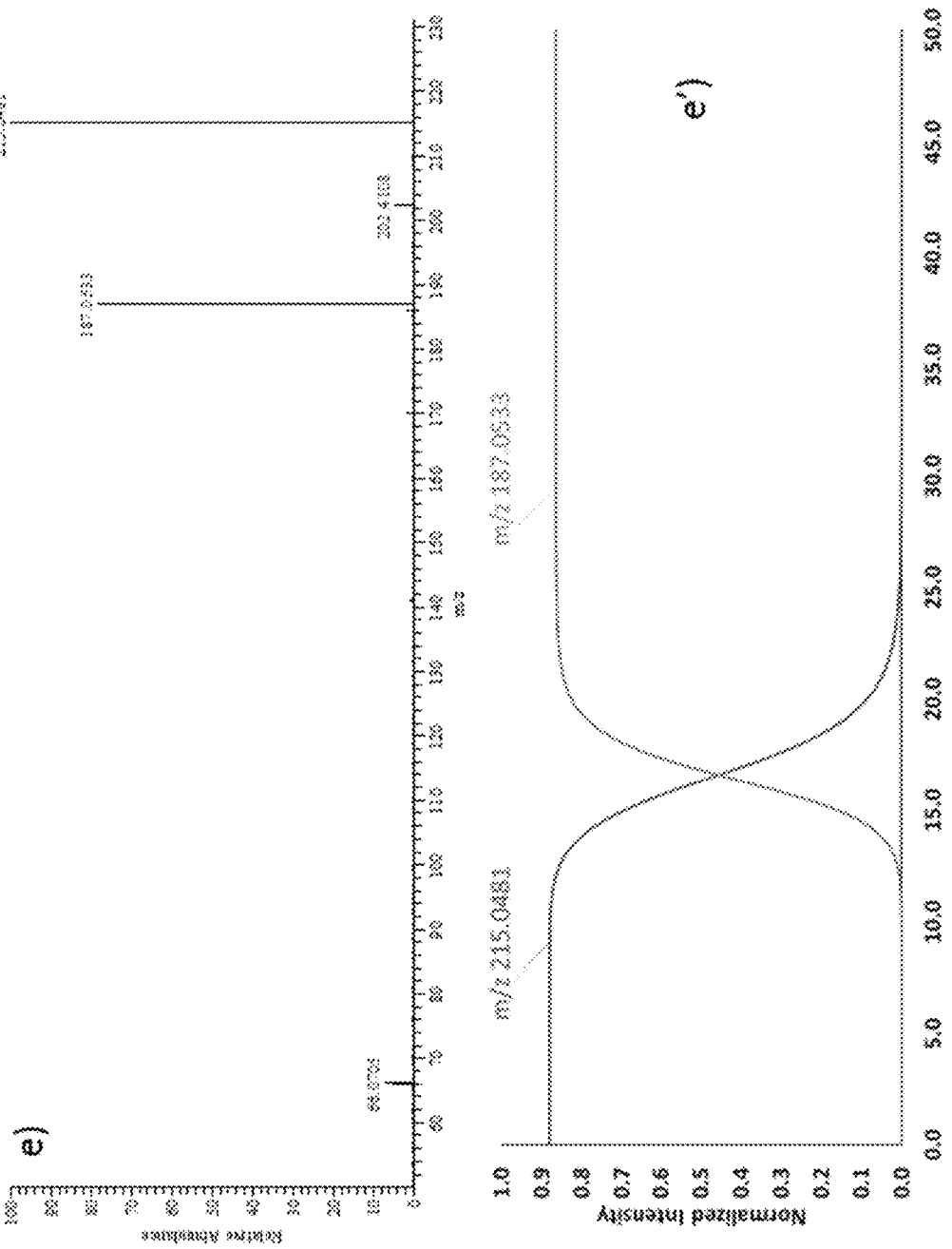
FIG. 51A and FIG. 51B illustrate a GSH MS$^4$ FREMS experiment according to an example embodiment.
Figure 51B:
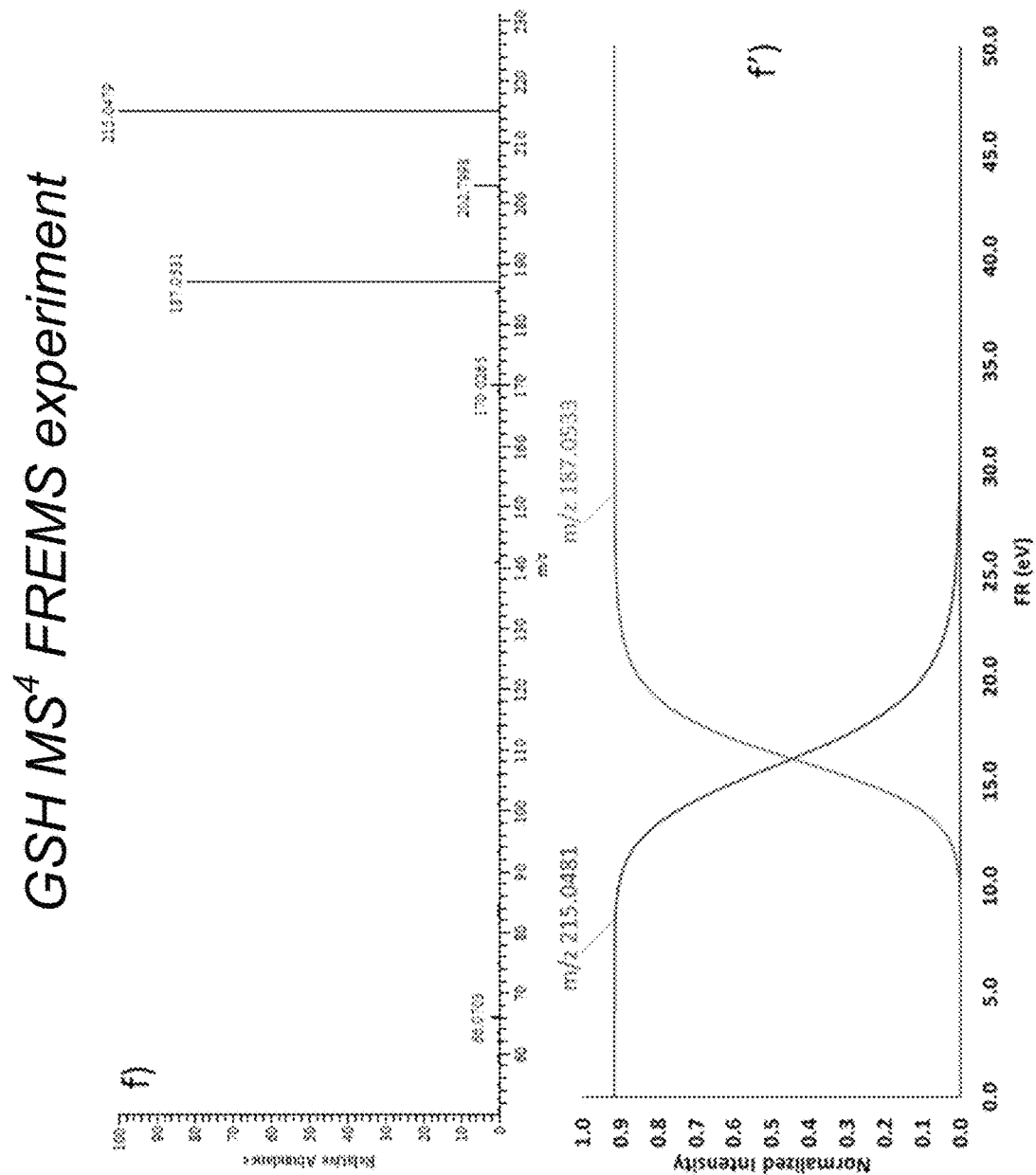
Figure 52A:
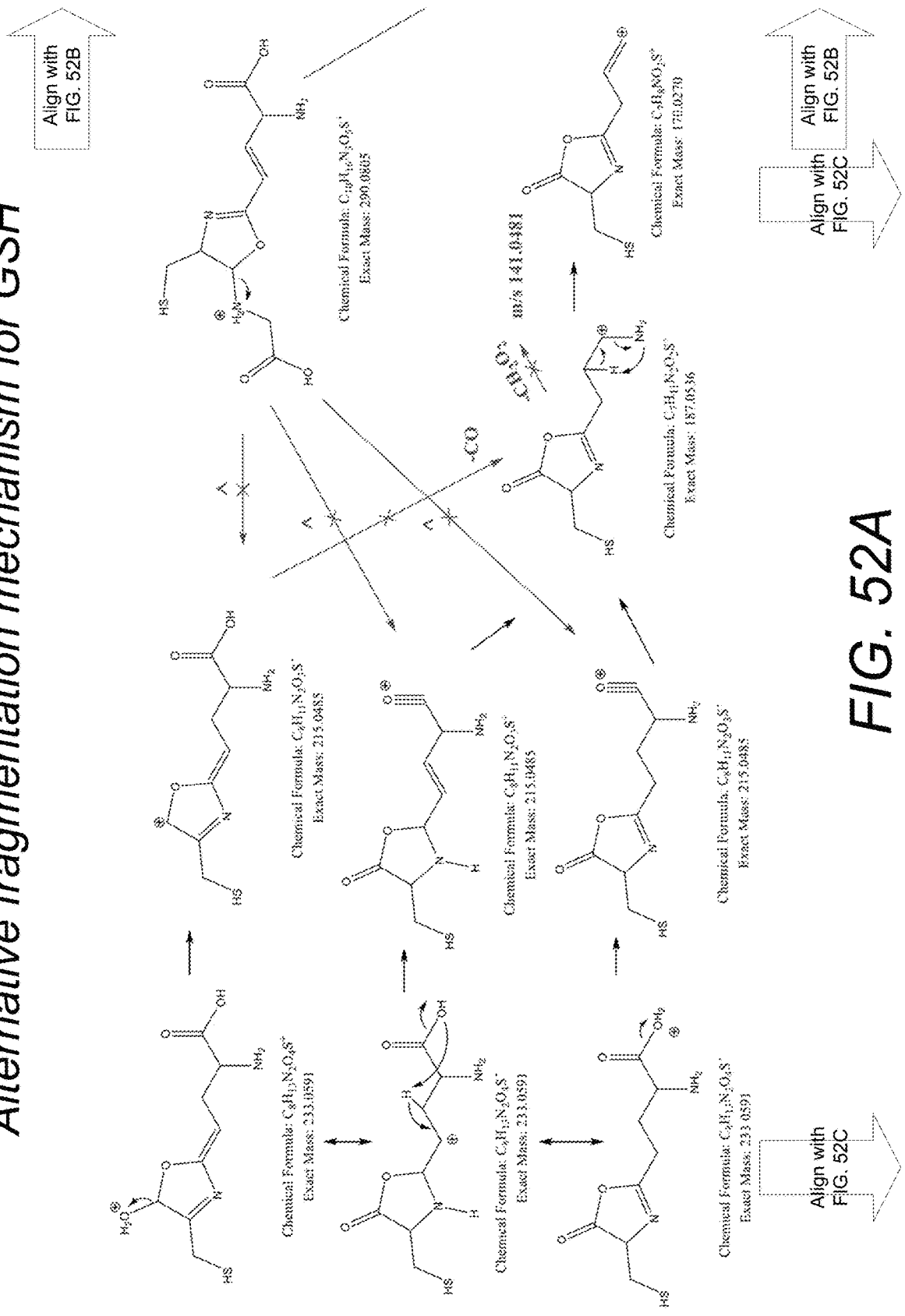
FIG. 52A, FIG. 52B, FIG. 52C, and FIG. 52D illustrate an alternative fragmentation mechanism for GSH according to an example embodiment.
Figure 52B:
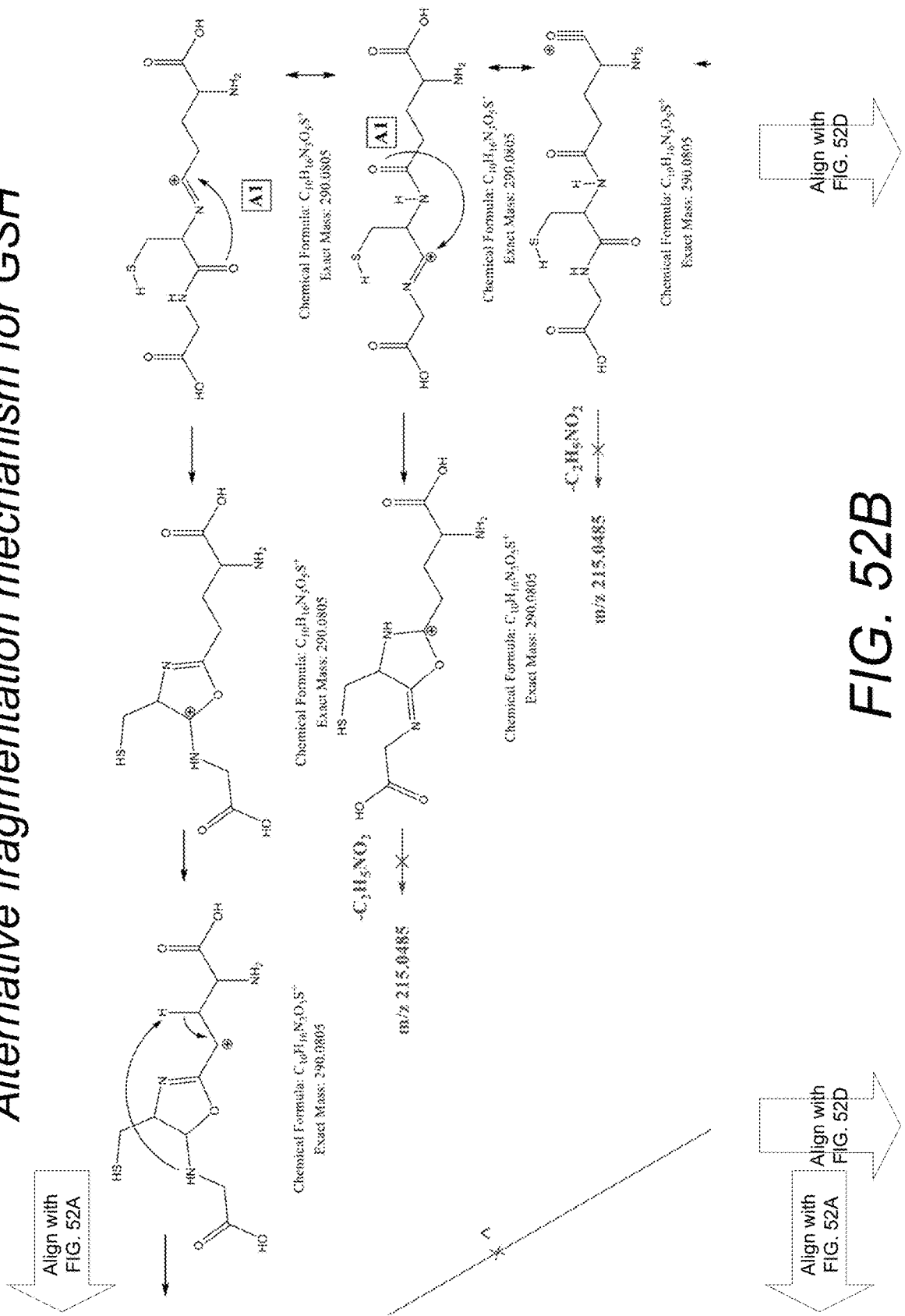
Figure 52C:
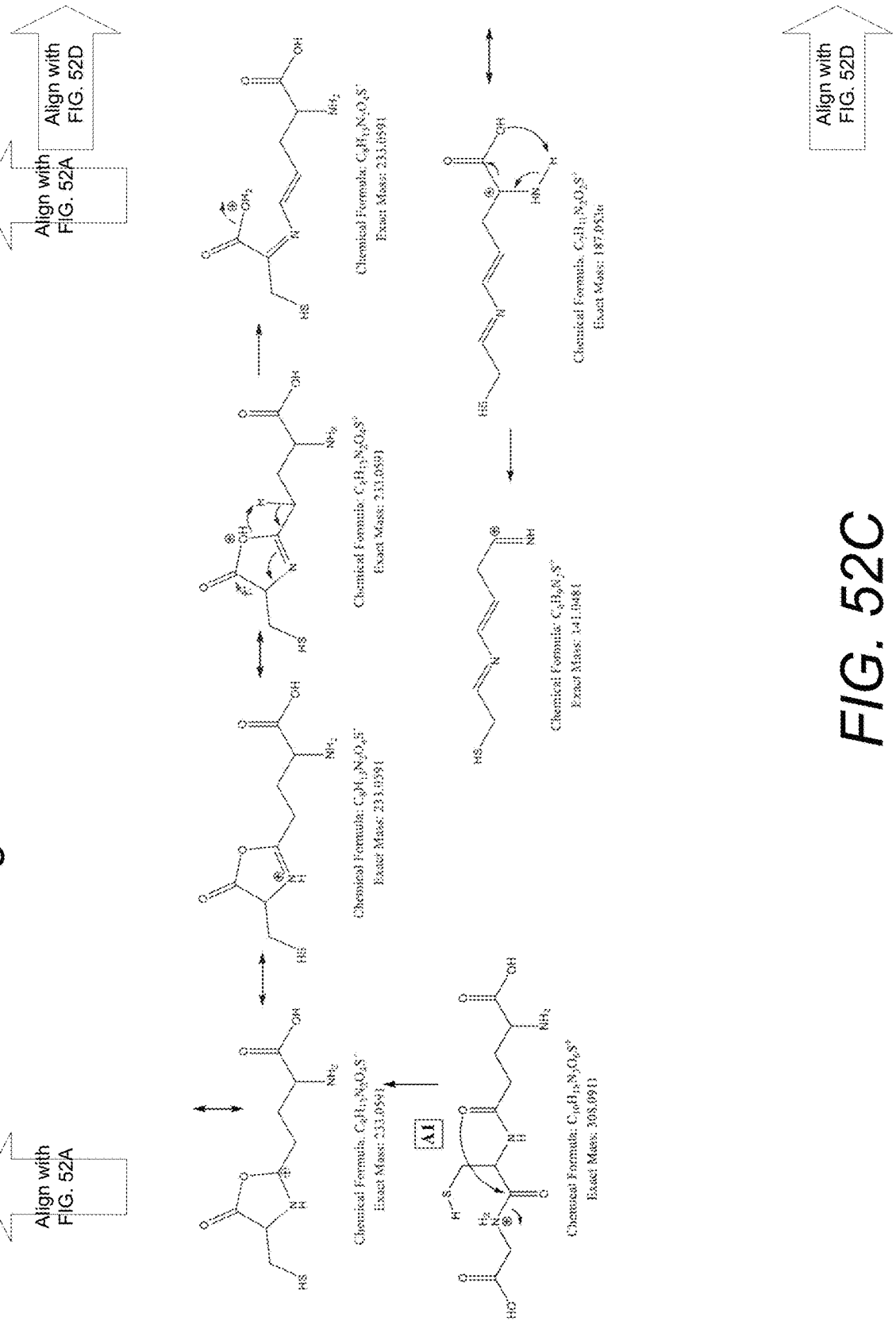
Figure 52D:
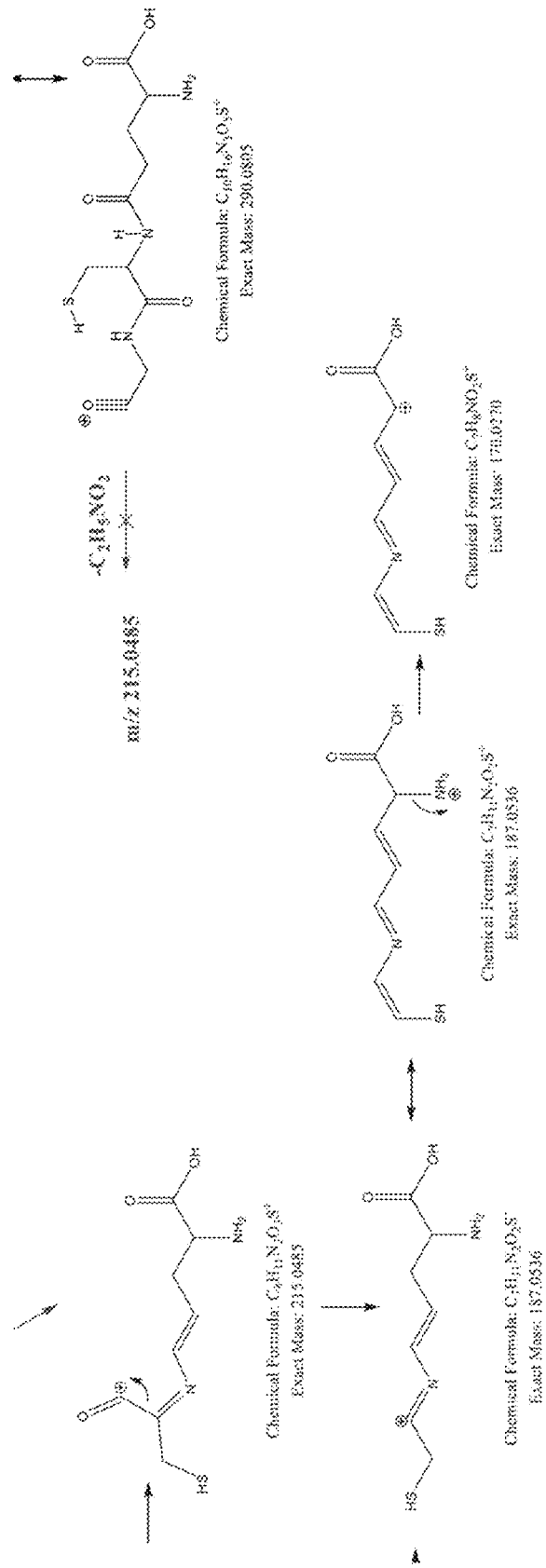

FIG. 51A and FIG. 51B illustrate a GSH MS$^4$ FREMS experiment according to an example embodiment. Illustrated are: e) MS$^4$ FREMS experiment for GSH m/z 308→290→215; e') FR 4-parameter sigmoidal model for truncated FREMS data in (e); f) MS$^4$ FREMS experiment for m/z 308→233→215; f') FR 4-parameter sigmoidal model for truncated data in (f).

FIG. 52A, FIG. 52B, FIG. 52C, and FIG. 52D illustrate an alternative fragmentation mechanism for GSH according to an example embodiment. The alternative mechanism is based on the ring cyclization structure with all possible losses of water and glycine were also considered. From a multitude of all possible scenarios, the only pathway resulting in all observed multi-stage fragments proceeded under the unlikely assumption that ring opening did not happen. At the same time, no cross-branched products could be constructed; therefore, ring cyclization was discounted as a likely mechanism. FREMS framework eliminated m/z 202.7998, 170.0265 and 66.0703 from consideration, leaving m/z 187.0536 as the sole primary fragment (FIG. 51A e'), FIG. 51B f')). FREMS also proved to be useful at distinguishing different conformer of m/z 187.0536.

Figure 53A:
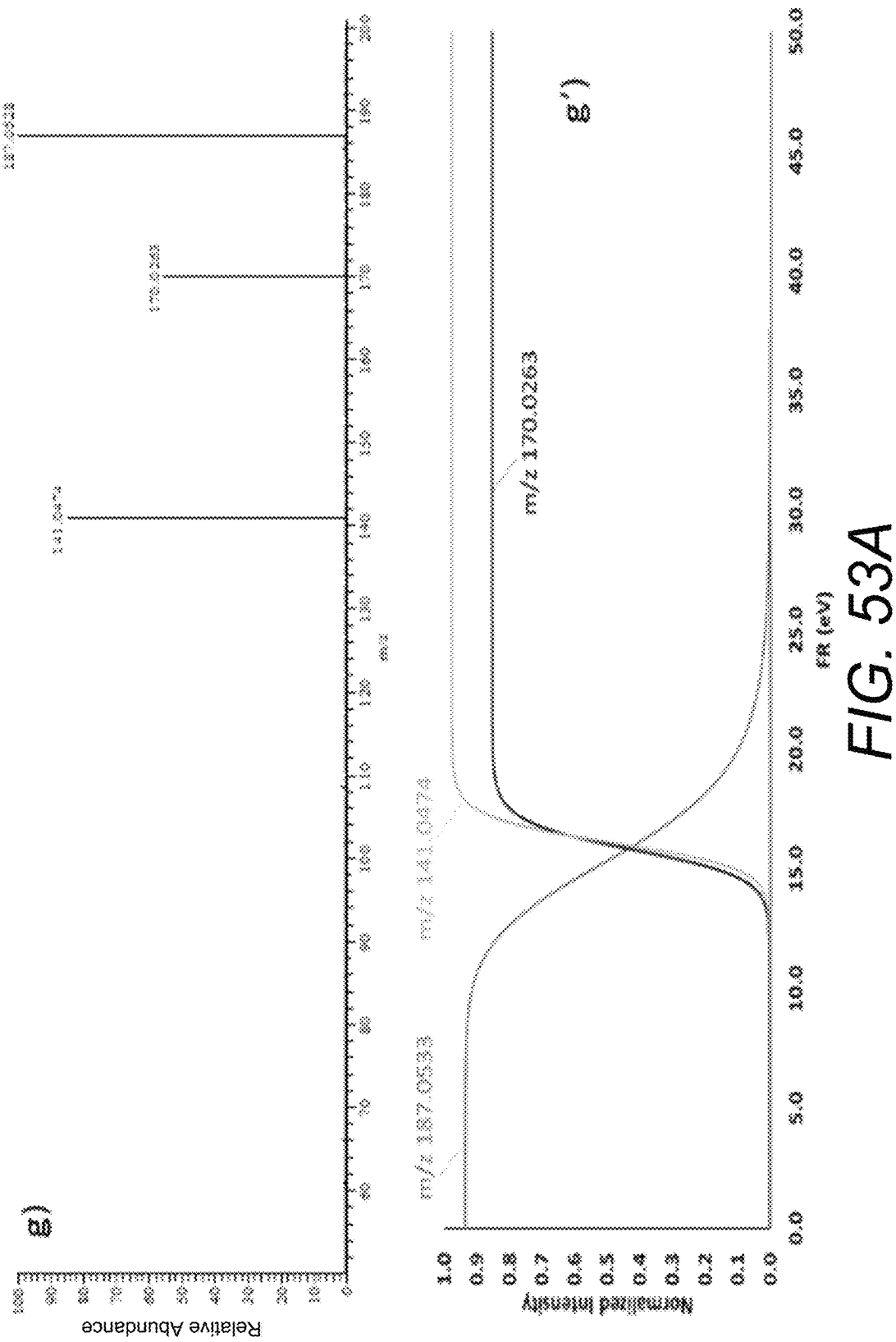
FIG. 53A and FIG. 53B illustrate a GSH MS$^5$ FREMS experiment according to an example embodiment.
Figure 53B:
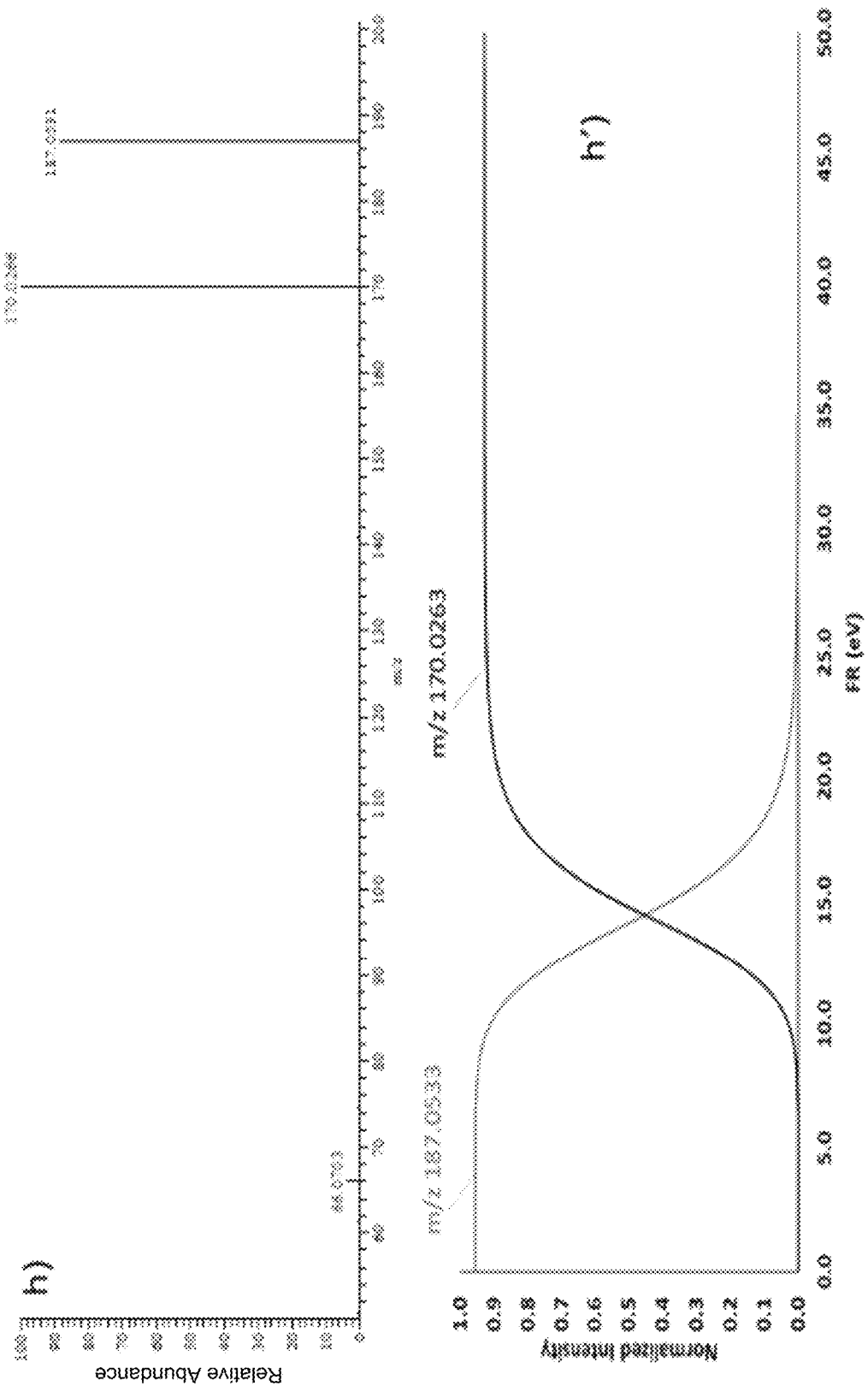

FIG. 53A and FIG. 53B illustrate a GSH MS$^5$ FREMS experiment according to an example embodiment. Illustrated are g) MS$^5$ FREMS experiment GSH m/z 308→290, 233→215→187; g') FR 4-parameter sigmoidal model for truncated data in (g); h) MS$^4$ FREMS experiment for m/z 308→233→187; f) FR 4-parameter sigmoidal model for truncated data in (f). The transition, m/z 290, 233→215, via a ring opening mechanism produced two distinct, real fragments—m/z 170.0270 and 141.0481 (FIG. 53A g), FIG. 53A g'); 15.9±0.2 eV), via the loss of —NH$_3$ (FIG. 47B G8) and —CHOOH (FIG. 47B G9), respectively. Meanwhile, m/z 187.0536, produced directly from m/z 233.0591 (14.2 eV), formed only m/z 170.0270 (14.4 eV), with no indication of m/z 141.0481 being present (FIG. 53B h), FIG. 53B h')). This can only be explained by different conformations of the ion m/z 187.0536, one of which blocks the cleavage site for the formation of m/z 141.0481. This most likely corresponds to the ring structure remaining intact for the m/z 233→187 transition which is probably the result of —CHOOH loss (FIG. 47B G10). Subsequent loss of —NH$_3$ (FIG. 47B G11) produced m/z 170.0270. In similar fashion, each stage can be treated as an isolated experiment, showing m/z 170.0270, 141.0481 and 116.0165 being terminal fragments, ending its respective branch.

Fragmentation Resilience Energy Resolved Mass Spectrometry (FREMS) provided a robust method for structural elucidation, which was demonstrated on bupropion and glutathione by performing their full characterization in the linear ion trap-Orbitrap instrument. FREMS allowed easy identification and elimination of unrelated fragments and impurities from consideration, thus drastically simplifying the mechanistic pathways. Each MS$^n$ stage was treated as its own separate "gas-phase test tube." Thus, fragment(s) were examined in relation to the precursor ion of that same stage only. Secondary products, if produced, resulted in drastically different FREMS values that either were eliminated as impurities or were correlated to other fragments in later stages through a "leak-through" effect. This framework constrained mechanistic pathways and simplified structural elucidation.

Although the basic rule of FREMS methodology is that true fragment ions of a precursor ion in any MS$^n$ state must exhibit the same FREMS values as the precursor, the examples provide several caveats to that rule:

A slightly lower FR$_{50}$ value than the precursor's ion suggested a mechanism involving rearrangement or free radical.

A much higher FR$_{50}$ value than the precursor indicates ion is not a primary fragment; it could be secondary, resulting from overtones Additional levels of structural constraint came from "cross-branching"—a situation in which two different breakdown pathways merge to produce the same exact fragment, e.g. 162.0219 for GSH, which then continues to produce identical fragments in the later stages, independently of which routes (#1 or #2) were taken. Due to cross-branching, some of the pathways would be restricted to a certain ion configuration. The higher level of cross-branching, the higher confidence that the intra-connectivity and molecular structure are correct. In addition to simplifying structural elucidation, it hints at intra-molecular connectivity emerging into a quasi-3D-MS technique. At the same time, it was shown that the same fragment mass, e.g. 187.0536 for GSH, can be distinguished in different pathways depending on the nature of the prior structural conformation fragment of origin. Thus, FREMS becomes a novel powerful method for elucidating structural connectivity and elimination of irrelevant fragments.

Figure 54:
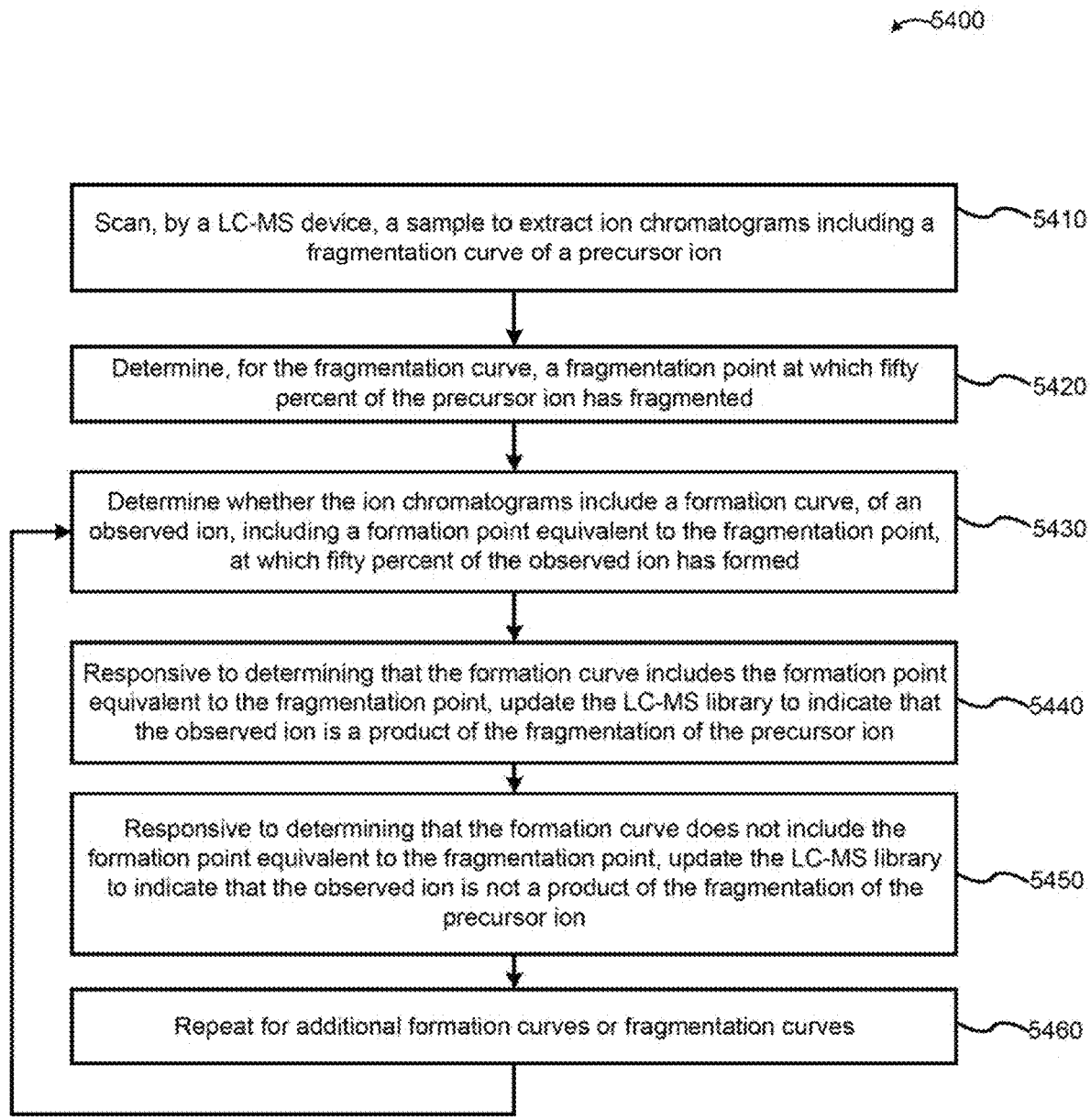
FIG. 54 illustrates a method of creating a LC-MS library according to an example embodiment.

FIG. 54 illustrates a method 5400 of creating a LC-MS library according to an example embodiment. At 5410, a LC-MS device scans a sample to extract ion chromatograms including a fragmentation curve of a precursor ion. At 5420, the LC-MS device determines, for the fragmentation curve, a fragmentation point at which fifty percent of the precursor ion has fragmented. At 5430, the LC-MS device determines whether the ion chromatograms include a formation curve, of an observed ion, including a formation point equivalent to the fragmentation point, at which fifty percent of the observed ion has formed. At 5440, the LC-MS device, responsive to determining that the formation curve includes the formation point equivalent to the fragmentation point, updates the LC-MS library to indicate that the observed ion is a product of the fragmentation of the precursor ion. At 5450, the LC-MS device, responsive to determining that the formation curve does not include the formation point equivalent to the fragmentation point, updates the LC-MS library to indicate that the observed ion is not a product of the fragmentation of the precursor ion. At 5460, the LC-MS device repeats blocks 5430, 5440, and 5450 for additional formation curves or fragmentation curves.

Figure 55:
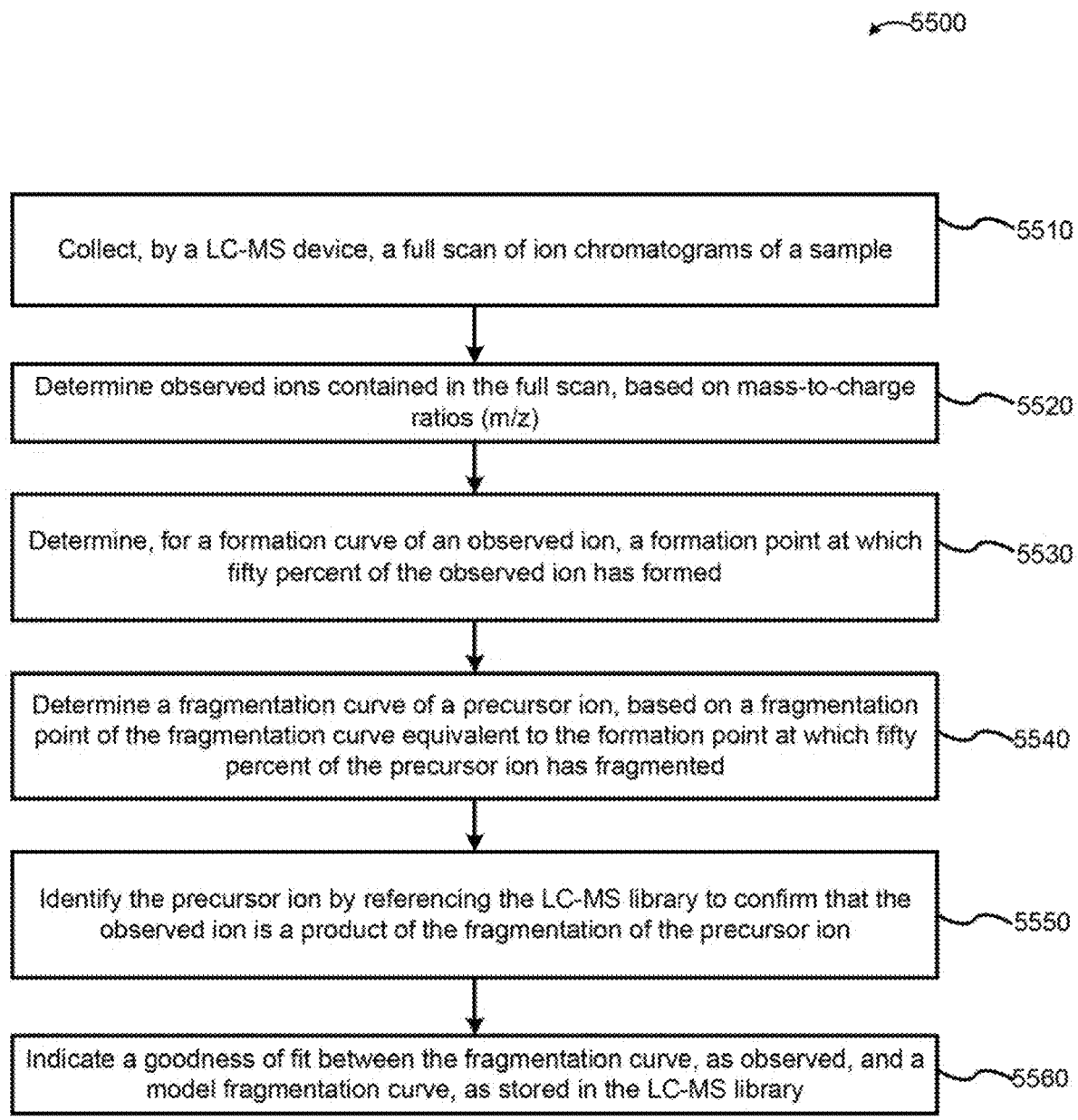
FIG. 55 illustrates a method of applying a LC-MS library according to an example embodiment.

FIG. 55 illustrates a method 5500 of applying a LC-MS library according to an example embodiment. At 5510, a LC-MS device collects a full scan of ion chromatograms of a sample. At 5520, the LC-MS device determines observed ions contained in the full scan, based on mass-to-charge ratios (m/z). At 5530, the LC-MS device determines, for a formation curve of an observed ion, a formation point at which fifty percent of the observed ion has formed. At 5540, the LC-MS device determines a fragmentation curve of a precursor ion, based on a fragmentation point of the fragmentation curve equivalent to the formation point at which fifty percent of the precursor ion has fragmented. At 5550, the LC-MS device identifies the precursor ion by referencing the LC-MS library to confirm that the observed ion is a product of the fragmentation of the precursor ion. At 5560, the LC-MS device indicates a goodness of fit between the fragmentation curve, as observed, and a model fragmentation curve, as stored in the LC-MS library.

Figure 56:
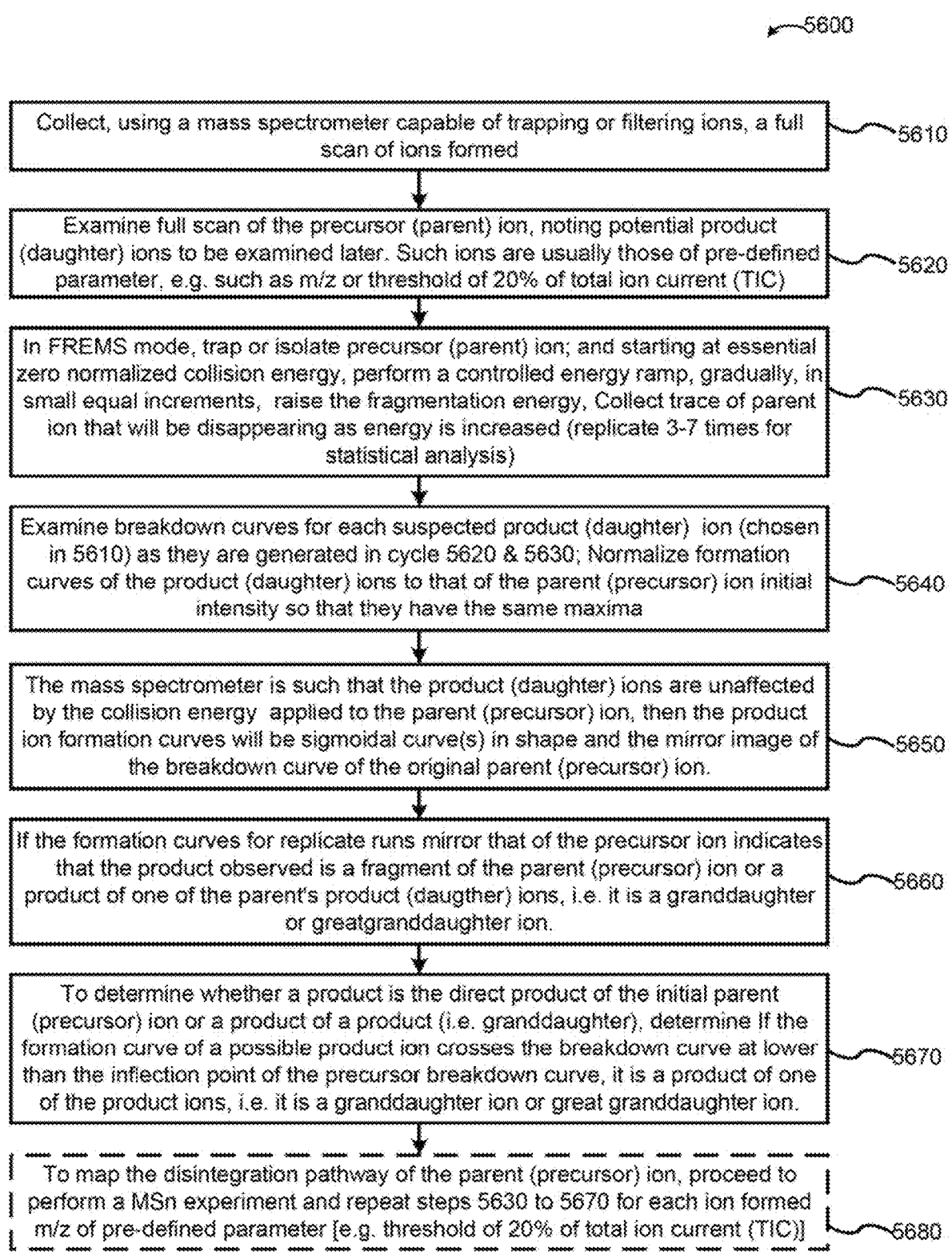
FIG. 56 illustrates a method of determining relationships between precursor ions and product ions according to an example embodiment.

FIG. 56 illustrates a method 5600 of determining relationships between precursor ions and product ions according to an example embodiment. The method 5600 is suitable for mass spectrometers that do not fragment products. At 5610, a mass spectrometer capable of trapping or filtering ions collects a full scan of ions formed. At 5620, the mass spectrometer examines the full scan of the precursor (parent) ion, noting potential product (daughter) ions to be examined later. Such ions are usually those of pre-defined parameter, e.g. such as m/z or threshold of 20% of total ion current (TIC). At 5630, the mass spectrometer in FREMS mode traps or isolates the precursor (parent) ion; and starting at essential zero normalized collision energy, performs a controlled energy ramp, gradually, in small equal increments, raises the fragmentation energy, collects the trace of the parent ion that will be disappearing as energy is increased (replicate 3-7 times for statistical analysis). At 5640, the mass spectrometer examines the breakdown curves for each suspected product (daughter) ion (chosen in 5610) as they are generated in blocks 5620 and 5630; and normalizes formation curves of the product (daughter) ions to that of the parent (precursor) ion initial intensity so that they have the same maxima. At 5650, the mass spectrometer is configured such that the product (daughter) ions are unaffected by the collision energy applied to the parent (precursor) ion, then the product ion formation curves will be sigmoidal curve(s) in shape and the mirror image of the breakdown curve of the original parent (precursor) ion. At 5660, the mass spectrometer, responsive to the formation curves for replicate runs mirroring that of the precursor ion, indicates that the product observed is a fragment of the parent (precursor) ion or a product of one of the parent's product (daughter) ions, i.e. it is a granddaughter or great-granddaughter ion. At 5670, the mass spectrometer determines whether a product is the direct product of the initial parent (precursor) ion or a product of a product (i.e. granddaughter), by determining whether the formation curve of a possible product ion crosses the breakdown curve at lower than the inflection point of the precursor breakdown curve, if so, the mass spectrometer designates the product as a product of one of the product ions, i.e. it is a granddaughter ion or great granddaughter ion. At 5680, the mass spectrometer optionally maps the disintegration pathway of the parent (precursor) ion, by proceeding to perform a MS" experiment by repeating steps 5630 to 5670 for each ion formed m/z of pre-defined parameter [e.g. threshold of 20% of total ion current (TIC)].

Figure 57:
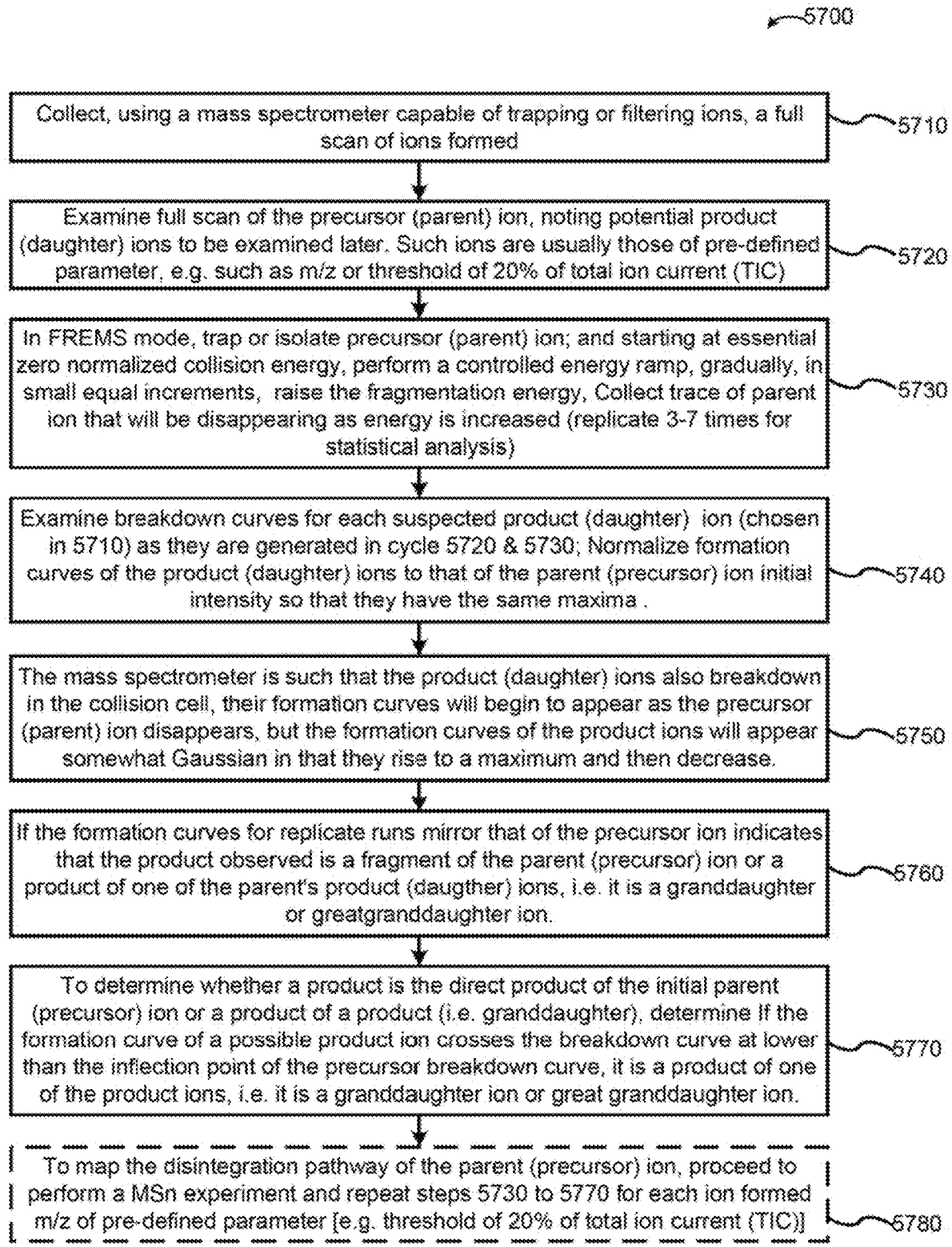
FIG. 57 illustrates another method of determining relationships between precursor ions and product ions according to an example embodiment.

FIG. 57 illustrates a method 5700 of determining relationships between precursor ions and product ions according to an example embodiment. The method 5700 is suitable for those types of mass spectrometers that fragment products. At 5710, a mass spectrometer capable of trapping or filtering ions collects a full scan of ions formed. At 5720, the mass spectrometer examines the full scan of the precursor (parent) ion, noting potential product (daughter) ions to be examined later. Such ions are usually those of pre-defined parameter, e.g. such as m/z or threshold of 20% of total ion current (TIC). At 5730, the mass spectrometer in FREMS mode traps or isolates the precursor (parent) ion; and starting at essential zero normalized collision energy, performs a controlled energy ramp, gradually, in small equal increments, raises the fragmentation energy, collects the trace of the parent ion that will be disappearing as energy is increased (replicate 3-7 times for statistical analysis). At 5740, the mass spectrometer examines the breakdown curves for each suspected product (daughter) ion (chosen in 5710) as they are generated in blocks 5720 and 5730; and normalizes formation curves of the product (daughter) ions to that of the parent (precursor) ion initial intensity so that they have the same maxima. At 5750, the mass spectrometer is configured such that the product (daughter) ions also break down in the collision cell by the collision energy applied to the parent (precursor) ion; their formation curves will begin to appear as the precursor (parent) ion disappears, but the formation curves of the product ions will appear somewhat Gaussian in that they rise to a maximum and then decrease. At 5760, the mass spectrometer, responsive to the formation curves for replicate runs mirroring that of the precursor ion, indicates that the product observed is a fragment of the parent (precursor) ion or a product of one of the parent's product (daughter) ions, i.e. it is a granddaughter or great-granddaughter ion. At 5770, the mass spectrometer determines whether a product is the direct product of the initial parent (precursor) ion or a product of a product (i.e. granddaughter), by determining whether the formation curve of a possible product ion crosses the breakdown curve at lower than the inflection point of the precursor breakdown curve, if so, the mass spectrometer designates the product as a product of one of the product ions, i.e. it is a granddaughter ion or great granddaughter ion. At 5780, the mass spectrometer optionally maps the disintegration pathway of the parent (precursor) ion, by proceeding to perform a MS" experiment by repeating steps 5730 to 5770 for each ion formed m/z of pre-defined parameter [e.g. threshold of 20% of total ion current (TIC)].

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to 'the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

An embodiment of this inventive concept resides in a computer system (e.g., a controller of a mass spectrometer). Here, the term computer system includes at least a processing system and a memory accessible to the processing system. The processing system includes at least one hardware processor, and in other examples includes multiple processors and/or multiple processor cores. The processing system in yet another example includes processors from different devices working together. In embodiments, a computer system includes multiple processing systems that communicate cooperatively over a computer network.

Hardware Processors

A hardware processor is a complex electronic circuit designed to respond to certain electronic inputs in a predefined manner. Embodiments may be included in a hardware processor of a mass spectrometer.

The inputs to a hardware processor are stored as electrical charges. Each such electrical charge is typically stored by a respective memory circuit (also referred to as memory) such as in a register, in a random access memory, on a hard drive or SSD, or the like, that is adapted to store a binary value. Such a memory circuit, in one example, includes a transistor and a capacitor. Of these two components, the capacitor can hold a charge. The hardware processor interprets the electrical charge of a given memory circuit as being in one of two permitted states. The two permitted states correspond to the two values of the binary number system, namely, zero (0) or one (1). In other words, a hardware processor is designed to respond to inputs that have binary values.

Hardware processors accept the input of binary values in sets. An eight-bit hardware processor accepts an input of eight binary values (eight binary digits, or bits) at a time. These eight binary values are provided as an ordered set. In an ordered set, the order of the values matters. A set of eight binary values offers only 118 different permutations. Thus, with an eight-bit hardware processor, there are only 118 different sets of ordered binary values that can be input.

Native Instruction Set

A given eight-bit hardware processor has electrical circuitry designed to perform certain predefined operations in response to certain sets of the 118 possible sets of ordered binary values. The circuitry is built of electronic circuits arranged or configured to respond to one set of ordered binary values one way and to another set of ordinary values another way, all in accordance with the hardware design of the particular hardware processor. A given set of ordered binary values to which the hardware processor is designed to respond, in a predefined manner, is an instruction. An instruction is also referred to as a machine code or, more simply, a code. The collection of valid sets of ordered binary values (i.e., instructions/codes), to which a given hardware processor is designed to respond, in a predetermined manner, is the native instruction set of the processor, also referred to as a native instruction set of codes.

The electronic circuits of a hardware processor are arranged or configured to respond to inputs in accordance with the hardware processor's precise processor design. This processor design is fixed when the hardware processor is manufactured. In some technologies, although the electronic circuits are all arranged at manufacture, a portion of the circuits is arranged to accommodate a later step that fixes this portion's function for subsequent use. In other words, some technologies allow the precise processor design to be fixed at a later step. Whether the hardware processor's particular design is fixed at manufacture or fixed at a later fixing step, the hardware processor responds to valid inputs by performing predefined operations in accordance with its particular design.

Hardware processors made by different manufacturers can and typically do respond differently to a given code. Each hardware processor line has its own native instruction set. To control a given hardware processor, it is necessary to select an instruction or a sequence of instructions from the predefined native instruction set of that hardware processor. Providing an input that does not correspond to one of the predefined native instruction set of codes, in embodiments, results in an invalid operation or an error.

Modern hardware processors are sixty-four-bit hardware processors. These accept sixty-four binary values at a time. A sixty-four-bit machine allows for more than nine quintillion permutations in the set of ordered binary values. Even so, such hardware processors have respective native instruction sets of codes to which they respond in a predetermined manner.

Basic and Complex Operations

Each code selected from a given native instruction set corresponds to a basic operation of a hardware processor. To achieve more complex operations, it is necessary to select multiple codes and to execute them in a predetermined sequence.

When such codes are loaded into a hardware processor in a sequence, the hardware processor performs the basic operations to which the codes correspond, in the sequence loaded. This is also referred to as executing the instructions to which the codes correspond.

When the hardware processor loads a sequence of codes, selected from the predefined native instruction set of codes, the result is a sequence of basic operations that, taken together, constitute a complex operation.

Logic

The sequence of codes that are to be loaded and executed is stored in a memory; the hardware processor is designed with storage for some codes but not enough space for longer sequences of codes. The memory that stores the sequence of codes must be accessible to the hardware processor, directly or indirectly. The sequence of codes that a hardware processor is to execute, in the implementation of a given task, is referred to herein as logic. The logic is made up, therefore, of a sequence of codes or instructions, selected from the predefined native instruction set of codes of the hardware processor, and stored in the memory.

Logic and Resource Expenditure

Logic is part of the inner workings of a computer system. As such, the logic determines, to a large extent, the amount of computing resources a computer system will expend. One such resource is referred to as central processing unit (CPU) cycles. A CPU cycle refers, herein, to loading a code and subsequently performing the corresponding predefined operation that is hardwired into the hardware processor. One CPU cycle follows another with the loading of the next code to execute. Logic that requires extensive computations causes the hardware processor to carry out a proportionally large number of operations and expends many CPU cycles.

Logic that involves obtaining, loading, processing, and unloading an extensive amount of data files causes the hardware processor to carry out a proportionally large number of operations and, likewise, causes the memory to store and to re-store a proportionally large amount of data. Similarly, when logic involves retrieving data from across a network, the more data retrieved increases the level of computer network use, especially in the case of large data files such as those related to biometric data.

Software

Logic, as used herein, does not mean software. Software refers to higher-level, human-readable source code. Source code is written in a programming language that programmers use to express operations they would have a computer perform. Source code, however, cannot be executed by a hardware processor because source code instructions are not selected from the predefined native instruction set of codes. Before source code can be used on a given hardware processor, it must be converted into logic, also referred to as being converted into machine instructions.

The process of making source code executable by a hardware processor, a process known to those familiar with this technical field as compilation or interpretation, is not the subject of this application and is well known in the field, and therefore not described in any detail here.

The logic described below refers to a particular sequence of machine instructions or codes selected from the predefined native instruction set of codes of a hardware processor.

User Interface and Controller

A computer system, in embodiments, also includes a user interface controller. A user interface controller controls circuitry that presents a user interface. A user interface is any hardware or combination of hardware and logic that allows a user to interact with a computer system. For this discussion, a user interface includes one or more user interface objects. User interface objects include display regions, user activatable regions, and the like. In embodiments, the user interface controller also controls circuitry that locks or unlocks various barriers such as turnstiles, gates, or doors. Such barriers are referred to in this context as access controls.

A display region is a region of a user interface which displays information to the user. A user activatable region is a region of a user interface, such as a button or a menu, which allows the user to take some action, or an input area that accepts a manual input from a user. A display region and a user activatable region are, in some examples, collocated, overlapping, or reside one within the other.

The user interface is under the control of the user interface controller. The user interface controller interfaces with the user interface to output information to the user and to receive inputs from the user. The user interface controller is under the control of the processing system.

While a number of example embodiments of the present subject matter have been described, it should be appreciated that the present subject matter provides many applicable inventive concepts that can be embodied in a wide variety of ways. The example embodiments discussed herein are merely illustrative of ways to make and use the subject matter and are not intended to limit the scope of the claimed subject matter. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. A Liquid Chromatography Mass Spectrometry (LC-MS) system configured to:
    collect a full scan of ions formed;
    determine, from the full scan, a precursor (parent) ion using a m/z or threshold of 20% of total ion current (TIC);
    trap or isolate, in MS/MS mode, the precursor (parent) ion;
    collect a trace of the parent ion that will be disappearing as energy is increased, by starting at essential zero normalized collision energy and performing a controlled energy ramp by incrementally raising a fragmentation energy;
    examine formation curves for detected product (daughter) ions;
    normalize precursor ion and formation curves of the product (daughter) ions to maximum intensity or to an average at a baseline so that both ions normalize to the same scale;
    responsive to the formation curves for replicate runs mirroring that of precursor ion breakdown curves, indicate that the product observed is a fragment of the parent (precursor) ion or a product of one of the parent's product (daughter) ions;
    if it is not responsive, indicating that the product observed is contamination that is not related to the original parent (precursor) ion; and
    determine whether a product is a direct product of an initial parent (precursor) ion or a product of a product (i.e. granddaughter), by determining whether a formation curve of a possible product ion crosses the breakdown curve at lower than an inflection point of a breakdown curve of the precursor, if so, that ion does not belong, or alternatively could belong to a product of a product, which can be confirmed in a next $MS^n$ stage.

2. A method of building a Liquid Chromatography Mass Spectrometry (LC-MS) library, comprising:
    scanning, by a LC-MS device, a sample to extract ion chromatograms including a fragmentation curve of a precursor ion;
    determining, for the fragmentation curve, a fragmentation point at which fifty percent of the precursor ion has fragmented;
    determining whether the ion chromatograms include a formation curve, of an observed ion, including a formation point equivalent to the fragmentation point, at which fifty percent of the observed ion has formed;
    responsive to determining that the formation curve includes the formation point equivalent to the fragmentation point, updating the LC-MS library to indicate that the observed ion is a product of fragmentation of the precursor ion; and
    responsive to determining that the formation curve does not include the formation point equivalent to the fragmentation point, updating the LC-MS library to indicate that the observed ion is not a direct product of the fragmentation of the precursor ion.

3. The method of claim 2, further comprising repeating the updating the LC-MS library for additional formation curves found for additional observed ions.

4. The method of claim 2, further comprising repeating the updating the LC-MS library for additional fragmentation curves found for additional precursor ions.

5. The method of claim 2, further comprising:
   determining whether a formation rate of the formation curve of the observed ion follows a fragmentation rate of the fragmentation curve of the precursor ion; and
   responsive to determining that the formation rate follows the fragmentation rate, updating the LC-MS library to indicate that the observed ion is a product of the fragmentation of the precursor ion.

6. The method of claim 2, further comprising:
   determining whether a summation of a plurality of formation rates of observed ions mirrors a fragmentation rate of the fragmentation curve of the precursor ion; and
   responsive to determining that the summation of a plurality of formation rates follows the fragmentation rate, updating the LC-MS library to indicate that the plurality of observed ions are a product of the fragmentation of the precursor ion.

7. A method of building a Liquid Chromatography Mass Spectrometry (LC-MS) library, comprising:
   collecting, by a LC-MS device, a full scan of ion chromatograms of a sample;
   determining product (daughter) ions of interest as observed in the full scan of a precursor (parent) ion;
   using FREMS methodology to collect a fragmentation curve of the precursor ion as collision energy is increased;
   determining, for the fragmentation curve, a fragmentation point at which fifty percent of the precursor ion has fragmented;
   determining whether the ion or ions observed in the full scan exhibit formation curve(s); if not, then that ion is not a product of the precursor ion; it is contamination;
   responsive to determining that the formation curve includes a formation point equivalent to the fragmentation point, updating the LC-MS library to indicate the formation curve of the observed ion is a primary product of fragmentation of the precursor ion; and
   responsive to determining that the formation point occurs at lower energy than the fragmentation point representing loss of 50% of the precursor ion, then the observed ion is not a primary product resulting from fragmentation of the precursor ion; it is the product of a product of the precursor ion, i.e. a granddaughter ion.

8. A method of identifying a precursor ion using a Liquid Chromatography Mass Spectrometry (LC-MS) library, comprising:
   collecting, by a LC-MS device, a full scan of ion chromatograms of a sample;
   determining observed ions contained in the full scan, based on mass-to-charge ratios (m/z);
   determining, for a formation curve of an observed ion, a formation point at which fifty percent of the observed ion has formed;
   determining a fragmentation curve of a precursor ion, based on a fragmentation point of the fragmentation curve equivalent to the formation point at which fifty percent of the precursor ion has fragmented;
   identifying the ion by referencing the LC-MS library to confirm that the observed ion (m/z) is present in the LC-MS library; matching product(s) m/z from the LC-MS library, and matching 50% fragmentation points for precursor and fragment ions to the LC-MS library; and
   indicating a goodness of fit between the fragmentation curve, as observed, and a model fragmentation curve, as stored in the LC-MS library.

9. The method of claim 8, further comprising indicating a goodness of fit between the observed ion and the precursor ion.

* * * * *